US012533395B2

(12) United States Patent
Iwasaki et al.

(10) Patent No.: US 12,533,395 B2
(45) Date of Patent: Jan. 27, 2026

(54) MANIPULATION OF MENINGEAL LYMPHATIC VASCULATURE FOR BRAIN AND CNS TUMOR THERAPY

(71) Applicant: Yale University, New Haven, CT (US)

(72) Inventors: Akiko Iwasaki, Guilford, CT (US); Jean-Leon Thomas, Branford, CT (US); Eric Song, New Haven, CT (US)

(73) Assignee: YALE UNIVERSITY, New Haven, CT (US)

( * ) Notice: Subject to any disclaimer, the term of this patent is extended or adjusted under 35 U.S.C. 154(b) by 1141 days.

(21) Appl. No.: 17/294,018

(22) PCT Filed: Nov. 15, 2019

(86) PCT No.: PCT/US2019/061624
§ 371 (c)(1),
(2) Date: May 14, 2021

(87) PCT Pub. No.: WO2020/102627
PCT Pub. Date: May 22, 2020

(65) Prior Publication Data
US 2022/0008510 A1 Jan. 13, 2022

Related U.S. Application Data

(60) Provisional application No. 62/929,527, filed on Nov. 1, 2019, provisional application No. 62/768,390, filed on Nov. 16, 2018.

(51) Int. Cl.
| | | |
|---|---|---|
| A61K 38/00 | (2006.01) |
| A61K 38/18 | (2006.01) |
| A61P 35/04 | (2006.01) |
| A61P 37/04 | (2006.01) |
| C07K 16/28 | (2006.01) |
| C12N 15/86 | (2006.01) |

(52) U.S. Cl.
CPC .......... *A61K 38/1866* (2013.01); *A61P 35/04* (2018.01); *A61P 37/04* (2018.01); *C07K 16/2818* (2013.01); *C07K 16/2878* (2013.01); *C12N 15/86* (2013.01)

(58) Field of Classification Search
CPC .............. A61K 38/1866; A61K 48/005; A61K 2300/00; A61P 35/04; A61P 37/04; A61P 35/00; C07K 16/2818; C07K 16/2878; C07K 14/485; C07K 14/515; A01K 2267/0331
See application file for complete search history.

(56) References Cited

U.S. PATENT DOCUMENTS

| | | |
|---|---|---|
| 7,077,713 B2 | 7/2006 | Watabe et al. |
| 8,470,295 B2 | 6/2013 | Warren et al. |
| 10,980,877 B2 | 4/2021 | Swartz et al. |
| 2002/0151489 A1 | 10/2002 | Gravereaux et al. |
| 2004/0214766 A1 | 10/2004 | Alitalo et al. |
| 2007/0082848 A1 | 4/2007 | Alitalo et al. |
| 2007/0212390 A1 | 9/2007 | Paavonen et al. |
| 2012/0077741 A1 | 3/2012 | Delfani et al. |
| 2019/0269758 A1 | 9/2019 | Kipnis et al. |
| 2020/0172624 A1 | 6/2020 | Kipnis et al. |

FOREIGN PATENT DOCUMENTS

| | | |
|---|---|---|
| EP | 2266594 B1 | 5/2015 |
| WO | 03/024478 A1 | 3/2003 |
| WO | 2017/190074 A1 | 11/2017 |
| WO | 2017/210343 A1 | 12/2017 |

OTHER PUBLICATIONS

ElebiElebiyo et al., Reassessing vascular endothelial growth factor (VEGF) in anti-angiogenic cancer therapy, vol. 32, yo et al., Reassessing vascular endothelial growth factor (VEGF) in anti-angiogenic cancer therapy, vol. 32, 2022, 100620; post priority date—used as evidentiary for current cancer enablement.*
Ellis et al. Nature Reviews, Cancer, vol. 8, 2008, 579-591.*
National Institute of Cancer—understanding and related topics, accessed May 27, 2025 at URL: https://www.cancer.gov/about-cancer/understanding/what-is-cancer.*
Communication (International Search Report) issued by the International Searching Authority in International Application No. PCT/US2019/061624 dated Feb. 11, 2020, 4 pages total.
Communication (Written Opinion) issued by the International Searching Authority in International Application No. PCT/US2018/028640 dated Sep. 4, 2018, 18 pages total.
Antila, S. et al., "Development and Plasticity of Meningeal Lymphatic Vessels" Journal of Experimental Medicine (2017) vol. 214, No. 12, pp. 3645-3667.

(Continued)

*Primary Examiner* — Jeanette M Lieb
(74) *Attorney, Agent, or Firm* — Troutman Pepper Locke LLP

(57) ABSTRACT

A method of inducing lymphangiogenesis in the brain or central nervous system of a subject is provided in which an effective amount of a lymphangiogenesis inducer is administered. A method of inducing lymphangiogenesis in a tumor in the brain or central nervous system of a subject is provided in which an effective amount of a lymphangiogenesis inducer is administered. A method of treating a cancer of the brain or central nervous system is also provided in which an effective amount of a lymphangiogenesis inducer is administered. An example of a lymphangiogenesis inducer is VEGFC. The lymphangiogenesis inducer can be in the form of a protein or a polynucleotide encoding the protein, such as an mRNA or AAV. The lymphangiogenesis inducer can be administered to the cisterna magna or directly into the lymphatic system. An immunotherapeutic agent, such as a checkpoint inhibitor, may also be administered.

17 Claims, 50 Drawing Sheets
Specification includes a Sequence Listing.

(56) References Cited

OTHER PUBLICATIONS

Yu, P. et al., "Endothelial Metabolic Control of Lymphangiogenesis" Bioessays (2018) vol. 40, No. 6, e1700245, 12 pages total.
Moussion, C. et al., "Tumour Lymph Vessels Boost Immunotherapy" News & Views Research, Nature 341 Dec. 2017, vol. 552, 21/28, 3 pages total.
Lund A., et al. "Lymphatic Vessels Regulate Immune Microenvironments in Human and Murine Melanoma", The Journal of Clinical Investigation, Sep. 2016, vol. 126, No. 9, pp. 3389-3402.
Louveau, A., et al. "Structural and Functional Features of Central Nervous System Lymphatics", HHS Public Access, Nature Jul. 16, 2015, 523 (7560), 337-341, pp. 1-21, doi:10.1038/nature14432.
Dissing-Olesen, L., et al. "New Brain Lymphatic Vessels Drain Old Concepts" EBioMedicine, (2015), pp. 776-777, http://dx.doi.org/10.1016/j.ebiom2015.08.019.
Fankhauser, M. et al. "Tumor Lymphangiogenesis Promotes T Cell Infiltration and Potentiates Immunotherapy in Melanoma", Science Translational Medicine, Sep. 13, 2017, 9, eaal4712, pp. 1-12, http://stm.sciencemag.org.
Fankhauser, M. et al. Supplementary Materials for "Tumor Lymphangiogenesis Promotes T Cell Infiltration and Potentiates Immunotherapy in Melanoma", www.sciencetranslationalmedicine.org/cgi/content/full/9/407/eaal4712/DC1, Scti Transl. Med 9, eaal4712 Sep. 13, 2017, pp. 1-8.
Aspelund, A., et al. "A Dural Lymphatic Vascular System that Drains Brain Interstitial Fluid and Macromolecules", The Rockefeller University Press, J. Exp. Med. (2015), vol. 212, No. 7, pp. 991-999, www.jem.org/cgi/doi/10.1084/iem.20142290.
Raper D., et al. "How Do Meningeal Lymphatic Vessels Drain the CNS?", Trends in Neurosciences, Sep. 2016, vol. 39, No. 9, pp. 581-586, http:/dx.doi.org/10.1016/j.tins.2016.07.001.

* cited by examiner

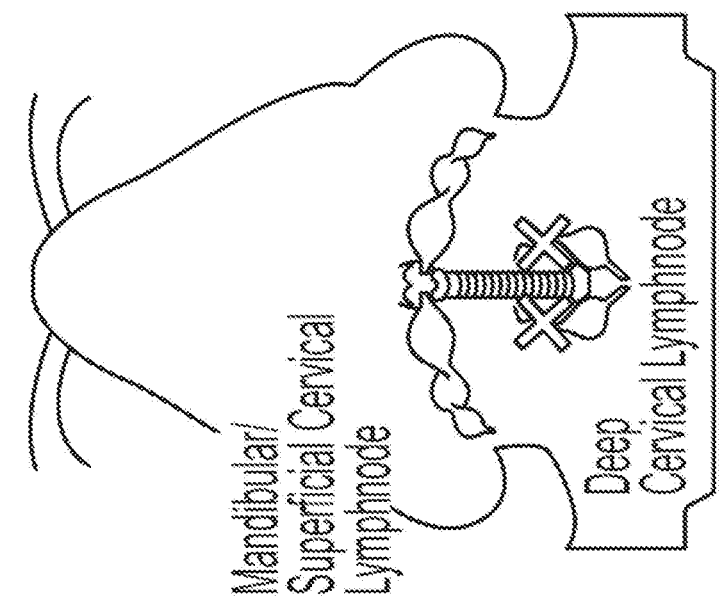
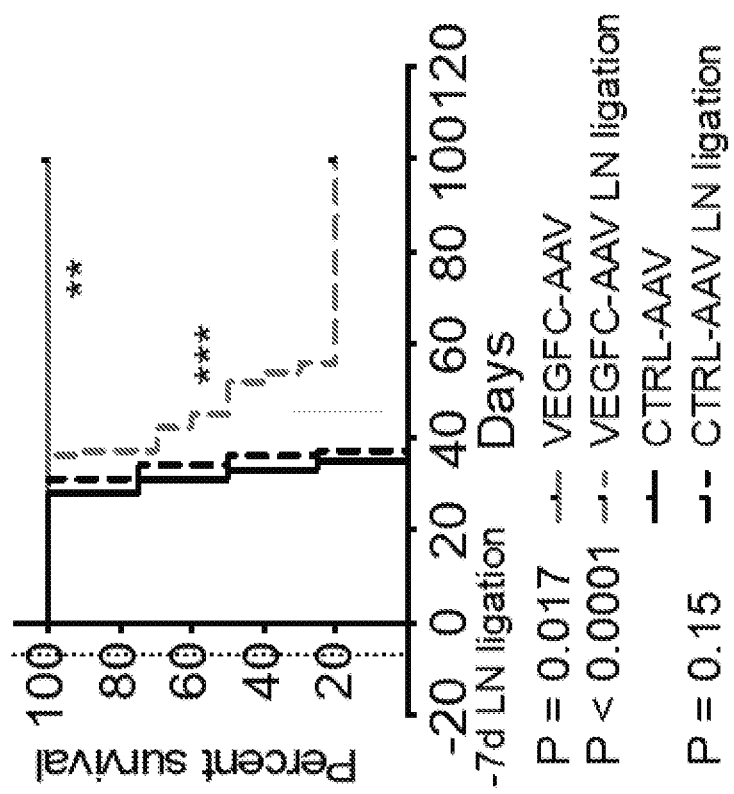
Figure 4A
Figure 4B

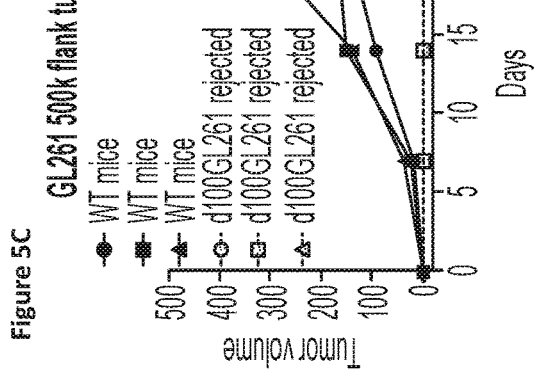
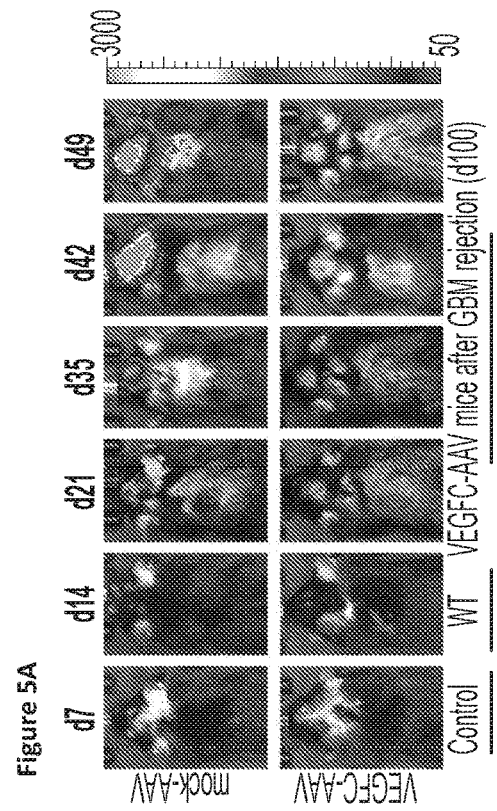
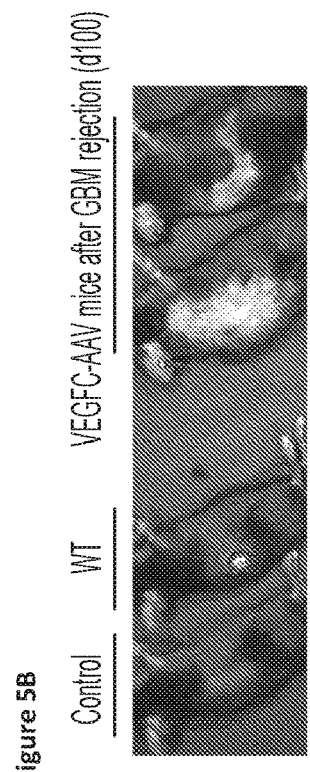
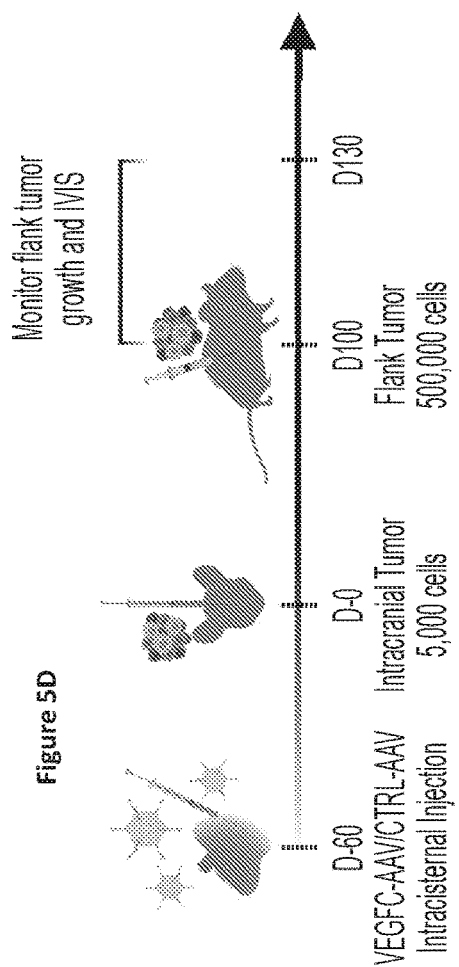

Figure 6B
Capped (Cap 1)
does not activate PRReceptors
Polyadenylated (120A)
5-methyl-cytosine substitutions
increases stability
decreases deamination
Pseudo uridine substitutions
decreased nuclease activity
decreased innate recognition
can increase translation
Figure 6A
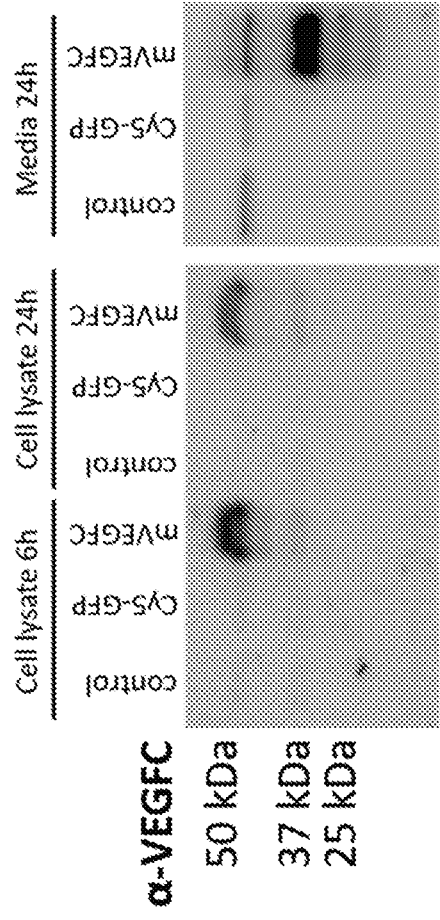
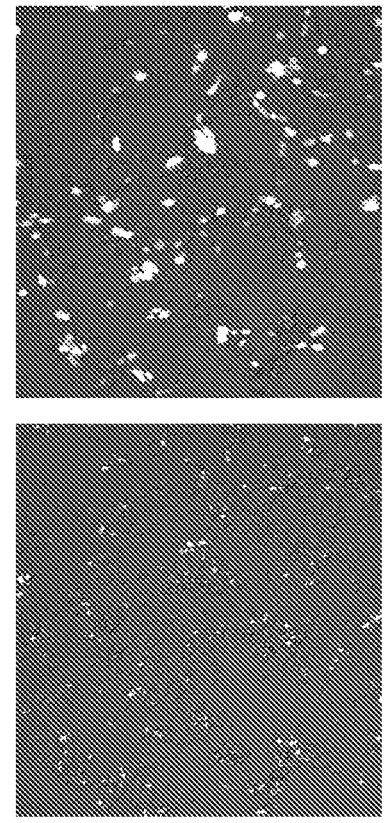

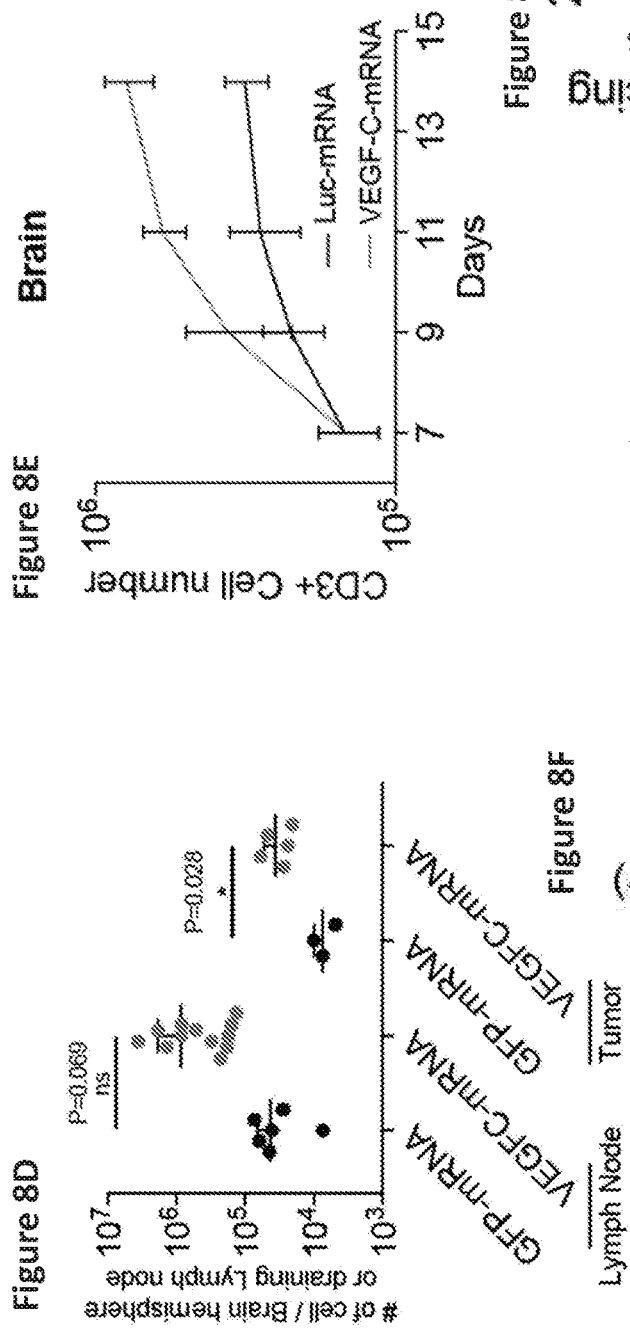

Figure 12

VEGFC-mRNA unmodified sequence atgcacttgctgctgtgcttcttgtcttgcgtgttcctgctgcgtgcgctgatcccagtccgcgcgaggcgcccgcgcaccgtcgccgccttcgagtcggg
actgggctttctcgaaggcggagcccgacggggcgagttcaaggctttgaaggcaaagactcgaggagcagttgcggtctgtgtccagcgtagatgag
ctgatgtctgtcctgaccagactactggaaaatgtacaagtgccagtcgcctgcgaaaggccgctggcagccagcccacccttcaatacaggacaggaca
gtgtaaaattgctgctgcacattataacacagagatcctgaaaagtattgataatgagtggagaaagactcaatgcatgccacgtgaggtgtatagatgt
ggggaaggagttggagcagcaccacacacacctttcttaaactccatgtgtcgtcctctcacagatgtggggttgctgcaacagcgaggggctgcagtgcat
gaacaccagcacagttacctcagcaagcgttgtttgaaattacagtcctctctcaaggccccaaacatcatcagttttgccaatcacactttcc
tgccggtgcatgtctaaactggatgtttacagacaagttcattcattattagacgttctgccagcaacattaccacagtgtcaggcagctaacaagacatg
tccaacaaactatgtgtggaataactatacatgcctgatgctcagcaggattatctttattcaaatgttgaagatgactcaaccatggattccatg
atgtctgtggaccaacaaggagctggatgaagacacctgtcagtgtctgcaagggggcggccatctagttgtgaccccacaaagaactagatag
agactcatgtcagtgtctgtaaaaacaactttccctaattcatgtggagccaacagaaattgatgagaatacatgtcagtgtatgtataaagaacg
tgtccaagaaatcagccctgaatcctgggaaatgcctgtgaatgtacagaaaacacagaagttctttcctaaagggaagaaagttccaccatcaaac
atgcagttgttacagaagaccgtgcgaatcgactgaagcattgtgatccaggaagcattgtccttagtgaagaagtatgccgtgtgtccatcgtattggaaa
aggccacatctgaactaa

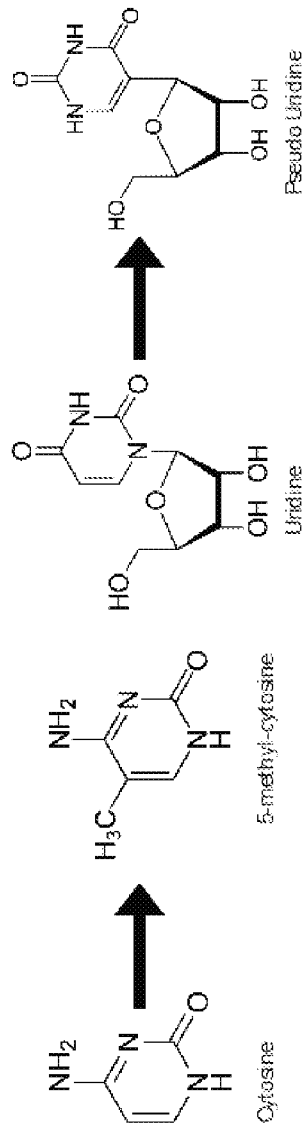

Cytosine → 5-methyl-cytosine

Uridine → Pseudo Uridine

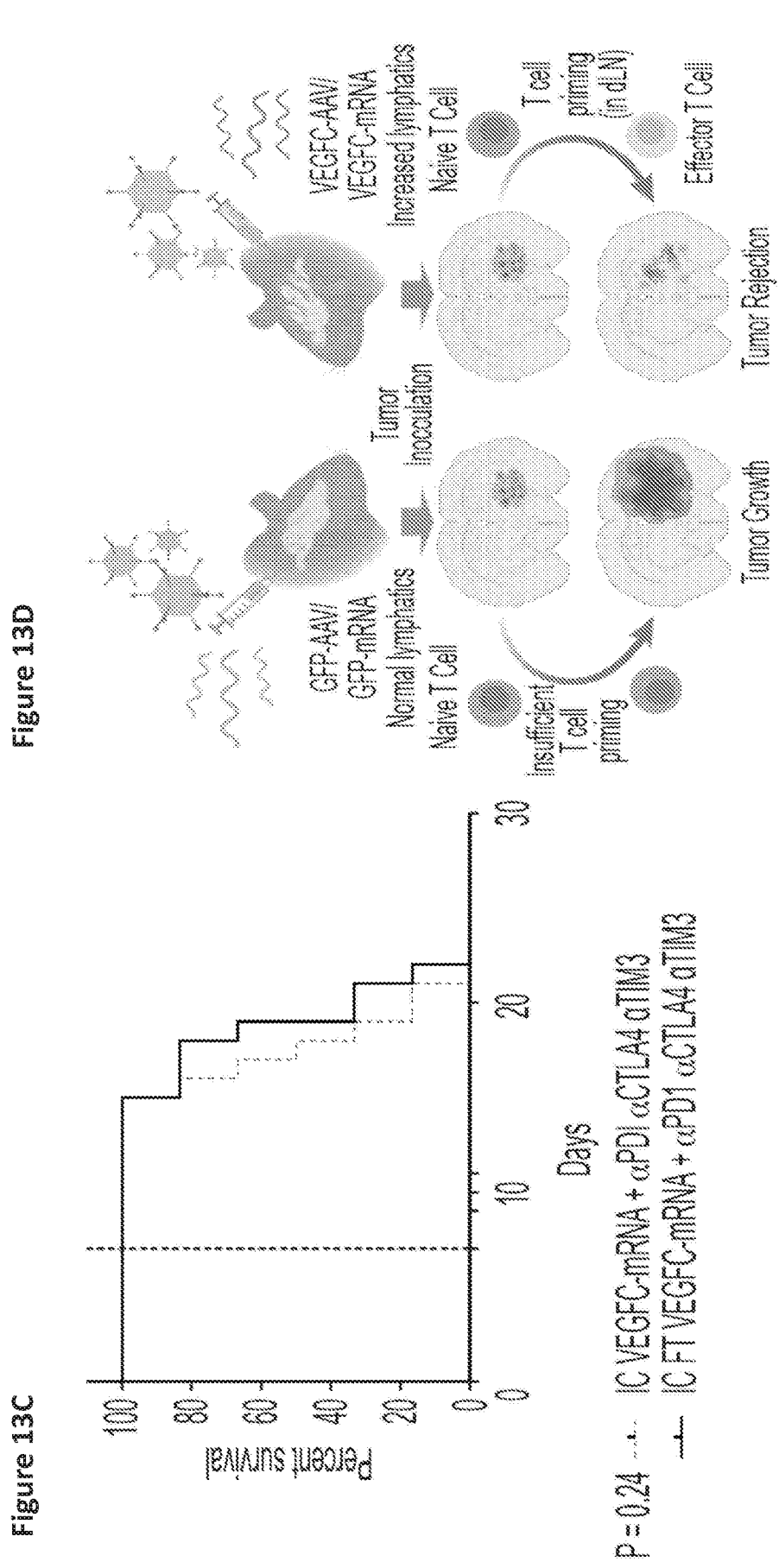

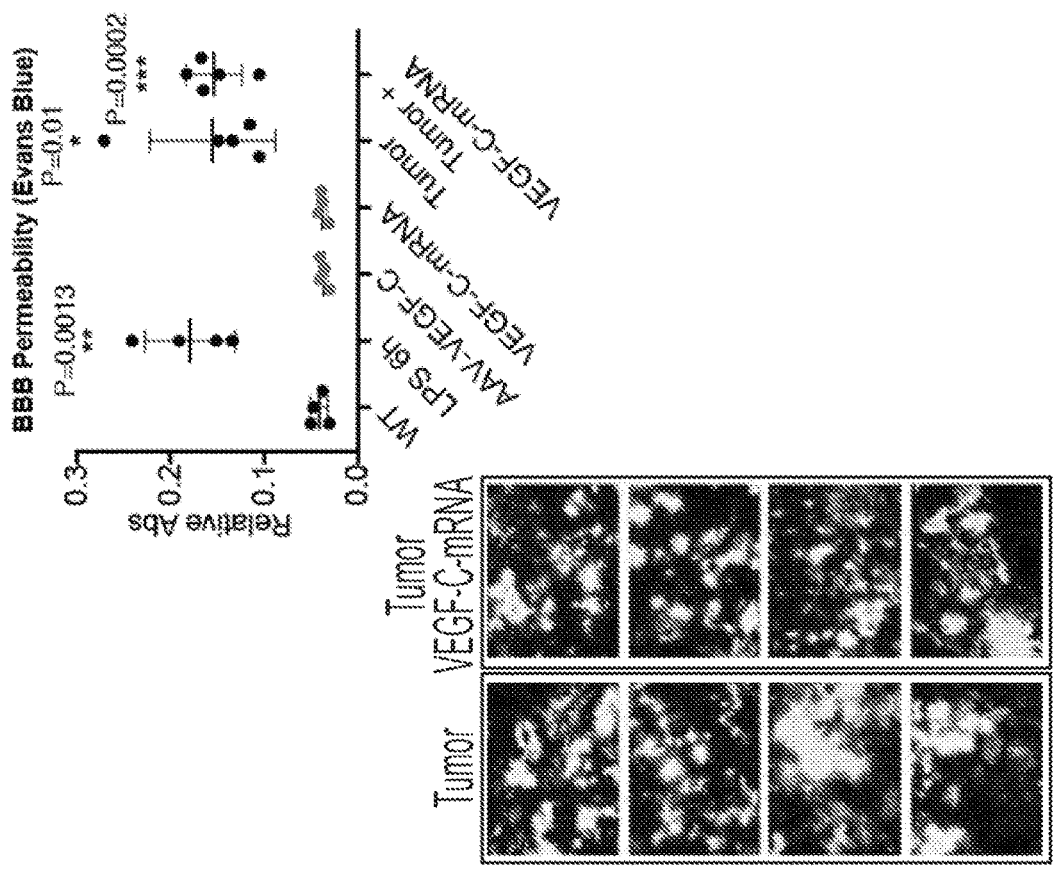
Figure 14F
Figure 14D
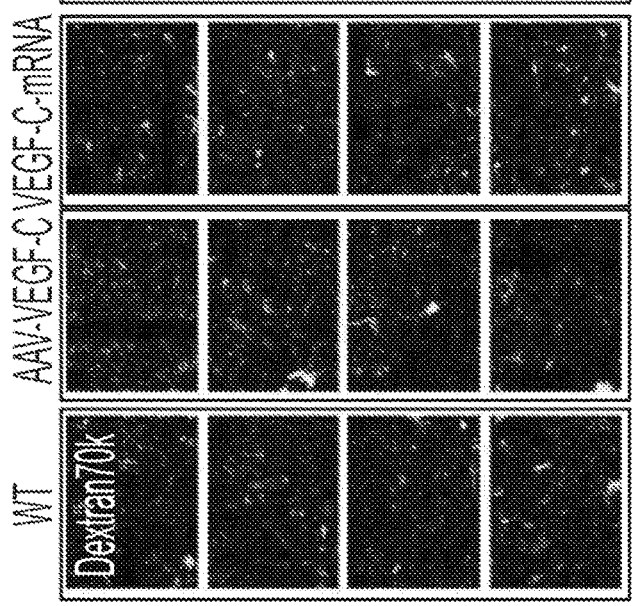
Figure 14E

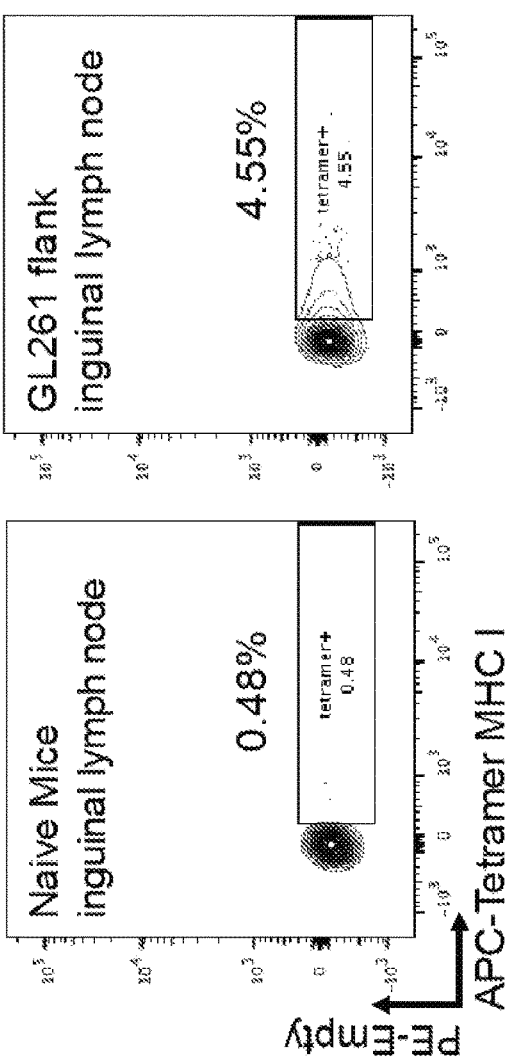
Figure 15D
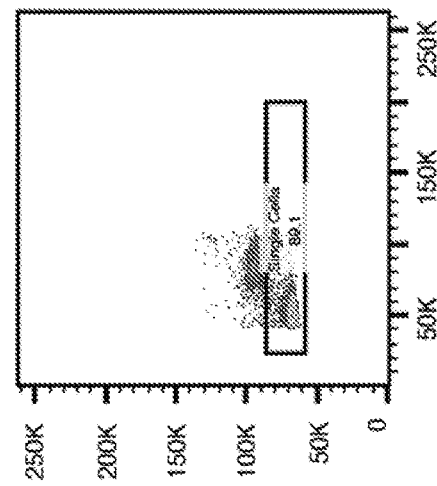
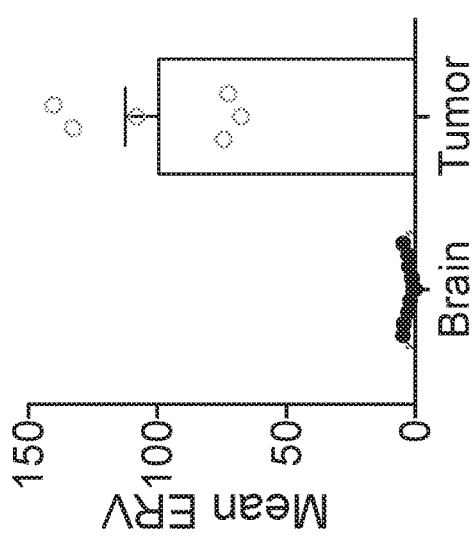
Figure 15C
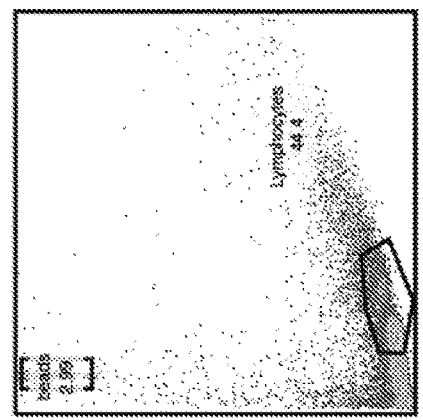
Figure 15E

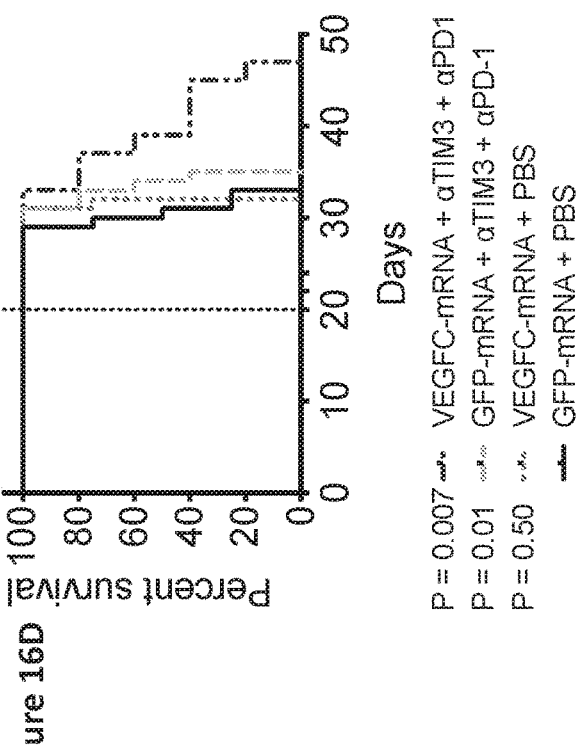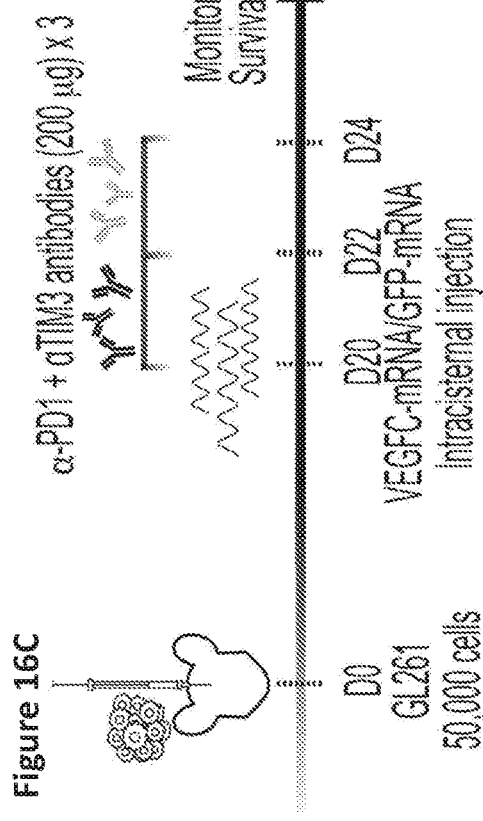
Figure 16C
Figure 16D
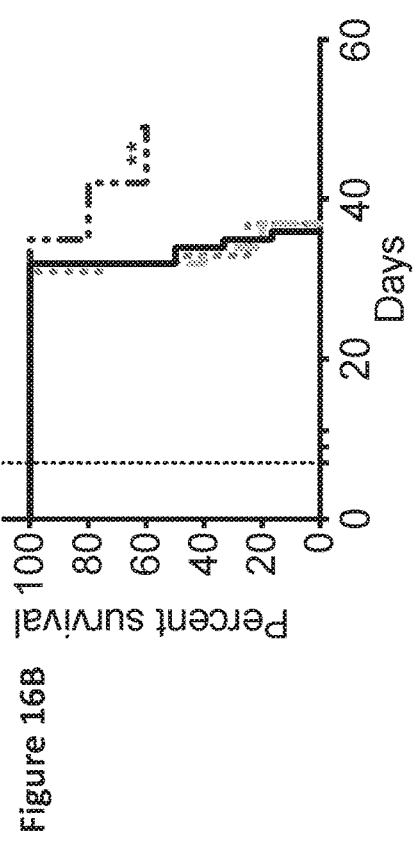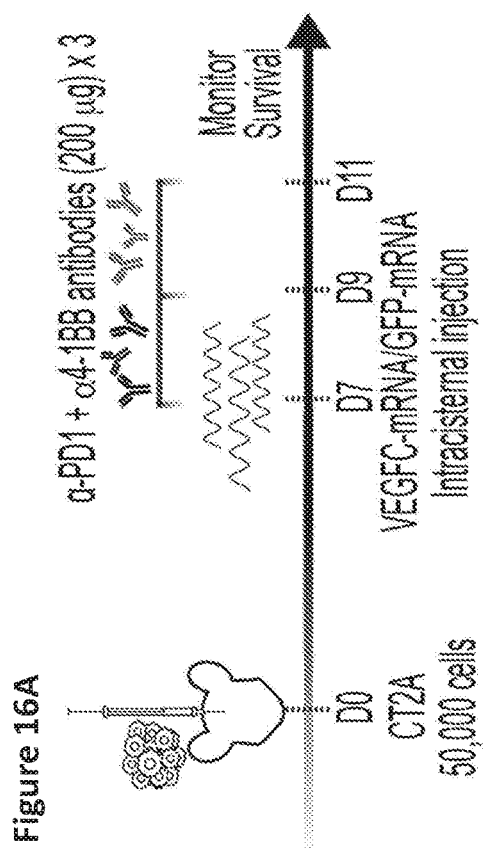
Figure 16A
Figure 16B

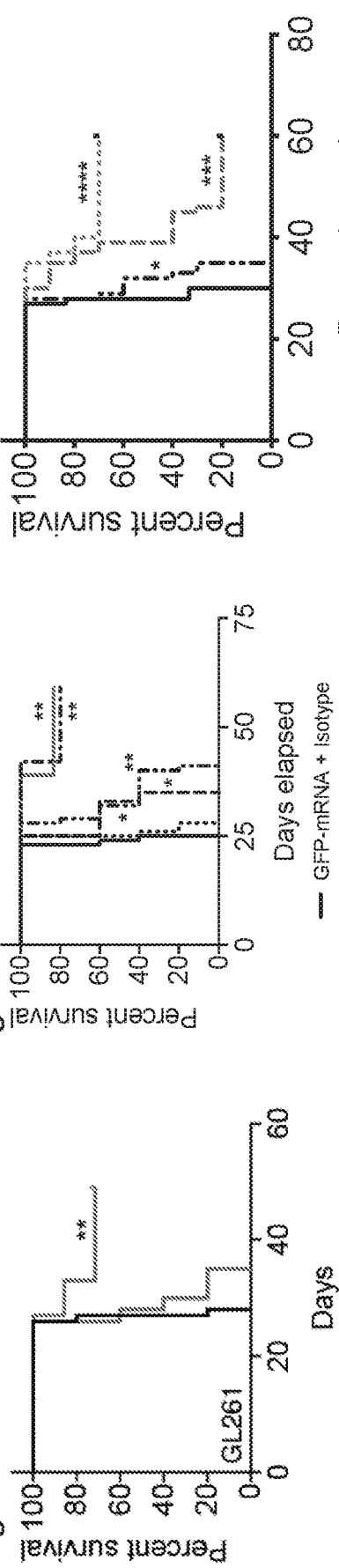

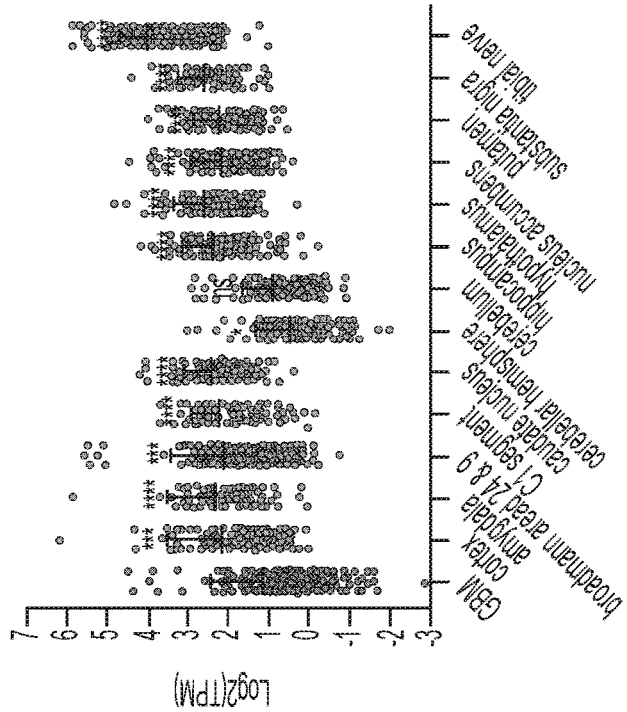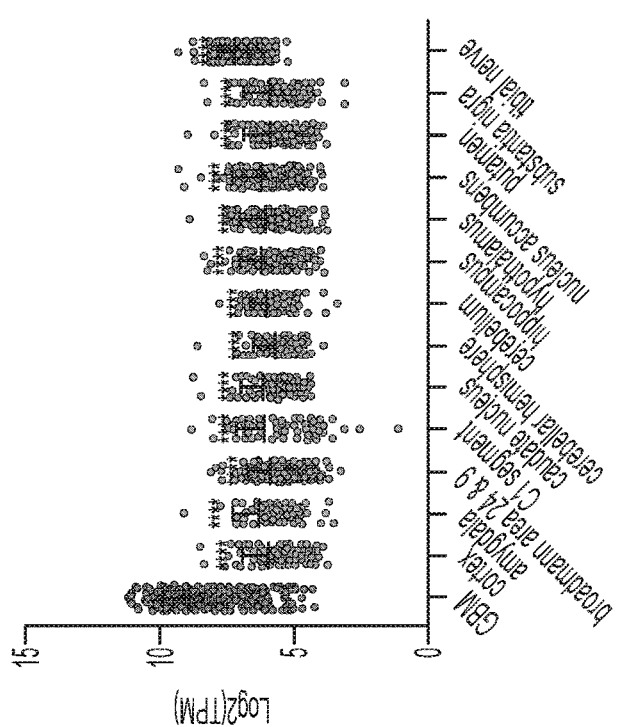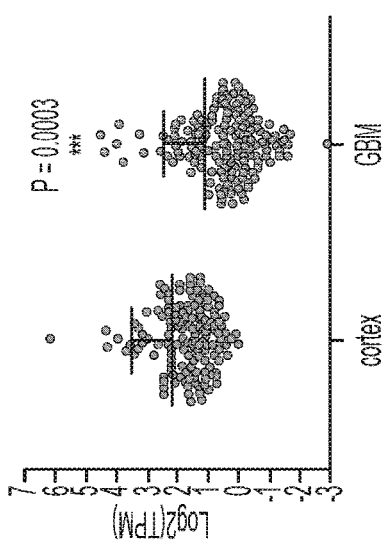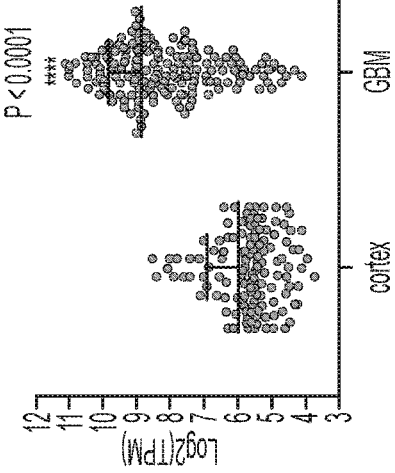
Figure 18A  Figure 18B  Figure 18C  Figure 18D  Figure 18E

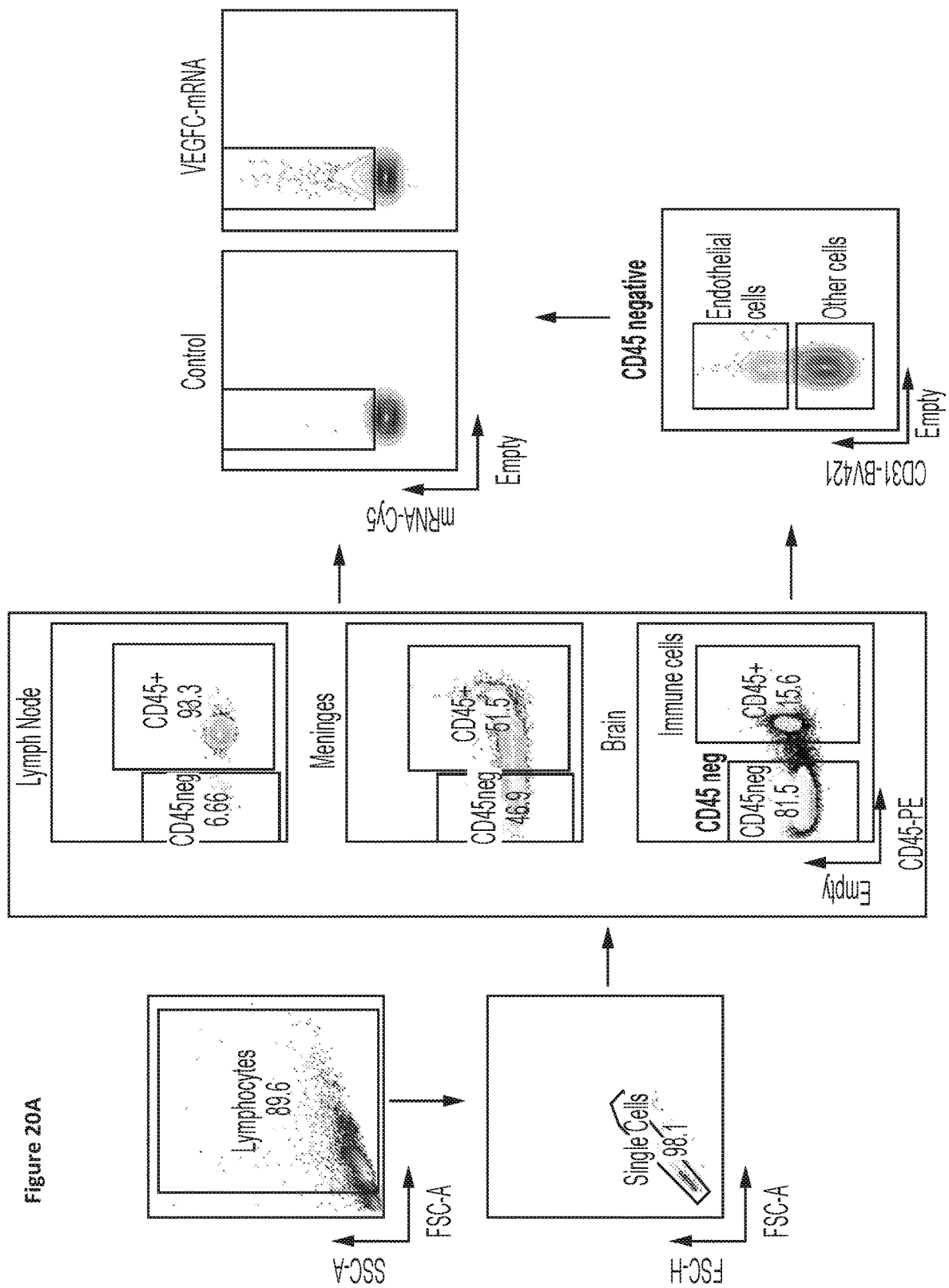

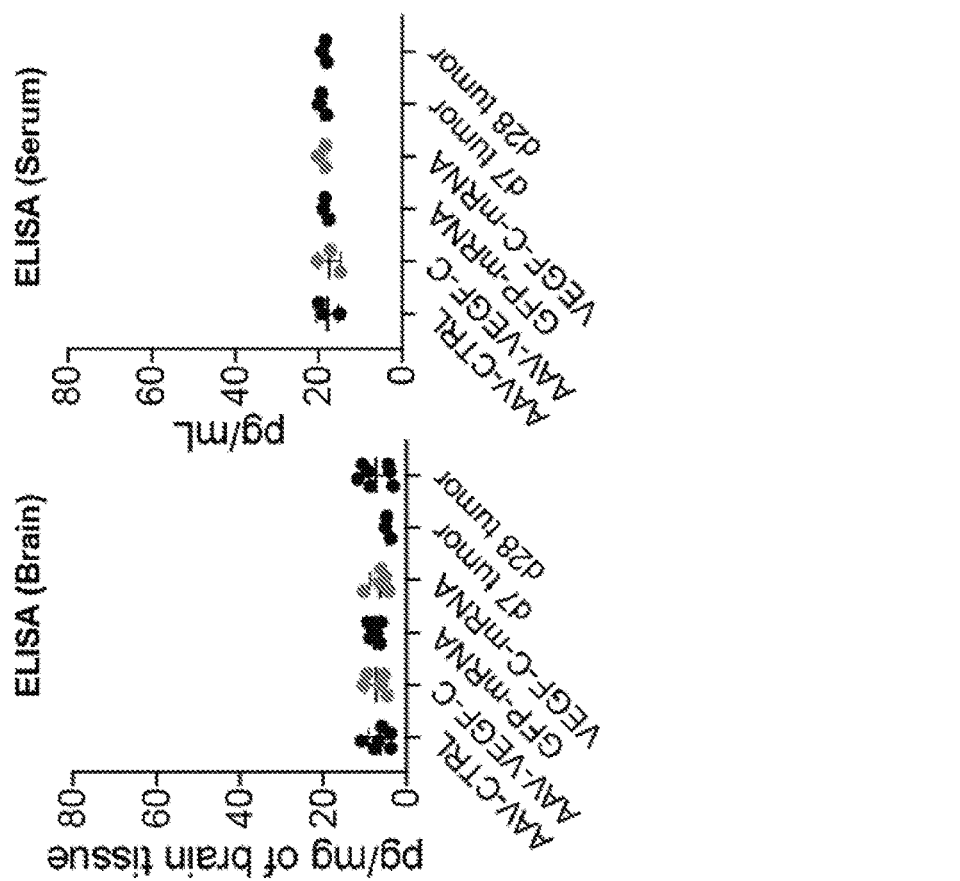
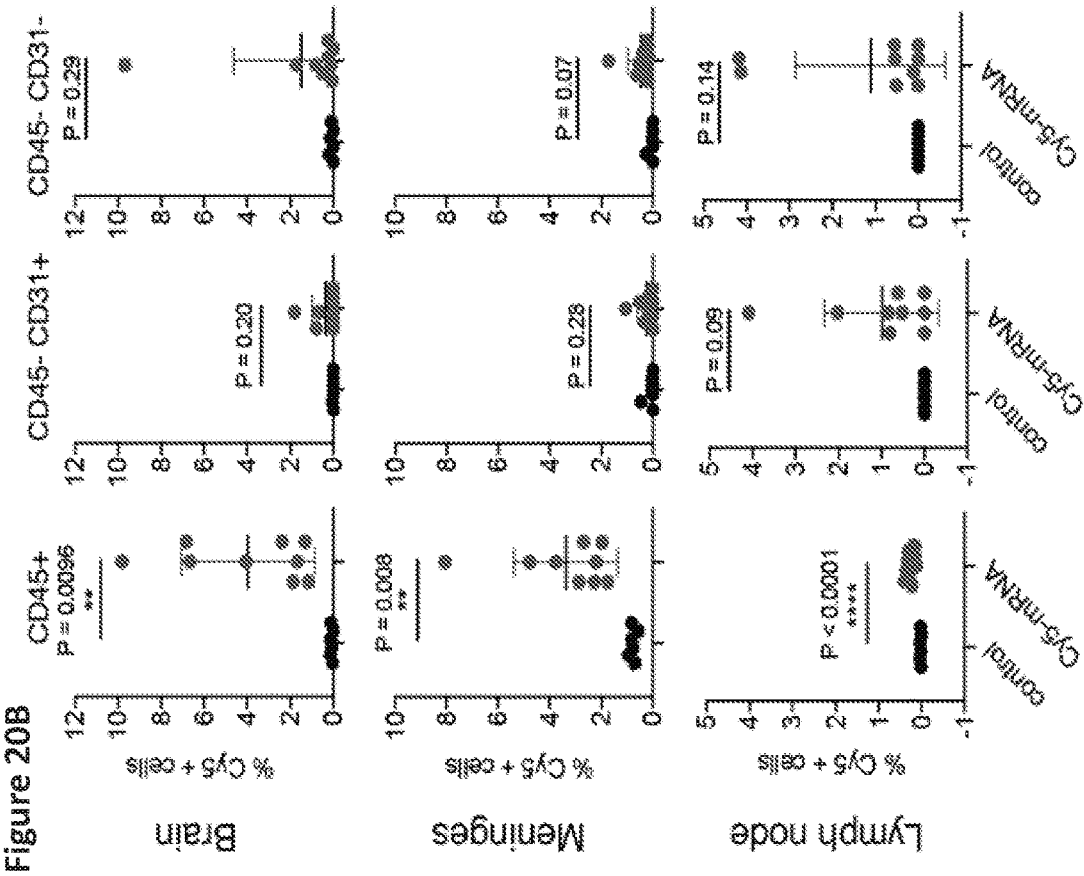
Figure 20B
Figure 20C

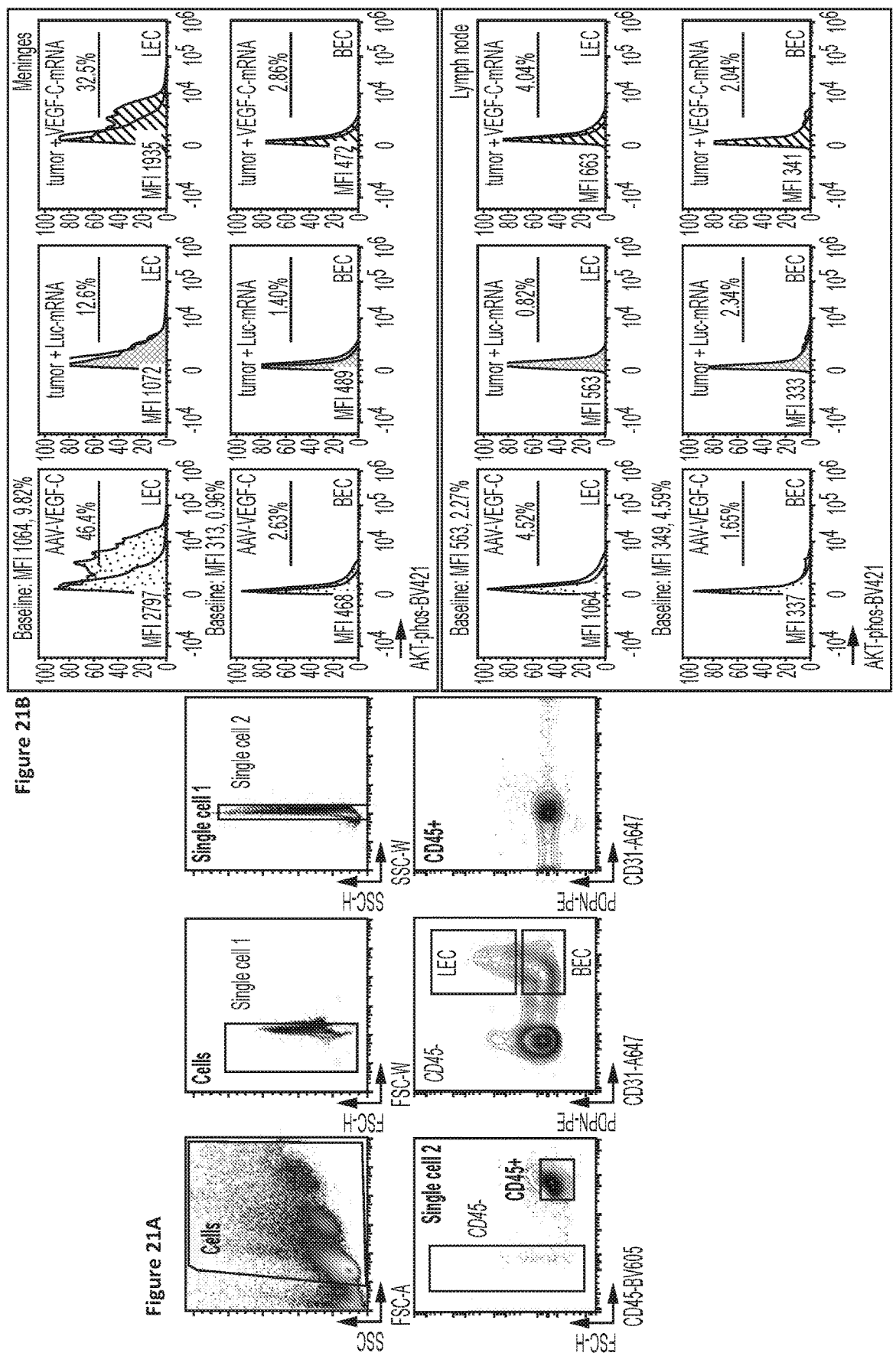

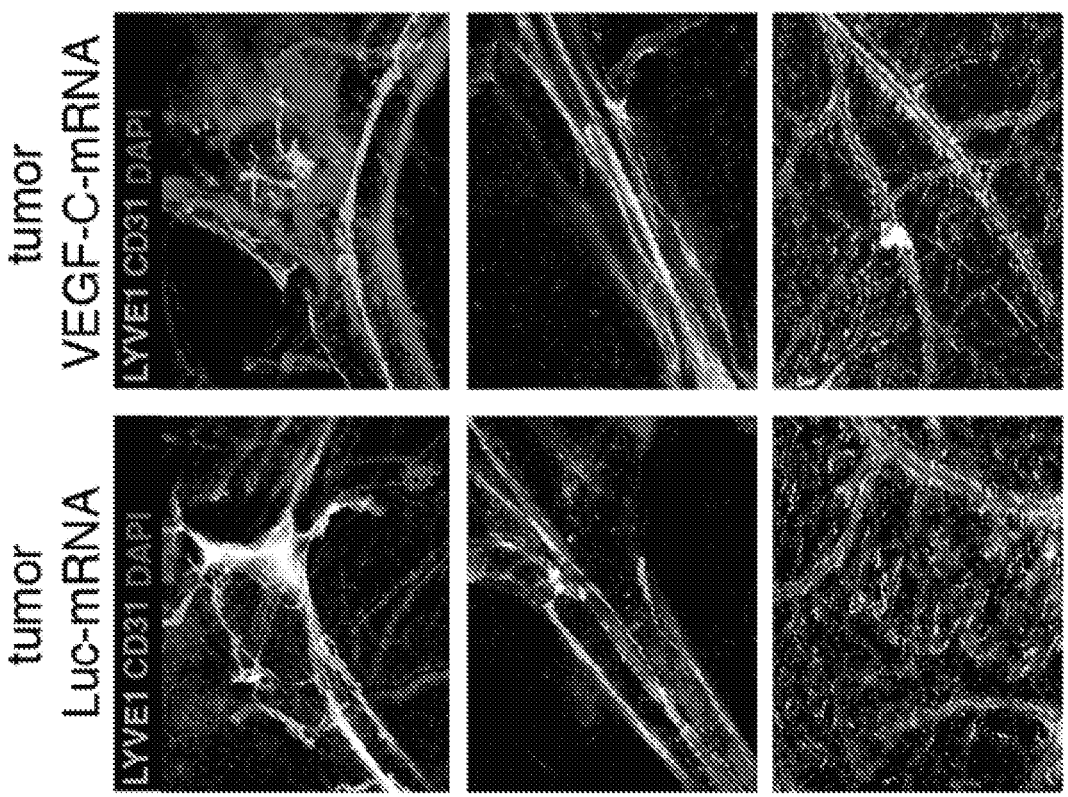
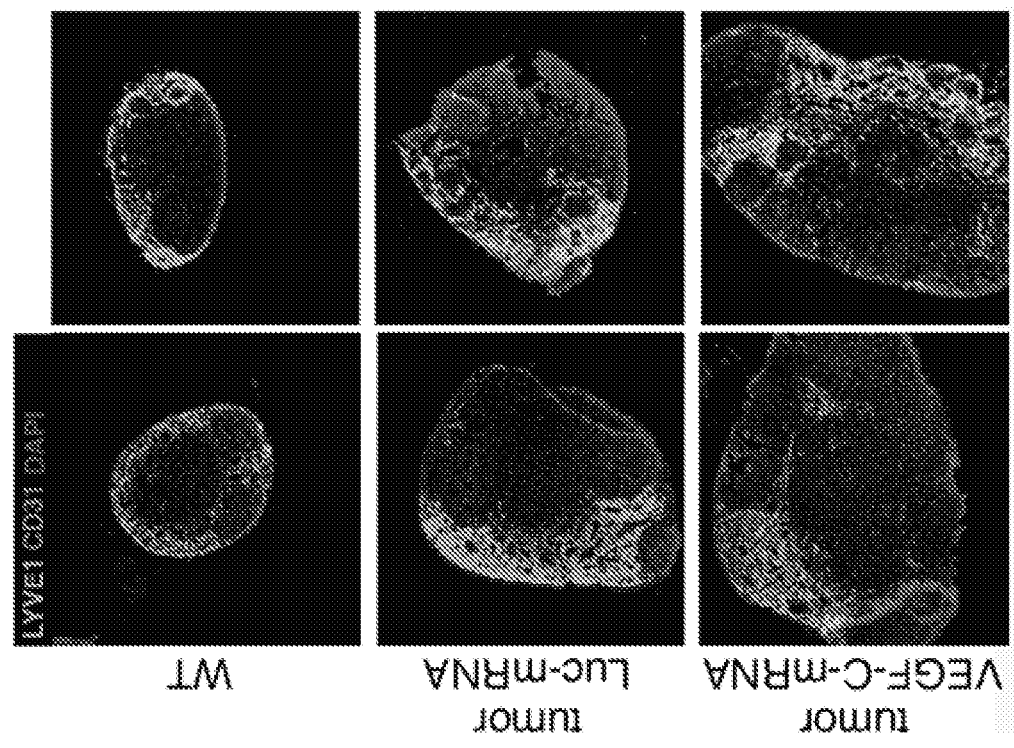

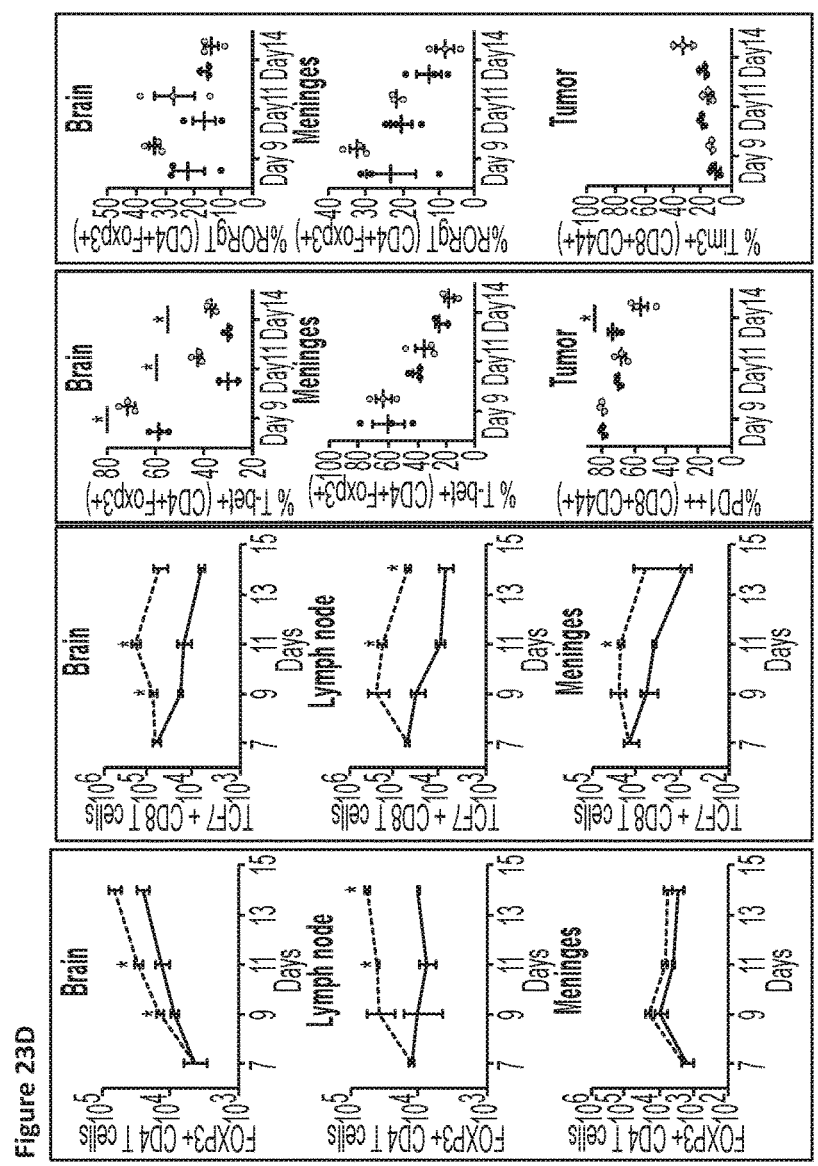
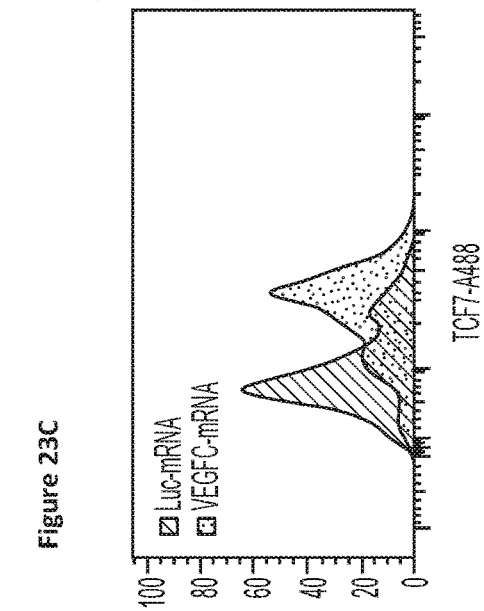
Figure 23D
Figure 23C

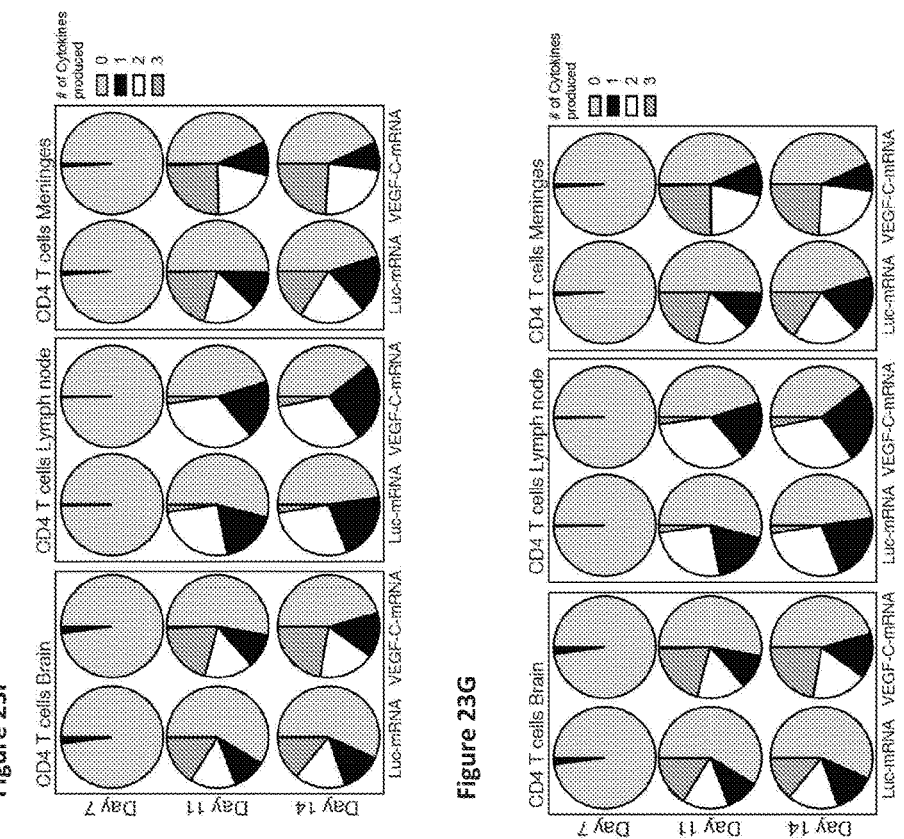
Figure 23E
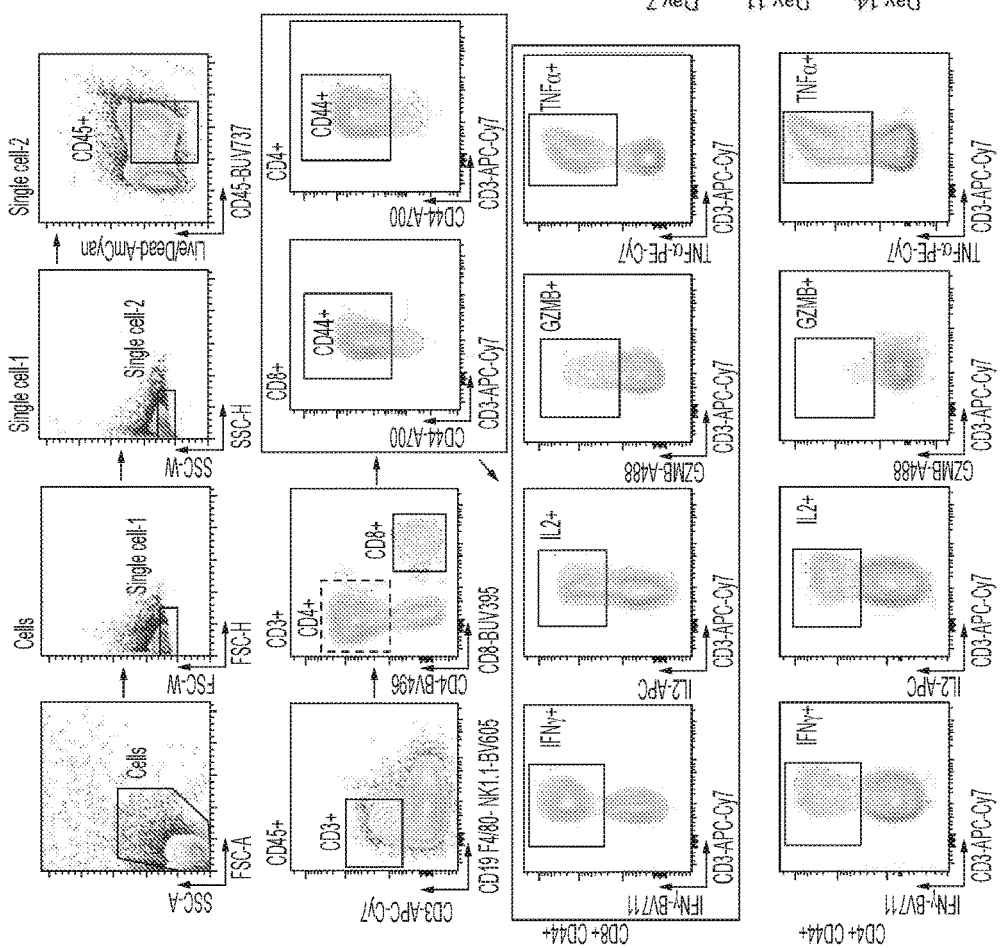
Figure 23F
Figure 23G

Figure 23I
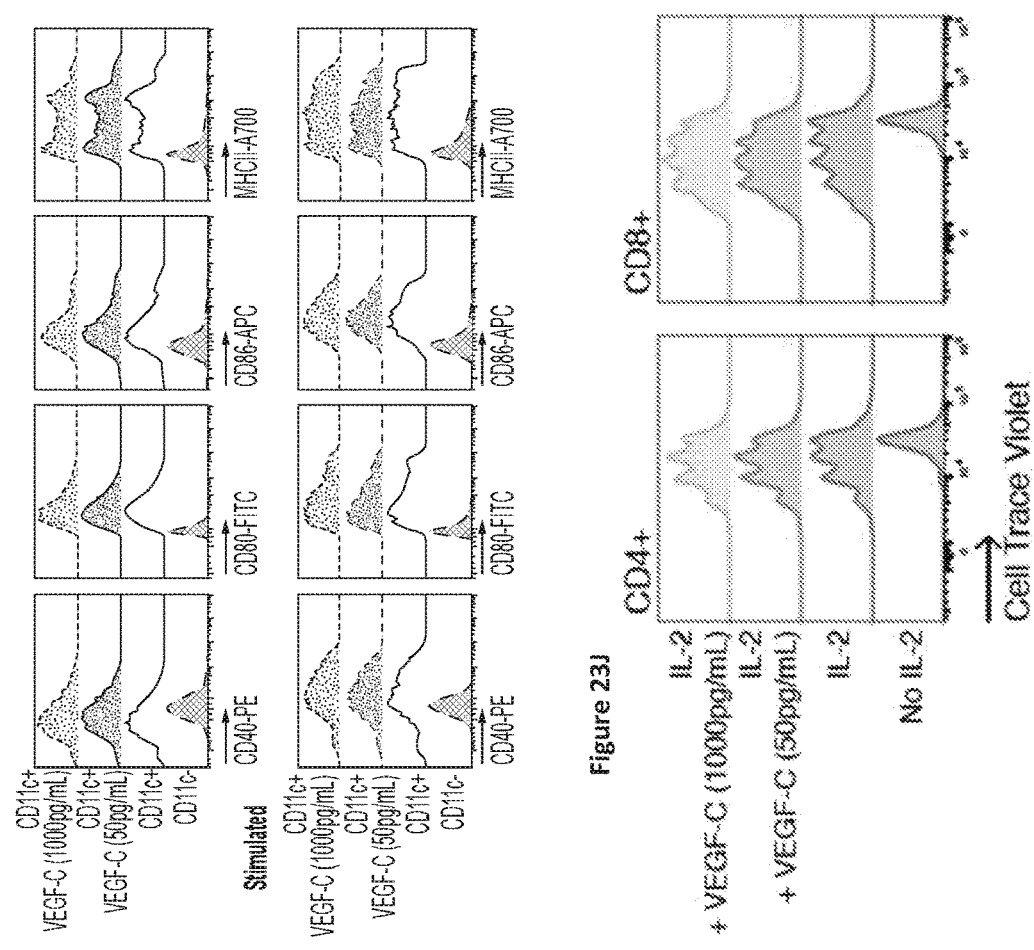
Figure 23J
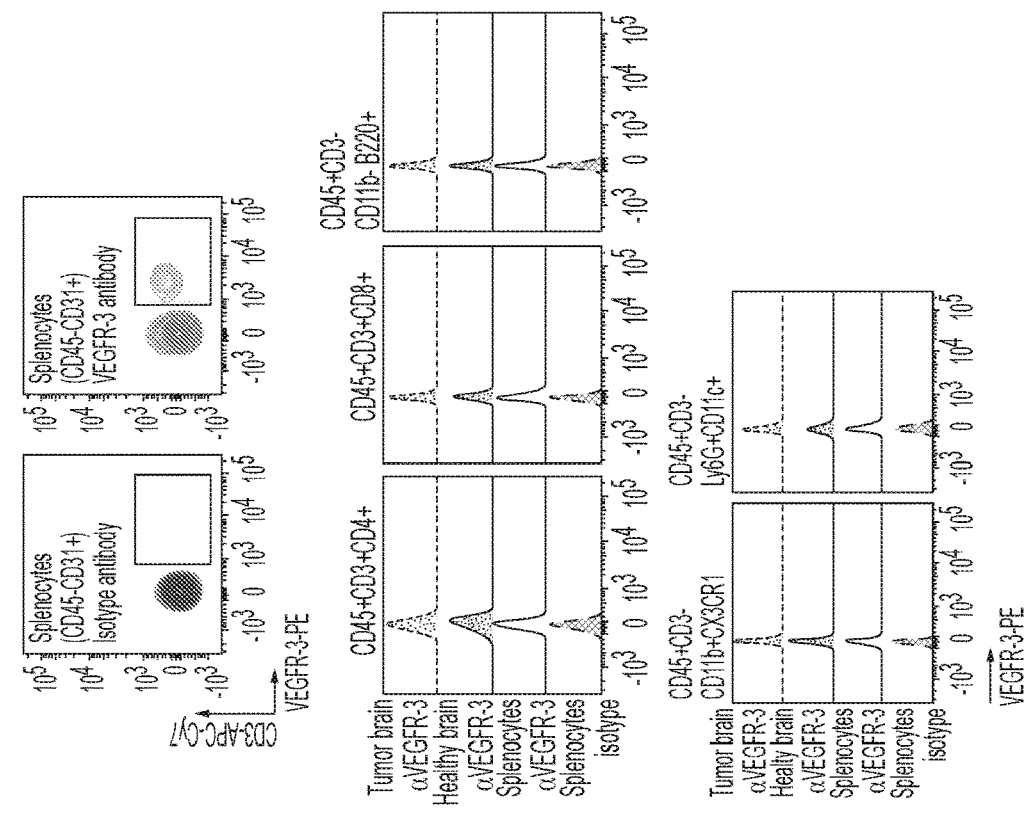
Figure 23H

SEQUENCE LISTING

```
<160> NUMBER OF SEQ ID NOS: 13

<210> SEQ ID NO 1
<211> LENGTH: 450
<212> TYPE: PRT
<213> ORGANISM: Homo sapiens

<400> SEQUENCE: 1

Met His Leu Leu Gly Phe Phe Ser Val Ala Cys Ser Leu Leu Ala Ala
1               5                   10                  15

Ala Leu Leu Pro Gly Pro Arg Glu Ala Pro Ala Ala Ala Ala Phe
            20                  25                  30

Glu Ser Gly Leu Asp Leu Ser Asp Ala Glu Pro Asp Ala Gly Glu Ala
        35                  40                  45
```

```
Thr Ala Tyr Ala Ser Lys Asp Leu Glu Glu Gln Leu Arg Ser Val Ser
 50              55                  60
Ser Val Asp Glu Leu Met Thr Val Leu Tyr Pro Glu Tyr Trp Lys Met
 65              70                  75                      80
Tyr Lys Cys Gln Leu Arg Lys Gly Gly Trp Gln His Asn Arg Glu Gln
                 85                  90                  95
Ala Asn Leu Asn Ser Arg Thr Glu Glu Thr Ile Lys Phe Ala Ala Ala
                100                 105                 110
His Tyr Asn Thr Glu Ile Leu Lys Ser Ile Asp Asn Glu Trp Arg Lys
                115                 120                 125
Thr Gln Cys Met Pro Arg Glu Val Cys Ile Asp Val Gly Lys Glu Phe
130                 135                 140
Gly Val Ala Thr Asn Thr Phe Phe Lys Pro Pro Cys Val Ser Val Tyr
145                 150                 155                 160
Arg Cys Gly Gly Cys Cys Asn Ser Glu Gly Leu Gln Cys Met Asn Thr
                165                 170                 175
Ser Thr Ser Tyr Leu Ser Lys Thr Leu Phe Glu Ile Thr Val Pro Leu
                180                 185                 190
Ser Gln Gly Pro Lys Pro Val Thr Ile Ser Phe Ala Asn His Thr Ser
    195                 200                 205
Cys Arg Cys Met Ser Lys Leu Asp Val Tyr Arg Gln Val His Ser Ile
210                 215                 220
Ile Arg Arg Ser Leu Pro Ala Thr Leu Pro Gln Cys Gln Ala Ala Asn
225                 230                 235                 240
Lys Thr Cys Pro Thr Asn Tyr Met Trp Asn Asn His Ile Cys Arg Cys
                245                 250                 255
Leu Ala Gln Glu Asp Phe Met Phe Ser Ser Asp Ala Gly Asp Asp Ser
                260                 265                 270
Thr Asp Gly Phe His Asp Ile Cys Gly Pro Asn Lys Glu Leu Asp Glu
                275                 280                 285
Glu Thr Cys Gln Cys Val Cys Arg Ala Gly Leu Arg Pro Ala Ser Cys
    290                 295                 300
Gly Pro His Lys Glu Leu Asp Arg Asn Ser Cys Gln Cys Val Cys Lys
305                 310                 315                 320
Asn Lys Leu Phe Pro Ser Gln Cys Gly Ala Asn Arg Glu Phe Asp Glu
                325                 330                 335
Asn Thr Cys Gln Cys Val Cys Lys Arg Thr Cys Pro Arg Asn Gln Pro
                340                 345                 350
Leu Asn Pro Gly Lys Cys Ala Cys Glu Cys Thr Glu Ser Pro Gln Lys
                355                 360                 365
Cys Leu Leu Lys Gly Lys Lys Phe His His Gln Thr Cys Ser Cys Tyr
370                 375                 380
Arg Arg Pro Cys Thr Asn Arg Gln Lys Ala Cys Glu Pro Gly Phe Ser
385                 390                 395                 400
Gln Pro Leu Asn Pro Gly Lys Cys Ala Cys Glu Cys Thr Glu Ser Pro
                405                 410                 415
Gln Lys Cys Leu Leu Lys Gly Lys Lys Phe His His Gln Thr Cys Ser
                420                 425                 430
Cys Tyr Arg Arg Pro Cys Thr Asn Arg Gln Lys Ala Cys Glu Pro Gly
                435                 440                 445
Phe Ser
450
```

```
<210> SEQ ID NO 2
<211> LENGTH: 412
<212> TYPE: PRT
<213> ORGANISM: Homo sapiens

<400> SEQUENCE: 2

Met Thr Asp Arg Gln Thr Asp Thr Ala Pro Ser Pro Ser Tyr His Leu
1               5                   10                  15

Leu Pro Gly Arg Arg Thr Val Asp Ala Ala Ser Arg Gly Gln
            20                  25                  30

Gly Pro Glu Pro Ala Pro Gly Gly Val Glu Gly Val Gly Ala Arg
                35                  40                  45

Gly Val Ala Leu Lys Leu Phe Val Gln Leu Leu Gly Cys Ser Arg Phe
    50                  55                  60

Gly Gly Ala Val Val Arg Ala Gly Glu Ala Glu Pro Ser Gly Ala Ala
65                  70                  75                  80

Arg Ser Ala Ser Ser Gly Arg Glu Glu Pro Gln Pro Glu Glu Gly Glu
                85                  90                  95

Glu Glu Glu Glu Lys Glu Glu Glu Arg Gly Pro Gln Trp Arg Leu Gly
                100                 105                 110

Ala Arg Lys Pro Gly Ser Trp Thr Gly Glu Ala Ala Val Cys Ala Asp
            115                 120                 125

Ser Ala Pro Ala Ala Arg Ala Pro Gln Ala Leu Ala Arg Ala Ser Gly
    130                 135                 140

Arg Gly Gly Arg Val Ala Arg Arg Gly Ala Glu Ser Gly Pro Pro
145                 150                 155                 160

His Ser Pro Ser Arg Arg Gly Ser Ala Ser Arg Ala Gly Pro Gly Arg
                165                 170                 175

Ala Ser Glu Thr Met Asn Phe Leu Leu Ser Trp Val His Trp Ser Leu
            180                 185                 190

Ala Leu Leu Leu Tyr Leu His His Ala Lys Trp Ser Gln Ala Ala Pro
    195                 200                 205

Met Ala Glu Gly Gly Gly Gln Asn His His Glu Val Val Lys Phe Met
210                 215                 220

Asp Val Tyr Gln Arg Ser Tyr Cys His Pro Ile Glu Thr Leu Val Asp
225                 230                 235                 240

Ile Phe Gln Glu Tyr Pro Asp Glu Ile Glu Tyr Ile Phe Lys Pro Ser
                245                 250                 255

Cys Val Pro Leu Met Arg Cys Gly Gly Cys Cys Asn Asp Glu Gly Leu
            260                 265                 270

Glu Cys Val Pro Thr Glu Glu Ser Asn Ile Thr Met Gln Ile Met Arg
    275                 280                 285

Ile Lys Pro His Gln Gly Gln His Ile Gly Glu Met Ser Phe Leu Gln
290                 295                 300

His Asn Lys Cys Glu Cys Arg Pro Lys Lys Asp Arg Ala Arg Gln Glu
305                 310                 315                 320

Lys Lys Ser Val Arg Gly Lys Gly Lys Gly Gln Lys Arg Lys Arg Lys
                325                 330                 335

Lys Ser Arg Tyr Lys Ser Trp Ser Val Tyr Val Gly Ala Arg Cys Cys
            340                 345                 350

Leu Met Pro Trp Ser Leu Pro Gly Pro His Pro Cys Gly Pro Cys Ser
    355                 360                 365

Glu Arg Arg Lys His Leu Phe Val Gln Asp Pro Gln Thr Cys Lys Cys
370                 375                 380
```

-continued

Ser Cys Lys Asn Thr Asp Ser Arg Cys Lys Ala Arg Gln Leu Glu Leu
385                 390                 395                 400

Asn Glu Arg Thr Cys Arg Cys Asp Lys Pro Arg Arg
            405                 410

<210> SEQ ID NO 3
<211> LENGTH: 207
<212> TYPE: PRT
<213> ORGANISM: Homo sapiens

<400> SEQUENCE: 3

Met Ser Pro Leu Leu Arg Arg Leu Leu Leu Ala Ala Leu Leu Gln Leu
1               5                   10                  15

Ala Pro Ala Gln Ala Pro Val Ser Gln Pro Asp Ala Pro Gly His Gln
            20                  25                  30

Arg Lys Val Val Ser Trp Ile Asp Val Tyr Thr Arg Ala Thr Cys Gln
        35                  40                  45

Pro Arg Glu Val Val Pro Leu Thr Val Glu Leu Met Gly Thr Val
    50                  55                  60

Ala Lys Gln Leu Val Pro Ser Cys Val Thr Val Gln Arg Cys Gly Gly
65                  70                  75                  80

Cys Cys Pro Asp Asp Gly Leu Glu Cys Val Pro Thr Gly Gln His Gln
                85                  90                  95

Val Arg Met Gln Ile Leu Met Ile Arg Tyr Pro Ser Ser Gln Leu Gly
            100                 105                 110

Glu Met Ser Leu Glu Glu His Ser Gln Cys Glu Cys Arg Pro Lys Lys
        115                 120                 125

Lys Asp Ser Ala Val Lys Pro Asp Arg Ala Ala Thr Pro His His Arg
130                 135                 140

Pro Gln Pro Arg Ser Val Pro Gly Trp Asp Ser Ala Pro Gly Ala Pro
145                 150                 155                 160

Ser Pro Ala Asp Ile Thr His Pro Thr Pro Ala Pro Gly Pro Ser Ala
                165                 170                 175

His Ala Ala Pro Ser Thr Thr Ser Ala Leu Thr Pro Gly Pro Ala Ala
            180                 185                 190

Ala Ala Ala Asp Ala Ala Ala Ser Val Ala Lys Gly Gly Ala
        195                 200                 205

<210> SEQ ID NO 4
<211> LENGTH: 354
<212> TYPE: PRT
<213> ORGANISM: Homo sapiens

<400> SEQUENCE: 4

Met Tyr Arg Glu Trp Val Val Asn Val Phe Met Met Leu Tyr Val
1               5                   10                  15

Gln Leu Val Gln Gly Ser Ser Asn Glu His Gly Pro Val Lys Arg Ser
            20                  25                  30

Ser Gln Ser Thr Leu Glu Arg Ser Glu Gln Gln Ile Arg Ala Ala Ser
        35                  40                  45

Ser Leu Glu Glu Leu Leu Arg Ile Thr His Ser Glu Asp Trp Lys Leu
    50                  55                  60

Trp Arg Cys Arg Leu Arg Leu Lys Ser Phe Thr Ser Met Asp Ser Arg
65                  70                  75                  80

Ser Ala Ser His Arg Ser Thr Arg Phe Ala Ala Thr Phe Tyr Asp Ile
                85                  90                  95

Glu Thr Leu Lys Val Ile Asp Glu Glu Trp Gln Arg Thr Gln Cys Ser
            100                 105                 110

Pro Arg Glu Thr Cys Val Glu Val Ala Ser Glu Leu Gly Lys Ser Thr
        115                 120                 125

Asn Thr Phe Phe Lys Pro Pro Cys Val Asn Val Phe Arg Cys Gly Gly
    130                 135                 140

Cys Cys Asn Glu Glu Ser Leu Ile Cys Met Asn Thr Ser Thr Ser Tyr
145                 150                 155                 160

Ile Ser Lys Gln Leu Phe Glu Ile Ser Val Pro Leu Thr Ser Val Pro
            165                 170                 175

Glu Leu Val Pro Val Lys Val Ala Asn His Thr Gly Cys Lys Cys Leu
        180                 185                 190

Pro Thr Ala Pro Arg His Pro Tyr Ser Ile Ile Arg Arg Ser Ile Gln
    195                 200                 205

Ile Pro Glu Glu Asp Arg Cys Ser His Ser Lys Lys Leu Cys Pro Ile
210                 215                 220

Asp Met Leu Trp Asp Ser Asn Lys Cys Lys Cys Val Leu Gln Glu Glu
225                 230                 235                 240

Asn Pro Leu Ala Gly Thr Glu Asp His Ser His Leu Gln Glu Pro Ala
            245                 250                 255

Leu Cys Gly Pro His Met Met Phe Asp Glu Asp Arg Cys Glu Cys Val
        260                 265                 270

Cys Lys Thr Pro Cys Pro Lys Asp Leu Ile Gln His Pro Lys Asn Cys
    275                 280                 285

Ser Cys Phe Glu Cys Lys Glu Ser Leu Glu Thr Cys Cys Gln Lys His
290                 295                 300

Lys Leu Phe His Pro Asp Thr Cys Ser Cys Glu Asp Arg Cys Pro Phe
305                 310                 315                 320

His Thr Arg Pro Cys Ala Ser Gly Lys Thr Ala Cys Ala Lys His Cys
            325                 330                 335

Arg Phe Pro Lys Glu Lys Arg Ala Ala Gln Gly Pro His Ser Arg Lys
        340                 345                 350

Asn Pro

<210> SEQ ID NO 5
<211> LENGTH: 1248
<212> TYPE: DNA
<213> ORGANISM: Homo sapiens

<400> SEQUENCE: 5
atgcacttgc tgtgcttctt gtctctggcg tgttccctgc tcgccgctgc gctgatcccc      60
agtccgcgcg aggcgcccgc caccgtcgcc gccttcgagt cgggactggg cttctcggaa     120
gcggagcccg acgggggcga ggtcaaggct tttgaaggca agacctgga ggagcagttg      180 cggtctgtgt ccagcgtaga tgagctgatg tctgtcctgt acccagacta ctggaaaatg     240
tacaagtgcc agctgcggaa aggcggctgg cagcagccca ccctcaatac caggacaggg    300
gacagtgtaa aatttgctgc tgcacattat aacacagaga tcctgaaaag tattgataat    360
gagtggagaa agactcaatg catgccacgt gaggtgtgta tagatgtggg gaaggagttt    420
ggagcagcca caaacacctt ctttaaacct ccatgtgtgt ccgtctacag atgtgggggt    480
tgctgcaaca gcgaggggct gcagtgcatg aacaccagca aggttaccct cagcaagacg    540
ttgtttgaaa ttacagtgcc tctctcacaa ggccccaaac cagtcacaat cagttttgcc    600
aatcacactt cctgccggtg catgtctaaa ctggatgttt acagacaagt tcattcaatt    660

| | | | |
|---|---|---|---|
| attagacgtt ctctgccagc aacattacca cagtgtcagg cagctaacaa gacatgtcca | 720 |
| acaaactatg tgtggaataa ctacatgtgc cgatgcctgg ctcagcagga ttttatcttt | 780 |
| tattcaaatg ttgaagatga ctcaaccaat ggattccatg atgtctgtgg acccaacaag | 840 |
| gagctggatg aagacacctg tcagtgtgtc tgcaaggggg ggcttcggcc atctagttgt | 900 |
| ggaccccaca agaactaga tagagactca tgtcagtgtg tctgtaaaaa caaactttc | 960 |
| cctaattcat gtggagccaa cagggaattt gatgagaata catgtcagtg tgtatgtaaa | 1020 |
| agaacgtgtc caagaaatca gcccctgaat cctgggaaat gtgcctgtga atgtacagaa | 1080 |
| aacacacaga agtgcttcct taaagggaag aagttccacc atcaaacatg cagttgttac | 1140 |
| agaagaccgt gtgcgaatcg actgaagcat tgtgatccag gactgtcctt tagtgaagaa | 1200 |
| gtatgccgct gtgtcccatc gtattggaaa aggccacatc tgaactaa | 1248 |

<210> SEQ ID NO 6
<211> LENGTH: 1248
<212> TYPE: DNA
<213> ORGANISM: Homo sapiens

<400> SEQUENCE: 6

| | |
|---|---|
| atgcacttgc tgtgcttctt gtctctggcg tgttccctgc tcgccgctgc gctgatcccc | 60 |
| agtccgcgcg aggcgcccgc caccgtcgcc gccttcgagt cgggactggg cttctcggaa | 120 |
| gcggagcccg acggggcga ggtcaaggct tttgaaggca agacctgga ggagcagttg | 180 |
| cggtctgtgt ccagcgtaga tgagctgatg tctgtcctgt acccagacta ctggaaaatg | 240 |
| tacaagtgcc agctgcggaa aggcggctgg cagcagccca ccctcaatac caggacaggg | 300 |
| gacagtgtaa aatttgctgc tgcacattat aacacagaga tcctgaaaag tattgataat | 360 |
| gagtggagaa agactcaatg catgccacgt gaggtgtgta tagatgtggg gaaggagttt | 420 |
| ggagcagcca caaacacctt ctttaaacct ccatgtgtgt ccgtctacag atgtggggt | 480 |
| tgctgcaaca gcgaggggct gcagtgcatg aacaccagca caggttacct cagcaagacg | 540 |
| ttgtttgaaa ttacagtgcc ctctctcaca ggccccaaac cagtcacaat cagttttgcc | 600 |
| aatcacactt cctgccggtg catgtctaaa ctggatgttt acagacaagt tcattcaatt | 660 |
| attagacgtt ctctgccagc aacattacca cagtgtcagg cagctaacaa gacatgtcca | 720 |
| acaaactatg tgtggaataa ctacatgtgc cgatgcctgg ctcagcagga ttttatcttt | 780 |
| tattcaaatg ttgaagatga ctcaaccaat ggattccatg atgtctgtgg acccaacaag | 840 |
| gagctggatg aagacacctg tcagtgtgtc tgcaaggggg ggcttcggcc atctagttgt | 900 |
| ggaccccaca agaactaga tagagactca tgtcagtgtg tctgtaaaaa caaactttc | 960 |
| cctaattcat gtggagccaa cagggaattt gatgagaata catgtcagtg tgtatgtaaa | 1020 |
| agaacgtgtc caagaaatca gcccctgaat cctgggaaat gtgcctgtga atgtacagaa | 1080 |
| aacacacaga agtgcttcct taaagggaag aagttccacc atcaaacatg cagttgttac | 1140 |
| agaagaccgt gtgcgaatcg actgaagcat tgtgatccag gactgtcctt tagtgaagaa | 1200 |
| gtatgccgct gtgtcccatc gtattggaaa aggccacatc tgaactaa | 1248 |

<210> SEQ ID NO 7
<211> LENGTH: 1236
<212> TYPE: DNA
<213> ORGANISM: Homo sapiens

<400> SEQUENCE: 7

| | |
|---|---|
| ctgacggaca gacagacaga caccgccccc agccccagct accacctcct ccccggccgg | 60 |
| cggcggacag tggacgcggc ggcgagccgc gggcaggggc cggagcccgc gcccggaggc | 120 |
| ggggtggagg gggtcggggc tcgcggcgtc gcactgaaac ttttcgtcca acttctgggc | 180 |
| tgttctcgct tcggaggagc cgtggtccgc gcggggaag ccgagccgag cggagccgcg | 240 |
| agaagtgcta gctcgggccg ggaggagccg cagccggagg agggggagga ggaagaagag | 300 |
| aaggaagagg agaggggggcc gcagtggcga ctcggcgctc ggaagccggg ctcatggacg | 360 |
| ggtgaggcgg cggtgtgcgc agacagtgct ccagccgcgc gcgctcccca ggccctggcc | 420 |
| cgggcctcgg gccggggagg aagagtagct cgccgaggcg ccgaggagag cgggccgccc | 480 |
| cacagcccga gccggagagg gagcgcgagc cgcgccggcc ccggtcgggc ctccgaaacc | 540 |
| atgaactttc tgctgtcttg ggtgcattgg agccttgcct tgctgctcta cctccaccat | 600 |
| gccaagtggt cccaggctgc acccatggca gaaggaggag ggcagaatca tcacgaagtg | 660 |
| gtgaagttca tggatgtcta tcagcgcagc tactgccatc caatcgagac cctggtggac | 720 |
| atcttccagg agtaccctga tgagatcgag tacatcttca gccatcctg tgtgcccctg | 780 |
| atgcgatgcg ggggctgctg caatgacgag ggcctggagt gtgtgccccac tgaggagtcc | 840 |
| aacatcacca tgcagattat gcggatcaaa cctcaccaag gccagcacat aggagagatg | 900 |
| agcttcctac agcacaacaa atgtgaatgc agaccaaaga agatagagc aagcaagaa | 960 |
| aaaaaatcag ttcgaggaaa gggaaagggg caaaaacgaa agcgcaagaa atcccggtat | 1020 |
| aagtcctgga gcgtgtacgt tggtgcccgc tgctgtctaa tgccctggag cctccctggc | 1080 |
| ccccatccct gtgggccttg ctcagagcgg agaaagcatt tgtttgtaca agatccgcag | 1140 |
| acgtgtaaat gttcctgcaa aaacacagac tcgcgttgca aggcgaggca gcttgagtta | 1200 |
| aacgaacgta cttgcagatg tgacaagccg aggcgg | 1236 |

<210> SEQ ID NO 8
<211> LENGTH: 1236
<212> TYPE: DNA
<213> ORGANISM: Homo sapiens

<400> SEQUENCE: 8

| | |
|---|---|
| ctgacggaca gacagacaga caccgccccc agccccagct accacctcct ccccggccgg | 60 |
| cggcggacag tggacgcggc ggcgagccgc gggcaggggc cggagcccgc gcccggaggc | 120 |
| ggggtggagg gggtcggggc tcgcggcgtc gcactgaaac ttttcgtcca acttctgggc | 180 |
| tgttctcgct tcggaggagc cgtggtccgc gcggggaag ccgagccgag cggagccgcg | 240 |
| agaagtgcta gctcgggccg ggaggagccg cagccggagg agggggagga ggaagaagag | 300 |
| aaggaagagg agaggggggcc gcagtggcga ctcggcgctc ggaagccggg ctcatggacg | 360 |
| ggtgaggcgg cggtgtgcgc agacagtgct ccagccgcgc gcgctcccca ggccctggcc | 420 |
| cgggcctcgg gccggggagg aagagtagct cgccgaggcg ccgaggagag cgggccgccc | 480 |
| cacagcccga gccggagagg gagcgcgagc cgcgccggcc ccggtcgggc ctccgaaacc | 540 |
| atgaactttc tgctgtcttg ggtgcattgg agccttgcct tgctgctcta cctccaccat | 600 |
| gccaagtggt cccaggctgc acccatggca gaaggaggag ggcagaatca tcacgaagtg | 660 |
| gtgaagttca tggatgtcta tcagcgcagc tactgccatc caatcgagac cctggtggac | 720 |
| atcttccagg agtaccctga tgagatcgag tacatcttca gccatcctg tgtgcccctg | 780 |
| atgcgatgcg ggggctgctg caatgacgag ggcctggagt gtgtgccccac tgaggagtcc | 840 |
| aacatcacca tgcagattat gcggatcaaa cctcaccaag gccagcacat aggagagatg | 900 |

```
agcttcctac agcacaacaa atgtgaatgc agaccaaaga aagatagagc aagacaagaa      960
aaaaaatcag ttcgaggaaa gggaaagggg caaaaacgaa agcgcaagaa atcccggtat     1020
aagtcctgga gcgtgtacgt tggtgcccgc tgctgtctaa tgccctggag cctccctggc     1080
ccccatccct gtgggccttg ctcagagcgg agaaagcatt tgtttgtaca agatccgcag     1140
acgtgtaaat gttcctgcaa aaacacagac tcgcgttgca aggcgaggca gcttgagtta     1200
aacgaacgta cttgcagatg tgacaagccg aggcgg                               1236

<210> SEQ ID NO 9
<211> LENGTH: 435
<212> TYPE: DNA
<213> ORGANISM: Homo sapiens

<400> SEQUENCE: 9
gtctcccagc ctgatgcccc tggccaccag aggaaagtgg tgtcatggat agatgtgtat       60
actcgcgcta cctgccagcc ccgggaggtg gtggtgccct tgactgtgga gctcatgggc      120
accgtggcca acagctggt gcccagctgc gtgactgtgc agcgctgtgg tggctgctgc        180
cctgacgatg gcctggagtg tgtgcccact gggcagcacc aagtccggat gcagatcctc      240
atgatccggt acccgagcag tcagctgggg gagatgtccc tggaagaaca cagccagtgt      300
gaatgcagac taaaaaaaaa ggacagtgct gtgaagccag acagggctgc cactccccac      360
caccgtcccc agcccgttc tgttccgggc tgggactctg ccccggagc accctcccca        420 gctgacatca cccat                                                      435

<210> SEQ ID NO 10
<211> LENGTH: 435
<212> TYPE: DNA
<213> ORGANISM: Homo sapiens

<400> SEQUENCE: 10
gtctcccagc ctgatgcccc tggccaccag aggaaagtgg tgtcatggat agatgtgtat       60
actcgcgcta cctgccagcc ccgggaggtg gtggtgccct tgactgtgga gctcatgggc      120
accgtggcca acagctggt gcccagctgc gtgactgtgc agcgctgtgg tggctgctgc        180
cctgacgatg gcctggagtg tgtgcccact gggcagcacc aagtccggat gcagatcctc      240
atgatccggt acccgagcag tcagctgggg gagatgtccc tggaagaaca cagccagtgt      300
gaatgcagac taaaaaaaaa ggacagtgct gtgaagccag acagggctgc cactccccac      360
caccgtcccc agcccgttc tgttccgggc tgggactctg ccccggagc accctcccca        420 gctgacatca cccat                                                      435

<210> SEQ ID NO 11
<211> LENGTH: 1062
<212> TYPE: DNA
<213> ORGANISM: Homo sapiens

<400> SEQUENCE: 11
atgtacagag agtgggtagt ggtgaatgtt tcatgatgt tgtacgtcca gctggtgcag        60
ggctccagta atgaacatgg accagtgaag cgatcatctc agtccacatt ggaacgatct      120
gaacagcaga tcagggctgc ttctagtttg gaggaactac ttcgaattac tcactctgag      180
gactggaagc tgtggagatg caggctgagg ctcaaaagtt ttaccagtat ggactctcgc      240
tcagcatccc atcggtccac taggtttgcg gcaactttct atgacattga aacactaaaa      300
```

```
gttatagatg aagaatggca agaactcag tgcagccta gagaaacgtg cgtggaggtg      360
gccagtgagc tggggaagag taccaacaca ttcttcaagc ccccttgtgt gaacgtgttc      420
cgatgtggtg gctgttgcaa tgaagagagc cttatctgta tgaacaccag cacctcgtac      480
atttccaaac agctctttga gatatcagtg cctttgacat cagtacctga attagtgcct      540
gttaaagttg ccaatcatac aggttgtaag tgcttgccaa cagcccccg ccatccatac      600 tcaattatca gaagatccat ccagatccct gaagaagatc gctgttccca ttccaagaaa      660
ctctgtccta ttgacatgct atgggatagc aacaaatgta atgtgtttt gcaggaggaa      720 aatccacttg ctggaacaga agaccactct catctccagg aaccagctct ctgtgggcca      780
cacatgatgt ttgacgaaga tcgttgcgag tgtgtctgta aaacaccatg tcccaaagat      840
ctaatccagc accccaaaaa ctgcagttgc tttgagtgca agaaagtct ggagacctgc      900 tgccagaagc acaagctatt tcacccagac acctgcagct gtgaggacag atgccccttt      960
cataccagac catgtgcaag tggcaaaaca gcatgtgcaa agcattgccg ctttccaaag     1020
gagaaagggg ctgcccaggg gccccacagc cgaaagaatc ct                        1062

<210> SEQ ID NO 12
<211> LENGTH: 1062
<212> TYPE: DNA
<213> ORGANISM: Homo sapiens

<400> SEQUENCE: 12
atgtacagag agtgggtagt ggtgaatgtt ttcatgatgt tgtacgtcca gctggtgcag       60
ggctccagta atgaacatgg accagtgaag cgatcatctc agtccacatt ggaacgatct      120
gaacagcaga tcagggctgc ttctagtttg gaggaactac ttcgaattac tcactctgag      180
gactggaagc tgtggagatg caggctgagg ctcaaaagtt ttaccagtat ggactctcgc      240
tcagcatccc atcggtccac taggtttgcg gcaactttct atgacattga aacactaaaa      300
gttatagatg aagaatggca agaactcag tgcagccta gagaaacgtg cgtggaggtg       360
gccagtgagc tggggaagag taccaacaca ttcttcaagc ccccttgtgt gaacgtgttc      420
cgatgtggtg gctgttgcaa tgaagagagc cttatctgta tgaacaccag cacctcgtac      480
atttccaaac agctctttga gatatcagtg cctttgacat cagtacctga attagtgcct      540
gttaaagttg ccaatcatac aggttgtaag tgcttgccaa cagcccccg ccatccatac      600 tcaattatca gaagatccat ccagatccct gaagaagatc gctgttccca ttccaagaaa      660
ctctgtccta ttgacatgct atgggatagc aacaaatgta atgtgtttt gcaggaggaa      720 aatccacttg ctggaacaga agaccactct catctccagg aaccagctct ctgtgggcca      780
cacatgatgt ttgacgaaga tcgttgcgag tgtgtctgta aaacaccatg tcccaaagat      840
ctaatccagc accccaaaaa ctgcagttgc tttgagtgca agaaagtct ggagacctgc      900 tgccagaagc acaagctatt tcacccagac acctgcagct gtgaggacag atgccccttt      960
cataccagac catgtgcaag tggcaaaaca gcatgtgcaa agcattgccg ctttccaaag     1020
gagaaagggg ctgcccaggg gccccacagc cgaaagaatc ct                        1062

<210> SEQ ID NO 13
<211> LENGTH: 8
<212> TYPE: PRT
<213> ORGANISM: Artificial sequence
```

```
<220> FEATURE:
<223> OTHER INFORMATION: Homo sapiens p15E protein

<400> SEQUENCE: 13

Lys Ser Pro Trp Phe Thr Thr Leu
1               5
```

MANIPULATION OF MENINGEAL LYMPHATIC VASCULATURE FOR BRAIN AND CNS TUMOR THERAPY

CROSS-REFERENCE TO RELATED APPLICATIONS

This application is a U.S. National Phase application under 35 U.S.C. § 371 of International Patent Application No. PCT/US2019/061624, filed on Nov. 15, 2019, which claims priority to U.S. Provisional Application No. 62/768,390, filed Nov. 16, 2018, which application is herein incorporated by reference in its entirety, and U.S. Provisional Application No. 62/929,527, filed on Nov. 1, 2019, which application is herein incorporated by reference in its entirety.

SEQUENCE LISTING

This application contains a Sequence Listing which has been submitted in ASCII format via EFS-Web and is hereby incorporated by reference herein in its entirety. The ASCII text file created on Nov. 14, 2019 is named Yale23sequence_ST25.txt and is 24,080 bytes in size.

FIELD OF THE INVENTION

The invention relates to methods and compositions for inducing lymphangiogenesis in a tumor in the brain or central nervous system.

BACKGROUND

With more than 15,000 newly diagnosed patients in the U.S. each year, glioblastoma multiforme (also referred to herein as glioblastoma or GBM) accounts for over half of all primary brain tumors and roughly 20% of all CNS tumors [1]. Less than 5% of patients survive for 5 years after initial diagnosis. Despite the countless clinical trials conducted to eradicate these pervasive tumors, innovation in effective treatment has remained stagnant in the last four decades [2]. Only four drugs have been approved in the past 30 years, with the current standard treatments limited to surgery, radiation and chemotherapy. Glioblastoma is in effect universally recurrent. The standard of care for glioblastoma (e.g., surgical resection, radiation and chemotherapy) still leaves patients' median survival at 15 months with a five-year survival rate of less than 10% [1-3].

Recent successes of checkpoint inhibitor therapies are dramatically changing the approach to cancer therapy. Significant efforts are underway to predict which patients will benefit most from these therapies. Possible mechanisms underlying differences in patient response have been reported. Patients with chromosomal instability have a significant immune response once the checkpoint inhibitors are introduced because of the creation of neoantigens [4-6]. Tumor and microbiota microenvironments are shown to cause changes in the access of different immune cells into the tumor parenchyma [7,8]. Immunotherapy strategies have become the standard approach for treating melanoma and lung cancer [9-12]. The efficacy of these therapies for brain tumors, however, has mixed results [13,14].

GBM may be resistant to immunotherapy because the brain is an immune privileged organ. The classic experiments establishing the brain as an immune privileged organ introduced foreign tissue grafts or heat killed bacteria into the skin and the brain of animals [15-17]. This resulted in rapid induction of a proinflammatory T cell response in the skin, but a lack of T cell response in the CNS and prolonged tissue engraftment in the brain. Conversely, research looking at multiple sclerosis and neurotropic viruses has displayed significant autoimmune activity against myelin basic protein and antiviral responses in the CNS respectively, suggesting that the brain is not as immune privileged as once thought [18-28]. The leading hypothesis for how the brain was able to invoke such an immune response was that a non-traditional "glymphatic" system was predominantly contributing to antigen sampling from the brain [29-31]. However, the paradigm of immune surveillance in the brain has changed in recent years with the discovery of a lymphatic network in the dura [32-36]. Even with the lymphatic vasculature presence, the immunosurveillance of the brain appears to significantly differ compared to other organs and the rules of how immune cells respond to antigens in the CNS are still largely unknown. Brain tumors may also be considered to be "cold tumors" that are resistant to immunotherapy. Finally, immune cells that can reach brain tumors are often "exhausted", or ineffective.

There is minimal evidence that immunotherapy, such as dendritic cell vaccines, CAR T cell therapies and immune checkpoint inhibitors, are effective in patients with GBM [13, 14, 43, 44]. It is noted that less than 2% of drugs in general cross the blood-brain barrier, providing further challenges to treating patients with brain cancer.

SUMMARY OF THE INVENTION

There is a need to provide improved treatment to a patient with a cancer in the brain or the CNS, such as a patient with GBM.

In one aspect is provided a method of inducing lymphangiogenesis in the brain or central nervous system of a subject in need thereof, the method comprising administering to the subject an effective amount of a lymphangiogenesis inducer.

In one aspect is provided a method of inducing lymphangiogenesis in a tumor in the brain or central nervous system of a subject in need thereof, the method comprising administering to the subject an effective amount of a lymphangiogenesis inducer.

In another aspect is provided a method of treating a cancer in a subject in need thereof, the method comprising administering to the subject an effective amount of a lymphangiogenesis inducer, wherein the cancer is in the brain or the central nervous system of the subject.

In some embodiments of the above aspects, the method comprises administering an immunotherapeutic agent. In some embodiments, the method does not comprise administering a tumor-specific antigen to the subject. In some embodiments, the lymphangiogenesis inducer is the lymphangiogenesis inducer is VEGFA, VEGFB, VEGFC or VEGFD. In some embodiments, the lymphangiogenesis inducer is VEGFC. In some embodiments, the lymphangiogenesis inducer is administered as a protein.

In some embodiments, the lymphangiogenesis inducer is administered as a polynucleotide molecule encoding the lymphangiogenesis inducer protein. In some embodiments, the polynucleotide molecule encoding the lymphangiogenesis inducer is a mRNA. In some embodiments, the polynucleotide molecule encoding the lymphangiogenesis inducer is comprised within a viral vector.

In some embodiments, the polynucleotide molecule encoding the lymphangiogenesis inducer is comprised within, attached to, or electrostatically bound to a liposome, a nanoparticle or a polymer. In some embodiments, the nanoparticle is a nanosphere. In some embodiments, the polymer is dextran, poly (amine-co-ester), poly(beta-amino-ester), polyethylenimine, poly-L-Lysine, polyethylene glycol, or dendrimers. In some embodiments, the polynucleotide molecule encoding the lymphangiogenesis inducer is comprised within a recombinant viral particle or within a VLP.

In various embodiments, the recombinant viral particle is derived from a herpes virus, a cytomegalovirus, a poliovirus, an alphavirus, a vaccinia virus, a rabies virus, an adeno-associated virus (AAV), a retrovirus or an adenovirus. The retrovirus may be a lentivirus. The recombinant viral particle may be derived from an adeno-associated virus (AAV). In some embodiments, the AAV is AAV2, AAV5, or AAV9.

In various embodiments, the polynucleotide molecule encoding the lymphangiogenesis inducer comprises a modified nucleotide such as 5-methyl-cytosine and pseudo-uridine substitutions that can increase stability, decrease deamination, decrease nuclease activity, decrease innate recognition, or increase translation efficiency of the polynucleotide molecule. In some embodiments, the modified nucleotide a 5-methyl-cytosine or a pseudo-uridine. In some embodiments, the polynucleotide molecule encoding the lymphangiogenesis inducer comprises a 5' cap. In some embodiments, the immunotherapeutic agent is an immune checkpoint inhibitor. The immune checkpoint inhibitor may target PD-1, PD-L1, CTLA-4, TIGIT, TIM-3, LAG-3, BTLA, GITR, 4-1BB, or Ox-40. The immune checkpoint inhibitor may be an anti-PD-1 antibody, an anti-PD-L1 antibody, an anti-CTLA-4 antibody, an anti-TIGIT antibody, an anti-TIM-3 antibody, an anti-LAG-3 antibody, an anti-BTLA antibody, an anti-GITR antibody, an anti-4-1BB antibody or an anti-Ox-40 antibody. In some embodiments, the immune checkpoint inhibitor is an anti-PD-1 antibody. In some embodiments, the immune checkpoint inhibitor is an anti-4-1BB antibody. In some embodiments, the immune checkpoint inhibitor is an anti-TIM3 antibody. In some embodiments, the immunotherapeutic agent comprises an anti-PD-1 antibody and an anti-4-1BB antibody. In some embodiments, the immunotherapeutic agent comprises an anti-PD-1 antibody and an anti-TIM3 antibody.

In various embodiments, the lymphangiogenesis inducer and the immunotherapeutic agent are administered conjointly. In some embodiments, the lymphangiogenesis inducer and the immunotherapeutic agent are administered in the same composition. In some embodiments, the lymphangiogenesis inducer and the immunotherapeutic agent are administered sequentially.

In various embodiments, the lymphangiogenesis inducer is administered prior to administering the immunotherapeutic agent. In some embodiments, the lymphangiogenesis inducer is a recombinant AAV vector encoding VEGF, which is administered about 4-8 weeks prior to administering the immunotherapeutic agent. In some embodiments, the lymphangiogenesis inducer is a mRNA encoding VEGF, which is administered about 2-6 hours prior to administering the immunotherapeutic agent.

In various embodiments, the lymphangiogenesis inducer is administered intrathecally, intratumorally, intracisternally, or systemically. In various embodiments, the immunotherapeutic agent is administered systemically. In various embodiments, the immunotherapeutic agent is administered intrathecally. The immunotherapeutic agent may be administered to the cisterna magna or directly into the lymphatic system.

In various embodiments, the method further comprises administering an additional anti-cancer treatment to the subject. In some embodiments, the additional anti-cancer treatment is selected from surgery, radiation therapy, administration of a chemotherapeutic agent, an immunotherapy, and any combinations thereof. In some embodiments, the cancer is selected from glioma, ependymoma, subependymoma, primitive neuroectodermal tumor, ganglioglioma, Schwannoma, germinoma, craniopharyngioma, meningioma embodiments, the method further comprises administering an additional anti-cancer treatment to the, CNS lymphoma, pineal tumor, and rhabdoid tumor. In some embodiments, the glioma is selected from astrocytoma, glioblastoma, oligodendroglioma, brain stem glioma, juvenile pilocytic astrocytoma, and optic nerve glioma.

In various embodiments, the cancer is glioblastoma.

In various embodiments, the subject is a human patient.

In various embodiments, the method is effective to treat the cancer in the subject.

In some embodiments, the method is effective to reduce the volume of a tumor in the brain or the central nervous system of the subject.

In some embodiments, the method is effective to induce lymphangiogenesis in the tumor in the brain or the central nervous system of the subject.

In some embodiments, the method is effective to prime T cells against the tumor in the brain or central nervous system of the subject.

In another aspect is provided a pharmaceutical composition comprising a lymphangiogenesis inducer and an immunotherapeutic agent.

In some embodiments, the lymphangiogenesis inducer is VEGFA, VEGFB, VEGFC or VEGFD. In some embodiments, the lymphangiogenesis inducer is VEGFC. In some embodiments, the lymphangiogenesis inducer is a protein. In some embodiments, the lymphangiogenesis inducer is a polynucleotide molecule encoding the lymphangiogenesis inducer protein. In some embodiments, the polynucleotide molecule encoding the lymphangiogenesis inducer is a mRNA. In some embodiments, the polynucleotide molecule encoding the lymphangiogenesis inducer is comprised within a viral vector.

In some embodiments, the polynucleotide molecule encoding the lymphangiogenesis inducer is comprised within, attached to, or electrostatically bound to a liposome, a nanoparticle or a polymer. In some embodiments, the nanoparticle is a nanosphere. In some embodiments, the polymer is dextran, poly (amine-co-ester), poly(beta-amino-ester), polyethylenimine, poly-L-Lysine, polyethylene glycol, or dendrimers. In some embodiments, the polynucleotide molecule encoding the lymphangiogenesis inducer is comprised within a recombinant viral particle or within a VLP. In some embodiments, the recombinant viral particle is derived from a herpes virus, a cytomegalovirus, a poliovirus, an alphavirus, a vaccinia virus, a rabies virus, an adeno-associated virus (AAV), a retrovirus (e.g., a lentivirus) or an adenovirus. In some embodiments, the recombinant viral particle is derived from an adeno-associated virus (AAV). In some embodiments, the AAV is AAV2, AAV5, or AAV9.

In some embodiments, the polynucleotide molecule encoding the lymphangiogenesis inducer comprises a modified nucleotide such as 5-methyl-cytosine and pseudo-uridine substitutions that can increase stability, decrease deamination, decrease nuclease activity, decrease innate recognition, or increase translation efficiency of the polynucleotide molecule. In some embodiments, the modified nucleotide is a 5-methyl-cytosine or a pseudo-uridine. In some embodiments, the polynucleotide molecule encoding the lymphangiogenesis inducer comprises a 5' cap.

In some embodiments, the immunotherapeutic agent is an immune checkpoint inhibitor. In some embodiments, the immune checkpoint inhibitor targets PD-1, PD-L1, CTLA-4, TIGIT, TIM-3, LAG-3, BTLA, GITR, 4-1BB, or Ox-40. In some embodiments, the immune checkpoint inhibitor is an anti-PD-1 antibody, an anti-PD-L1 antibody, an anti-CTLA-4 antibody, an anti-TIGIT antibody, an anti-TIM-3 antibody, an anti-LAG-3 antibody, an anti-BTLA antibody, an anti-GITR antibody, an anti-4-1BB antibody or an anti-Ox-40 antibody. In some embodiments, the immune checkpoint inhibitor is an anti-PD-1 antibody. In some embodiments, the immune checkpoint inhibitor is an anti-4-1BB antibody. In some embodiments, the immune checkpoint inhibitor is an anti-TIM3 antibody. In some embodiments, the immunotherapeutic agent comprises an anti-PD-1 antibody and an anti-4-1BB antibody. In some embodiments, the immunotherapeutic agent comprises an anti-PD-1 antibody and an anti-TIM3 antibody.

In various embodiments, the composition is formulated for intrathecal administration. In various embodiments, the composition is formulated for intratumoral administration. In various embodiments, the composition is formulated for systemic administration. In various embodiments, the composition is formulated for intracisternal administration.

BRIEF DESCRIPTION OF DRAWINGS

FIG. 1A shows the lymphatic vasculature of two groups of mice (mock and VEGFC) in the confluence of dural sinuses as visualized under a fluorescence microscope. The mock group is a control that was injected with mock-AAV six months before. The VEGFC group was injected with VEGFC-AAV six months prior. FIG. 1B shows the lymphatic vasculature of two groups of mice (mock and VEGFC) in the superior sagittal sinus as visualized under a fluorescence microscope. FIG. 1C shows the results of a calculation of the relative lymphatic vasculature area in the confluence of sinuses of both groups. FIG. 1D shows the results of a calculation of the relative lymphatic vasculature area in the superior sagittal sinus of both groups.

FIG. 2A shows the degree of survival for mice treated with 5,000 GL261-Luc cells. All of the mice pretreated with VEGFC-AAV survived 100 days, while none of the mice pretreated with mock-AAV survived 100 days. FIG. 2B shows the same observed with mice treated with 50,000 GL261-Luc cells.

FIG. 3A shows the degree of survival for mice treated with 5,000 GL261-Luc cells. FIG. 3B shows the degree of survival for mice treated with 50,000 GL261-Luc cells. All mice underwent pretreatment with either mock-AAV or VEGFC-AAV two months prior, and with either anti-CD4 or anti-CD8 antibodies one day prior and every 4 days after for the remainder of the study.

FIGS. 4A-4B show the results of an experiment in which mice were injected with VEGFC-AAV in the cisterna magna. Two months later, deep cervical lymph nodes were ligated or removed from mice. FIG. 4A is a schematic showing the deep cervical lymph node ligation procedure. One week post-surgery, mice were inoculated intracranially into the striatum with GL261 tumors and growth of the tumor was observed. FIG. 4B shows the degree of survival for CTRL-AAV or VEGFC-AAV treated mice that underwent deep cervical lymph node ligation. Mice that received VEGFC-AAV prophylactic treatment without lymph node ligation all lived. Mice with the deep cervical lymph node ligation succumbed to the tumor.

FIGS. 5A-5D show the results of an experiment in which the mice (described above with respect to FIGS. 3A and 3B) that rejected the intracranial tumor were re-challenged with GL261-Luc cell lines into their flank. FIGS. 5A-5C show that still no tumor growth detected, suggesting that the VEGFC-AAV-treated mice formed a long term immune memory against the tumor. Naïve mice that were injected showed tumor growth, while VEGFC-AAV-treated mice that initially rejected the brain tumor showed no palpable tumor growth in the flank. FIG. 5D shows a schematic of the mice procedure schedule.

FIGS. 6A and 6B show the results of an experiment in which VEGFC-mRNA was transfected into HEK293T cells, with Cy5-GFP used as a control. FIGS. 6A and 6B show the cell lysate showed the full-peptide form of VEGFC (50 kDa) while the media showed the cleaved and activated forms of VEGFC (37 kDa and 22 kDa respectively). FIG. 6B indicates that Capped (Cap1) does not activate PRReceptors, Polyadenylated (120A) 5-methyl-cytosine substitutions increase stability and decrease deamination, and Pseudo uridine substitutions decrease nuclease activity, decrease innate recognition, and can increase translation.

FIG. 7A shows a Western plot performed on a 100-fold dilution of cerebrospinal fluid from mice in which VEGFC-mRNA JETPEI nanoparticles were injected into the cisterna magna six hours prior. FIG. 7B shows the distribution of JETPEI particles in the skullcap and meninges of the mice. FIG. 7C shows increased protein levels of secreted VEGF-C specific to the CSF and meninges.

FIGS. 8A-8G show the results of VEGFC-mRNA used as a monotherapy to treat mice that had GL261-Luc implanted 7 days prior, where tumor growth was delayed. FIGS. 8A-8D show the results of the analysis of tetramer positive CD8 T cells in the deep cervical lymph nodes and tumor bearing hemisphere of the mice 7 days after the treatment. FIG. 8A is a concatenated FACS plot of CD45+CD3+CD8+CD44+ T cells in tumor bearing brain and deep cervical lymph node with GFP-mRNA or VEGFC-mRNA treatment. FIG. 8B and FIG. 8C show the results of percent quantification of tetramer positive CD8 T cells in the deep cervical lymph nodes (circle, ipsilateral; square, contralateral) or in tumor bearing brain, respectively. FIG. 8D shows the results of cell number quantification per tumor bearing hemisphere or lymph node using CountBright absolute beads and autocounter. FIGS. 8E-8G show the results of experiments in which mice were inoculated with 50,000 GL261-Luc cells, treated with Luc-mRNA or VEGF-C-mRNA at day 7, followed by collection and FACS analysis of tumor-inoculated brain hemisphere (n=3; 3 animals were pooled for each n).

FIG. 8H is a schematic of experiment design, with results shown in FIGS.

Figure 8C:
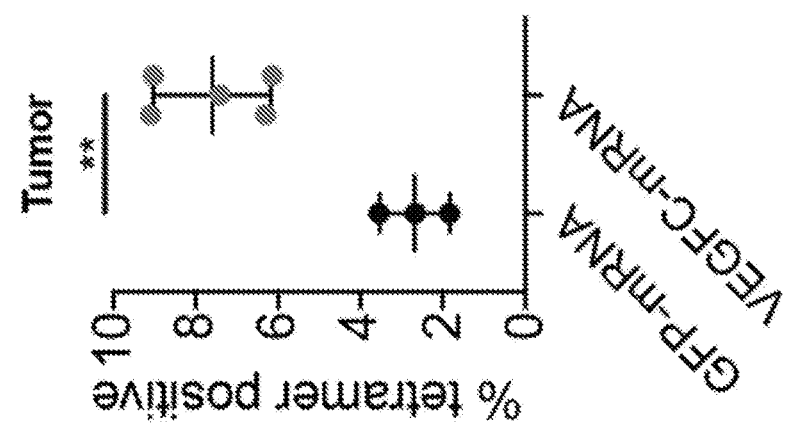
Figure 8B:
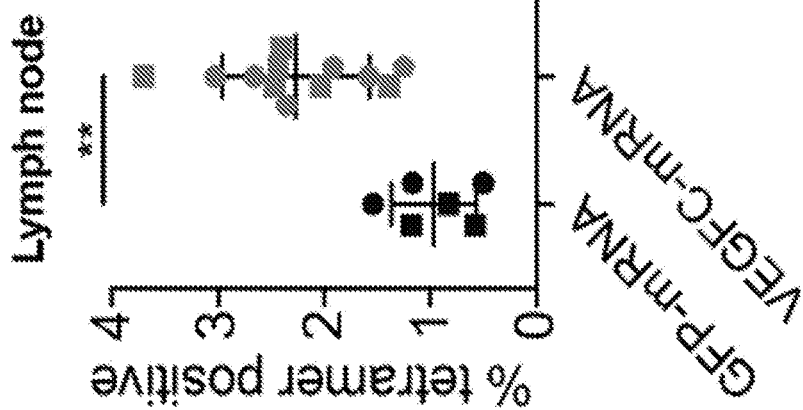
Figure 8A:
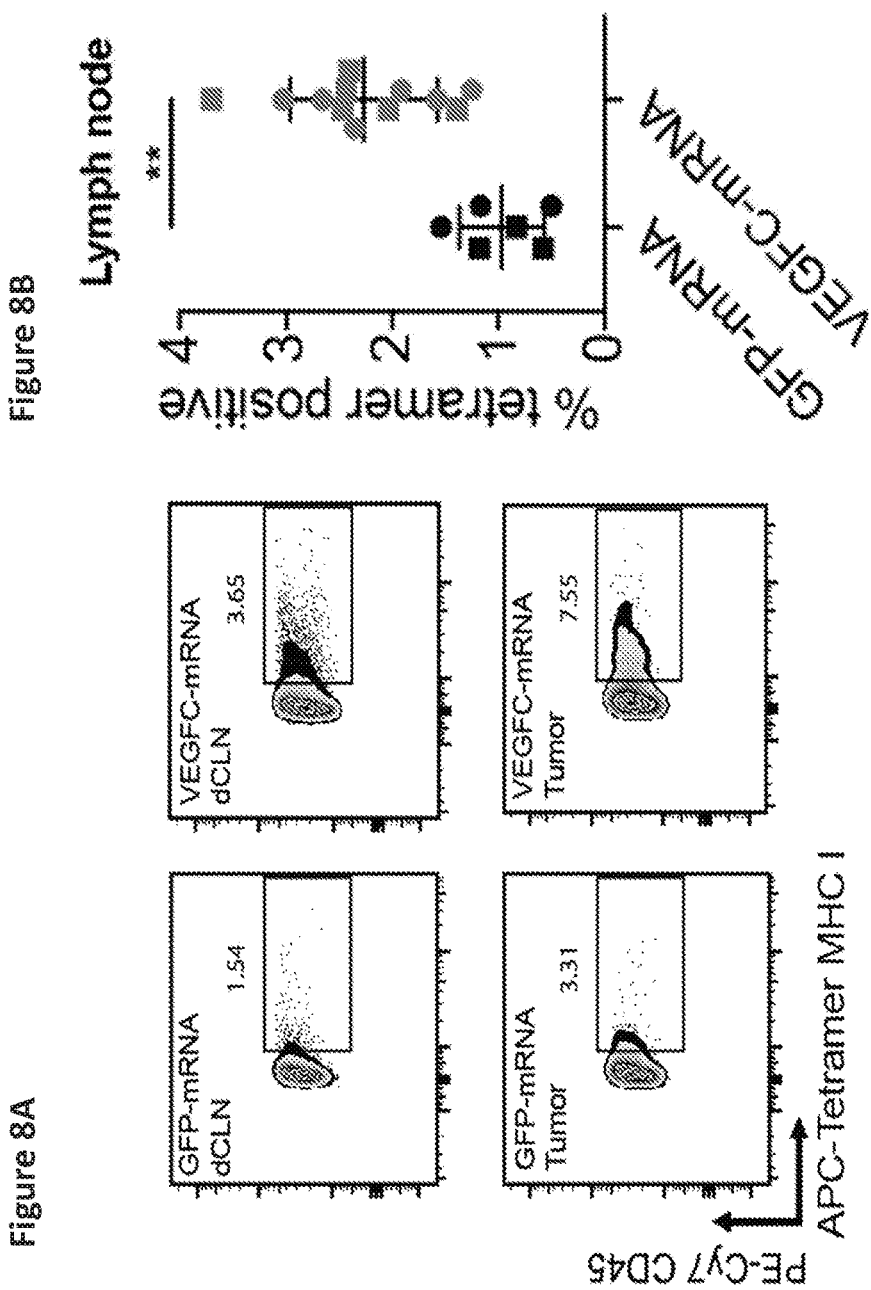
Figure 8H:
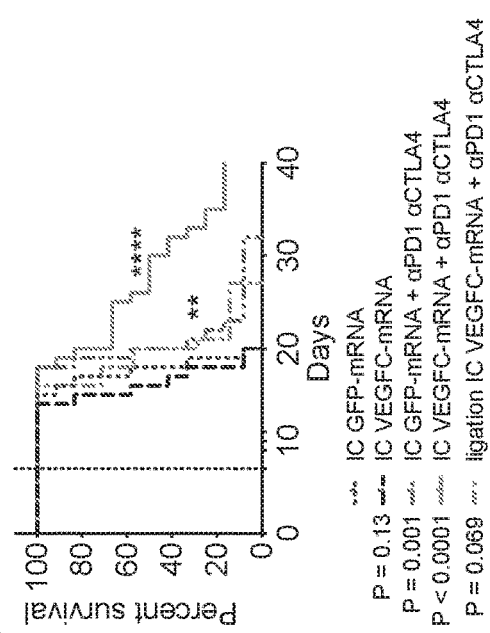
FIGS. 8H-8M show the results of adoptive transfer of the same number of leukocytes from the draining lymph node of tumor bearing mice (treated with GFP-mRNA or VEGF-C-mRNA) into the recipient mice also bearing tumors (treated with GFP-mRNA or VEGF-C-mRNA).
Figure 8I:
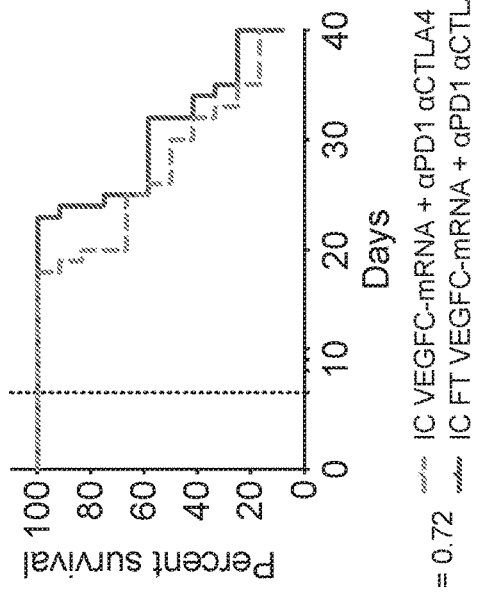
Figure 8J:
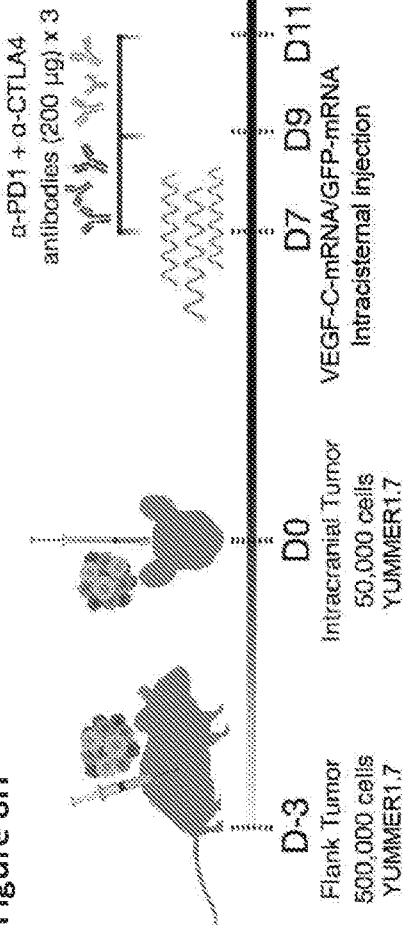
Figure 8K:
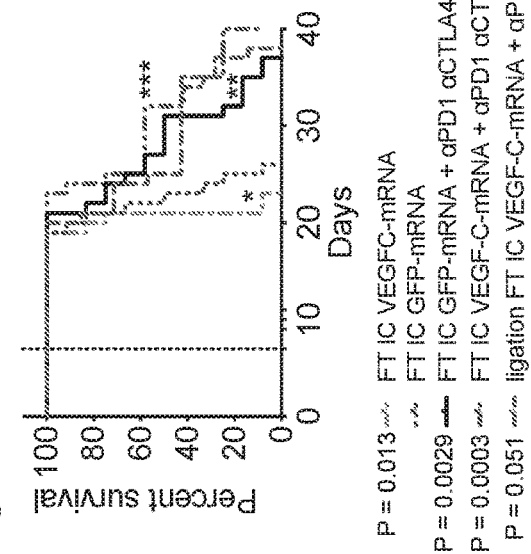

8I-8K. Mice were given either only YUMMER1.7 intracranial tumors (IC, FIG. 8I) or a YUMMER1.7 flank tumor and YUMMER1.7 intracranial tumor (FT, FIG. 8J) and treated with GFP/VEGF-C-mRNA on day 7 and anti-PD1 (RMP1-14), anti-CTLA4 (9H10) on days 7, 9 and 11. *P<0.05; P<0.01; *P<0.001; ****P<0.0001 (two-tailed unpaired Student's t-test, Log-rank Mantel-Cox test). Select results from FIGS. 8I and 8J are shown in FIG. 8K.

Figure 8M:
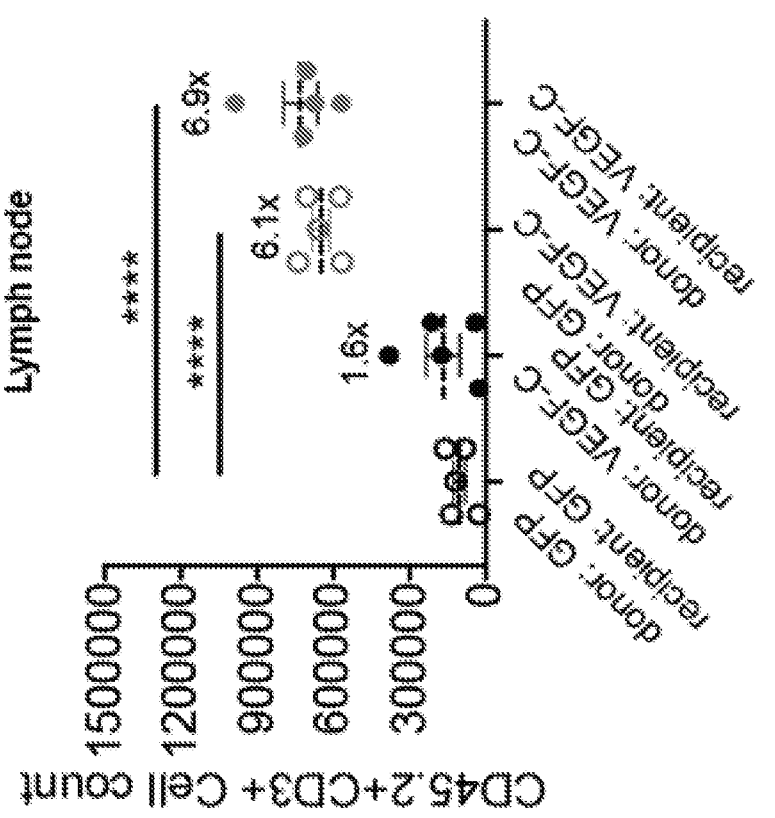
Figure 8L:
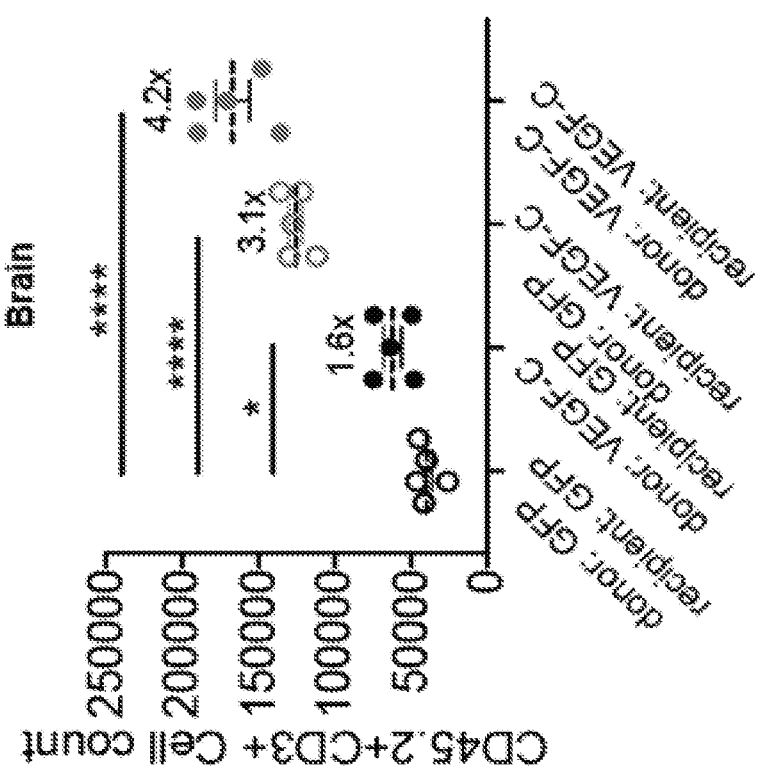

FIGS. 8L-8M show quantification of brain infiltrating (b) and lymph node (c) T cells in mice having GL261 tumors treated with VEGFC-mRNA. Congenic CD45.2 mice were injected with GL261 tumors. 7 days post tumor inoculation (pti), mice were treated with GFP-mRNA or VEGF-C-mRNA. At 7 days post mRNA-treatment (14 day-pti) draining lymph nodes were harvested and leukocytes were transferred into congenic CD45.1 mice bearing 7 day-tumors. Five days after leukocyte transfer, draining lymph nodes and brain tissues were harvested to analyze T cell infiltration.

Figure 9A:
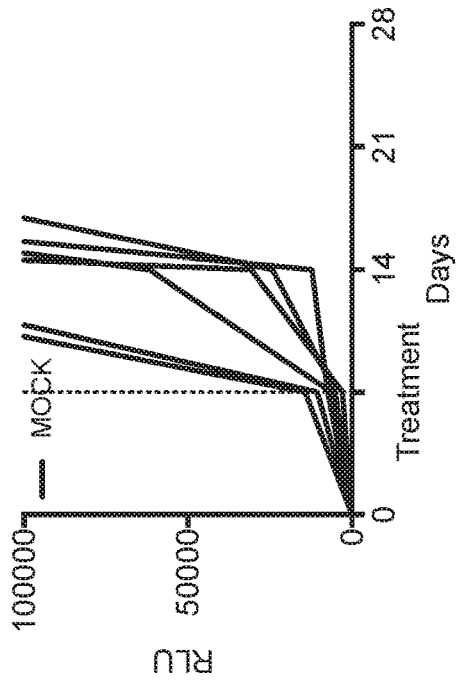
Figure 9B:
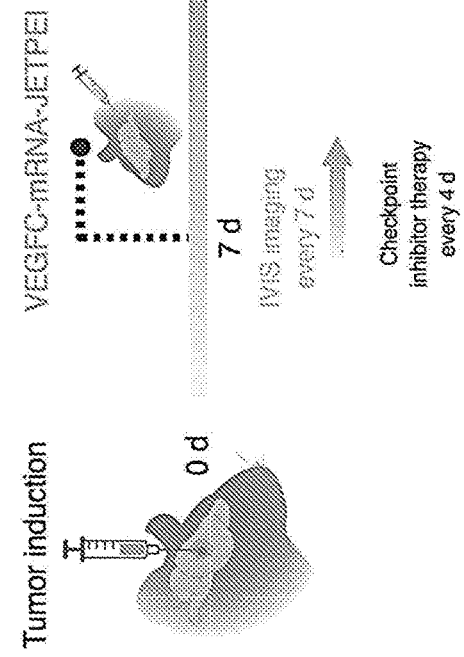
Figure 9E:
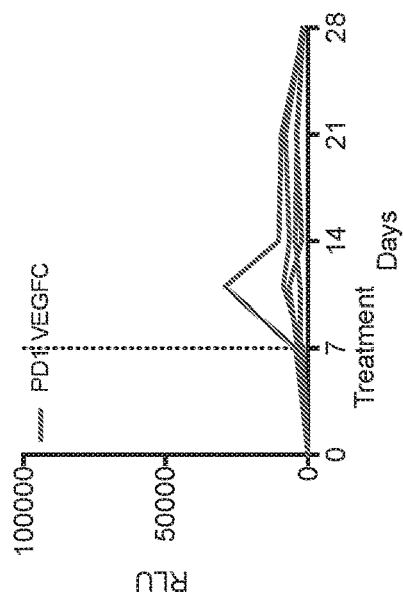
Figure 9D:
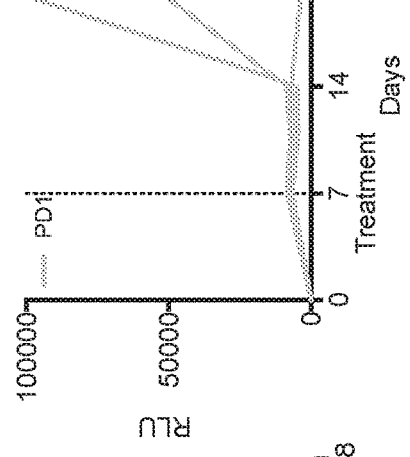
Figure 9C:
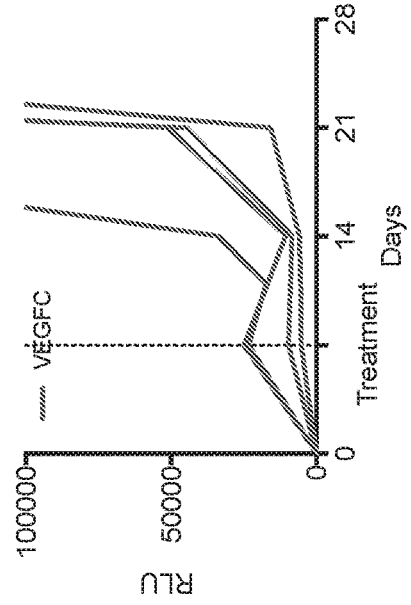
Figure 9G:
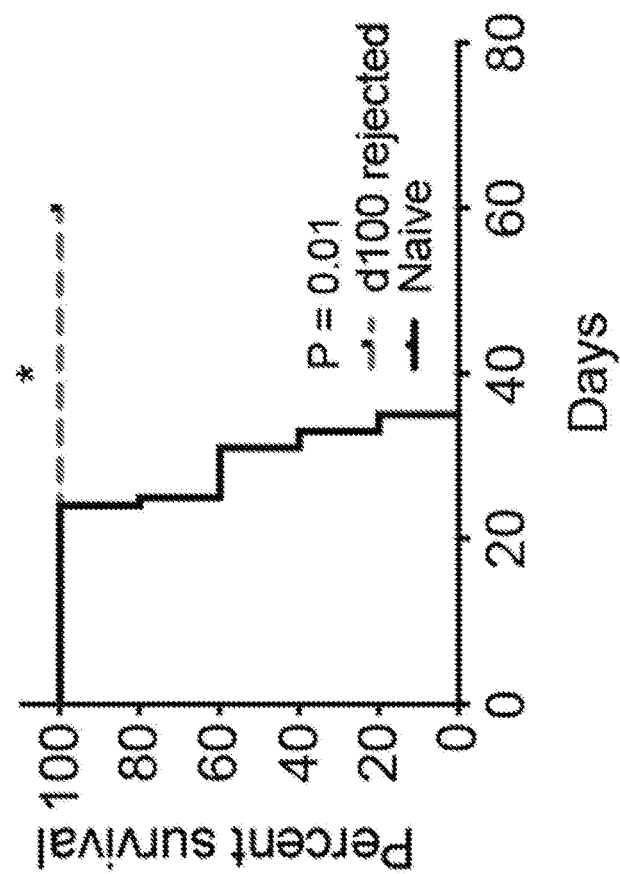
Figure 9F:
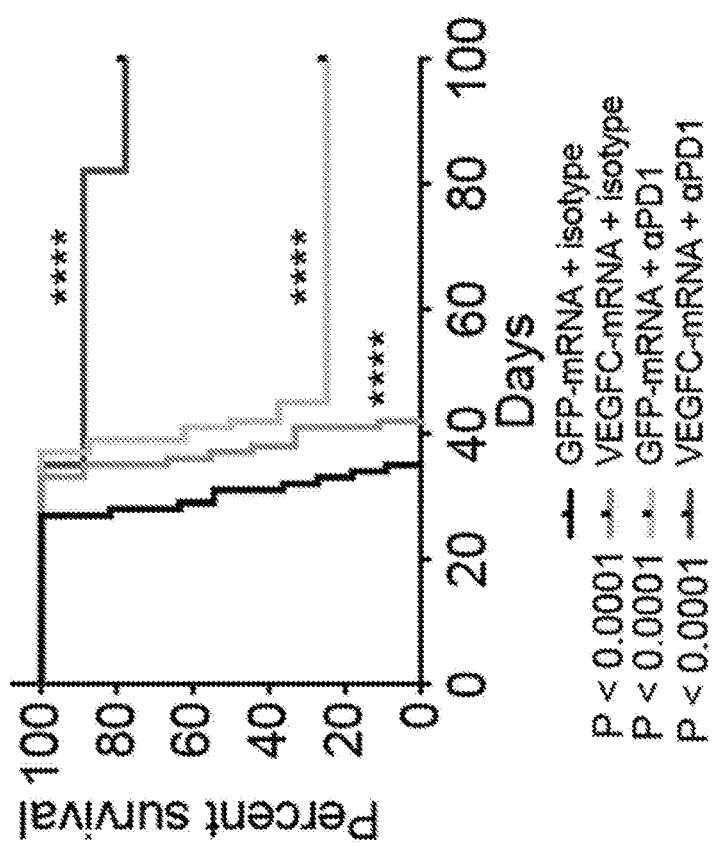

FIGS. 9A-9G show the results of an experiment in which VEGFC-mRNA as an adjuvant therapy to PD1 resulted in complete remission of a tumor. FIG. 9A shows a schematic of the protocol. FIGS. 9B-9E show a tumor growth assay where tumor growth started by day 14 for mice that received GFP-mRNA jetPEI into the cisterna magna and 200 µg of isotype antibodies injected intraperitoneally. FIGS. 9B-9E describe the results of tumor assays on four groups of mice: VEGFC, PD1/VEGFC, PD1, and mock surgery, as explained in more detail in Example 4. FIG. 9F shows the degree of survival for mice that rejected tumors from VEGFC-mRNA/anti-PD1 combination therapy from FIG. 9G and re-challenged with 50,000 GL261-Luc in the contralateral hemisphere (n=4-6).

Figure 10B:
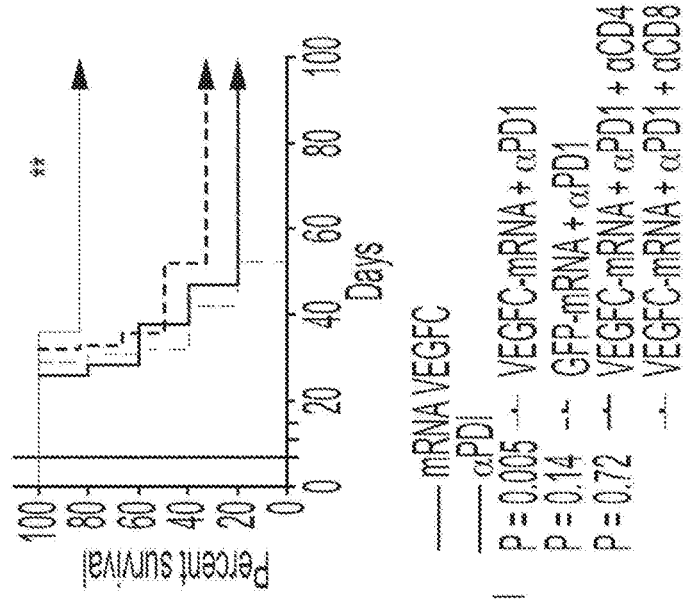
Figure 10A:
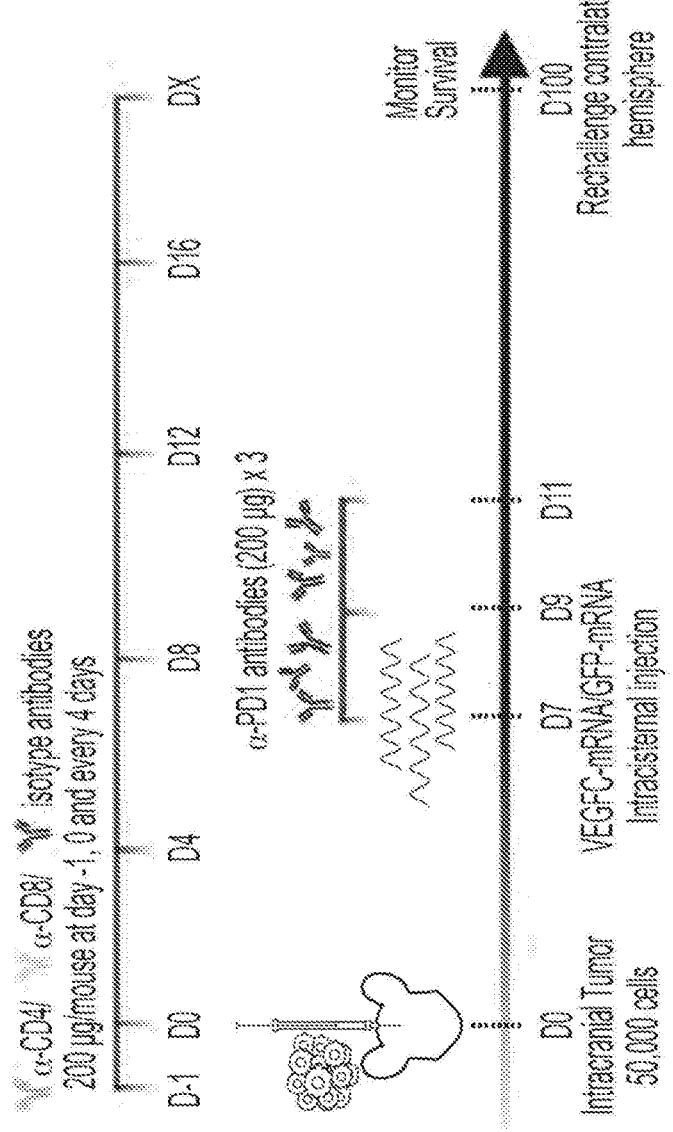

FIGS. 10A and 10B show the results of an experiment where T cells were depleted from the mice treated with VEGFC and PD1 combination therapy. Mice were treated with VEGFC and PD1 combination therapy, and treated with anti-CD4 or anti-CD8 antibodies to deplete T cells. FIG. 10A shows a schematic of the protocol. FIG. 10B depicts a survival curve showing that VEGFC-mRNA as adjuvant therapy to PD1 is dependent on T cell activity. Mice were treated with VEGFC and PD1 combination therapy, and treated with anti-CD4 or anti-CD8 antibodies to deplete T cells. CD4 and CD8 T cell depleted mice did not have the same regression of tumors as the VEGFC+PD1 treated mice.

Figure 11B:
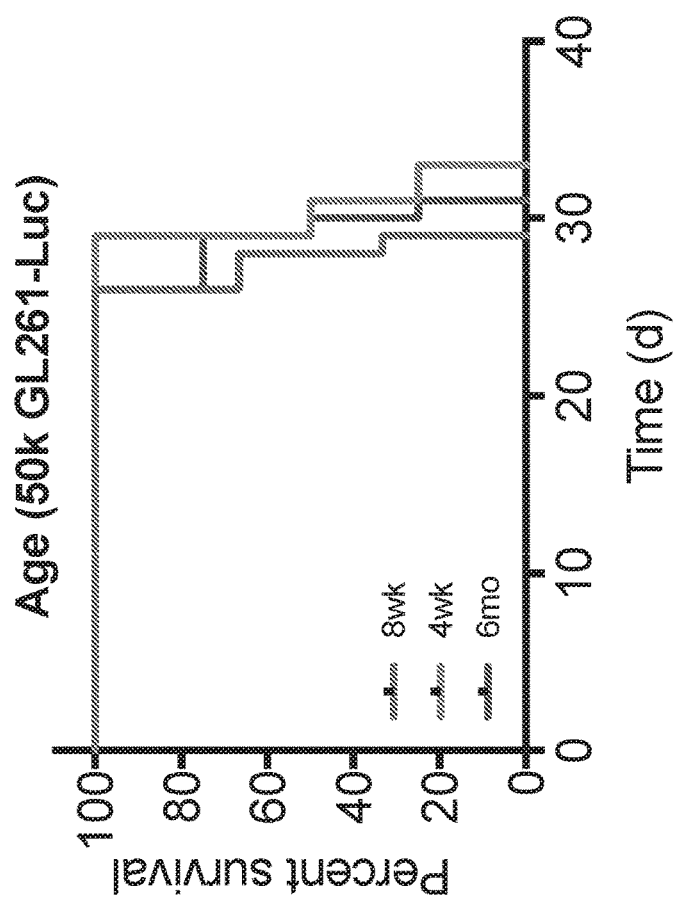
Figure 11A:
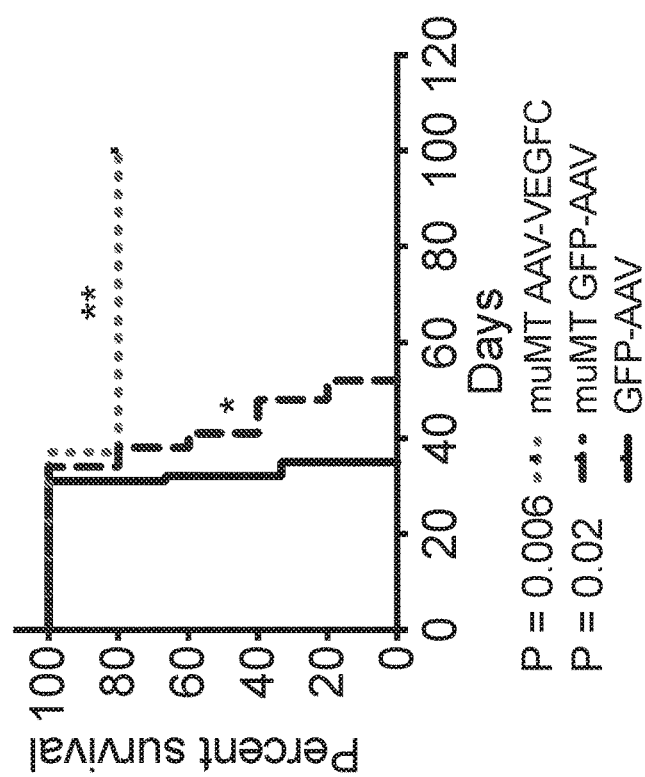

FIG. 11A depicts a survival curve showing that tumor growth is independent of age. Tumor cell lines were injected into mice with different ages. It was observed that there was no significant different in tumor growth and survival between the mice at different ages.

FIG. 11B depicts a survival curve showing that AAV-VEGFC treatment efficacy is independent of B cell activity. AAV-VEGFC pre-treated muMT mice (lacks functional B cells) showed same survival benefits as AAV-VEGFC pre-treated wild type mice.

FIG. 12 shows an exemplary cDNA sequence of VEGFC used for mRNA production.

Figure 13B:
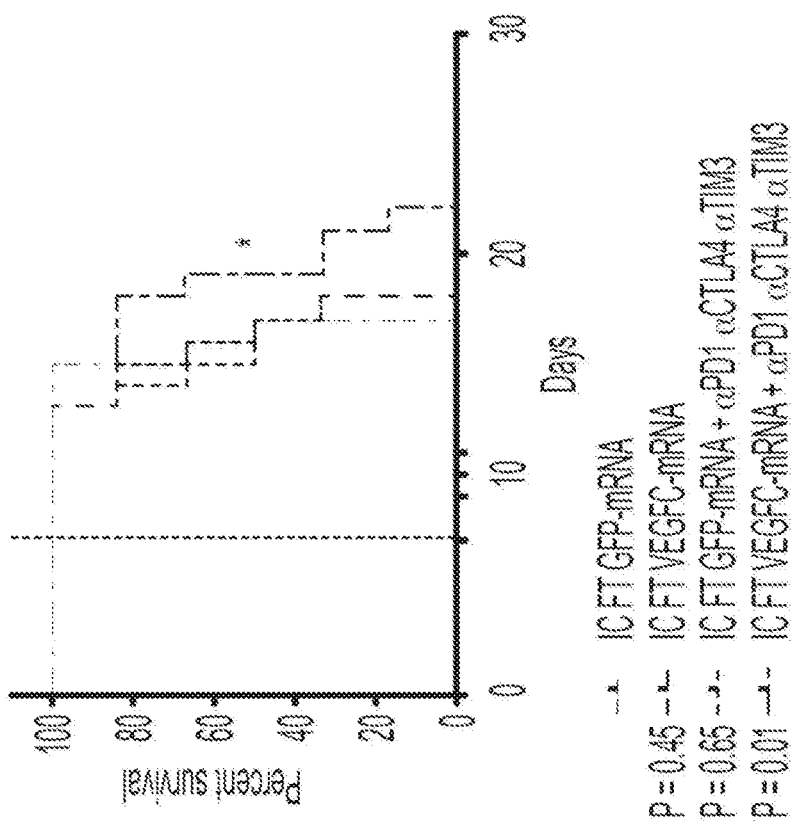
Figure 13A:
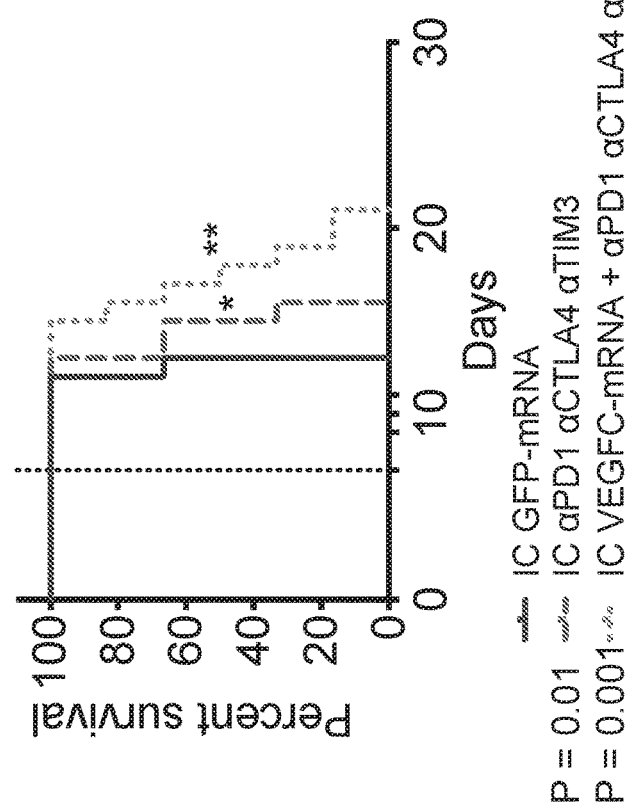

FIGS. 13A-13D show the degree of survival of mice that were given either only intracranial tumors (IC) or a flank tumor and intracranial tumor (FT) and treated with GFP/VEGFC-mRNA on day 7 and anti-PD1 (RMP1-14), anti-CTLA4 (9H10) and anti-TIM3 (RMT3-23) on days 7, 9 and 11. FIGS. 13A and 13B are survival curves for mice received only intracranial tumors (IC) and a flank tumor and intracranial tumor (FT), respectively. FIG. 13C shows a comparison of the degree of survival of mice injected with only IC that received the combination therapy and mice that had both IC and FT and treated with combination therapy. FIG. 13D is a schematic of VEGFC induced tumor rejection.

Figure 14B:
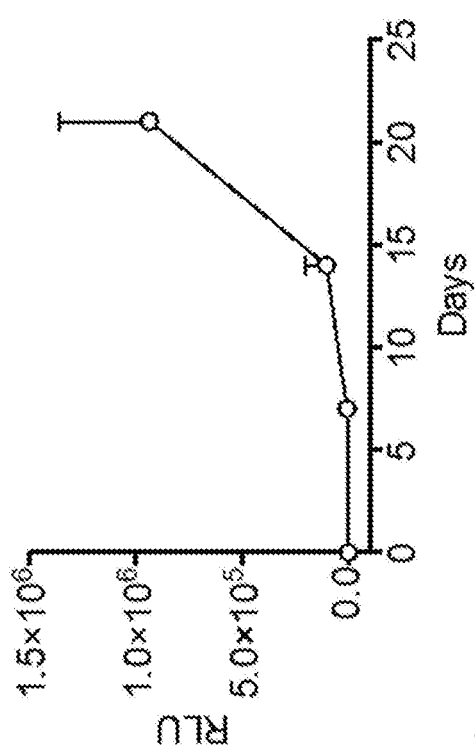
Figure 14C:
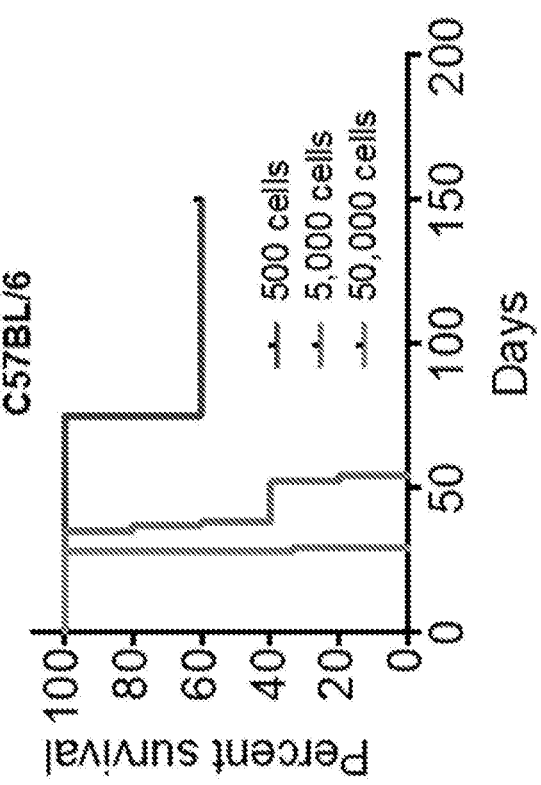
Figure 14A:
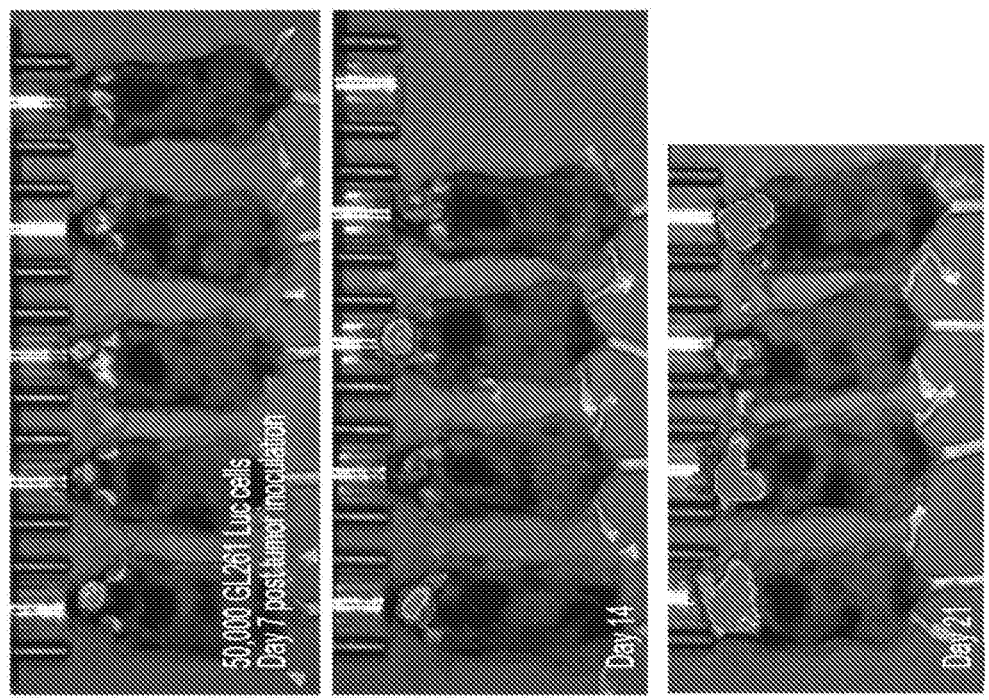

FIGS. 14A-14F show the effect of tumor inoculation in C57BL/6 mice and long-term survival of VEGFC-AAV treated mice. FIG. 14A shows images of tumor growth in mice inoculated with 50,000 GL261-Luc cells. FIG. 14B is a plot showing the growth of tumor in mice inoculated with 50,000 GL261-Luc cells. FIG. 14C shows survival curves of mice inoculated with 500, 5,000, or 50,000 GL261-Luc cells. FIG. 14D is a survival curve showing long term survival monitoring of mice after VEGFC-AAV and CTRL-AAV injections into the cisterna magna. FIG. 14E shows the results of an experiment in which mice were injected I.V. with 70 k MW Dextran-fluorescein, euthanized after 2 hours, followed by collection and cryosectioning of brains (n=4). In FIG. 14F, mice were injected I.V. with 0.5% Evans Blue. After 2 hours mice were perfused intraventricularly and EB was extracted from brain tissue using DMF (WT, LPS, AAV-VEGF-C, VEGF-C-mRNA, n=4; Tumor, Tumor+VEGF-C-mRNA, n=5).

Figure 15A:
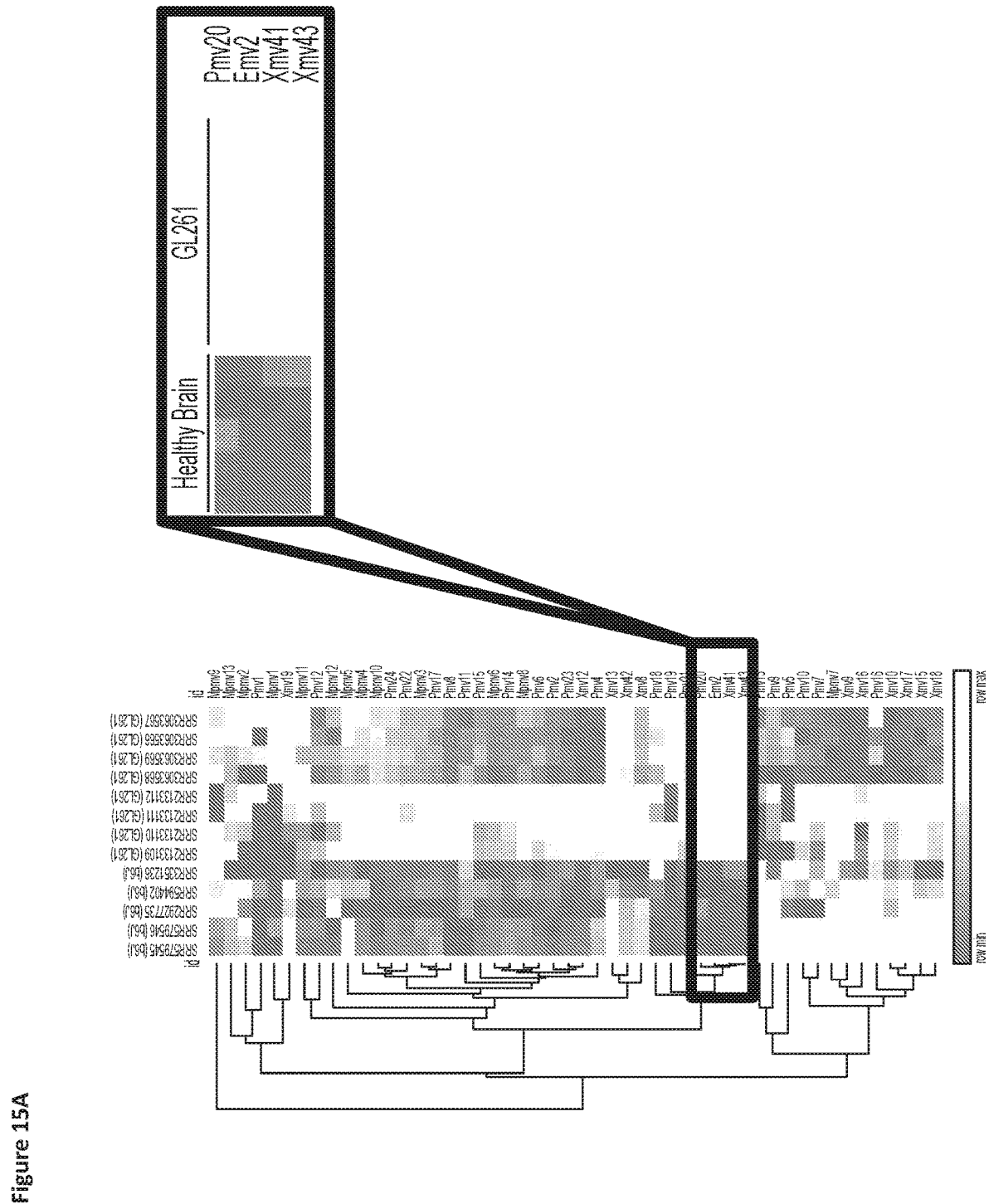
Figure 15B:
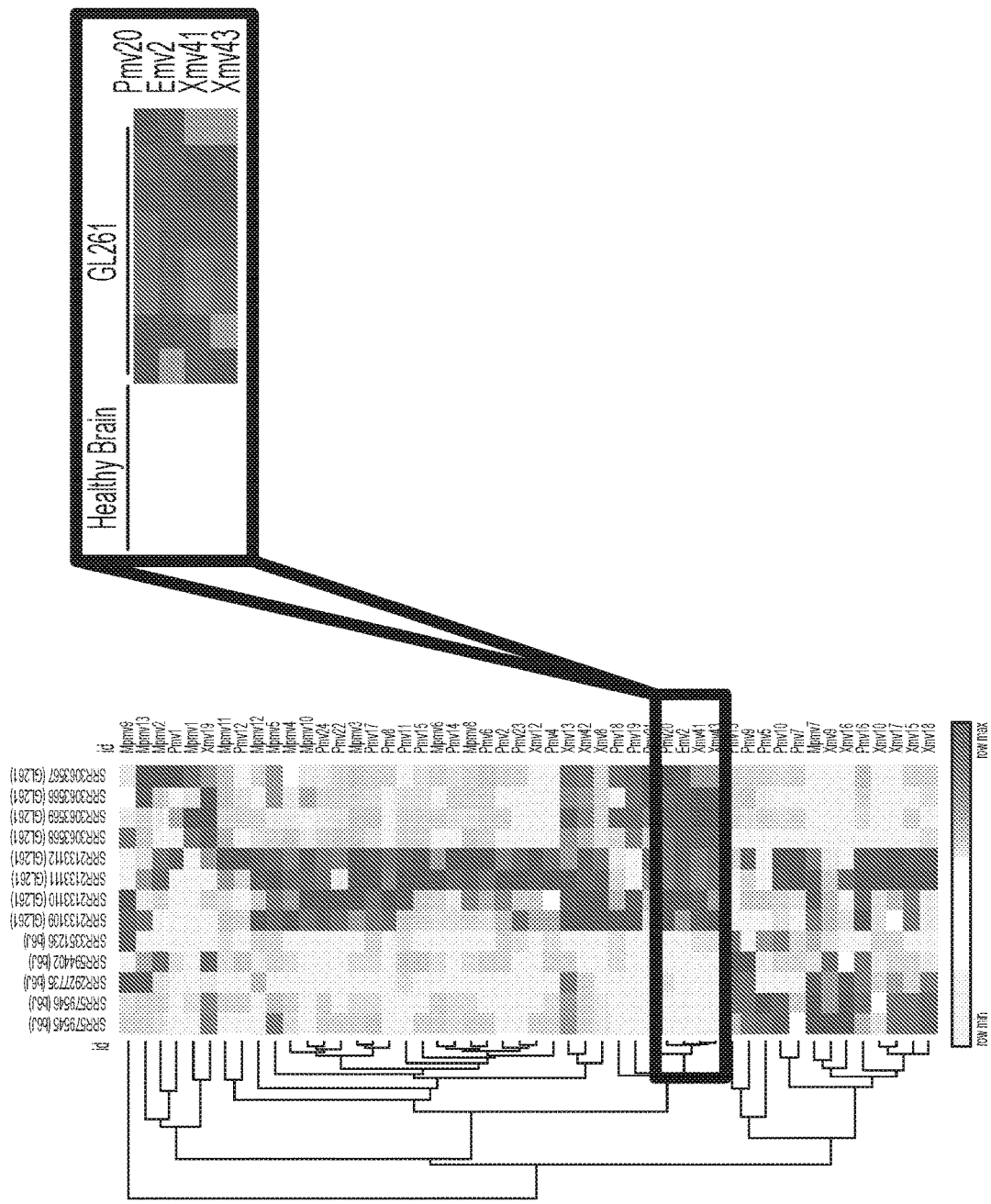

FIGS. 15A-15E show the analysis of endogenous retrovirus EMV2 as a tumor antigen for GL261. FIGS. 15A and 15B shows the results of RNA-seq analysis of murine endogenous retrovirus elements in publicly available data sets on C57BL/6J mice brains and GL261 cell lines from various sources. FIG. 15C is a graph showing the quantification of ERV elements in brain and tumor tissue from RNA-Seq. FIG. 15D is a FACS plot showing an enrichment of tetramer positive CD8 T cells in the draining inguinal lymph nodes after administration of GL261 in the flank of mice. Tetramers against emv2-env (Kb-restricted peptides aa 604-611 of p15E protein (KSPWFTTL) were used. FIG. 15E shows gating strategies for tetramer staining.

FIGS. 16A-16D show the results of experiments where the VEGFC and checkpoint inhibitor combination therapy were given to mice at later stages of tumor development. Therapeutic delivery of VEGFC potentiates checkpoint inhibitor therapy even at late stages of tumor development. FIGS. 16A and 16C are schematics for experiment design of FIGS. 16B, and 16D, respectively. In FIG. 16A, mice inoculated with 50,000 CT2A-BFP cells were treated with VEGFC-mRNA/GFP-mRNA (day 7) and with either anti-PD1(RMP1-14) and anti-4-1BB (LOB12.3) antibodies or PBS (day 7, 9 and 11) and monitored for survival. FIG. 16B shows the degree of survival of mice from FIG. 16A. In FIG. 16C, mice inoculated with 50,000 GL261-Luc cells were treated with VEGFC-mRNA/GFP-mRNA (day 20) and with either anti-PD1 (RMP1-14) and anti-TIM3 (RMT3-23) antibodies or PBS (day 20, 22, 24) and monitored for survival. FIG. 16D shows the degree of survival of mice from FIG. 16C.

FIG. 17A shows the results of an experiments where T cells from lymph nodes and spleens from mice that rejected tumors after VEGF-C-mRNA+anti-PD1 (RMP1-14) combination therapy or naïve WT mice were isolated and transferred into naïve WT mice intravenously. 24 hours later, GL261 tumors were inoculated intracranially and observed for survival (WT, n=5; WT Naïve T cell transfer, n=5; WT Memory T cell transfer, n=7). FIG. 17B shows the results of an experiment where CT2A cells were treated with VEGF-C-mRNA/GFP-mRNA (day 7) and with either anti-PD1 (RMP1-14) and/or anti-4-1BB (LOB12.3) antibodies or PBS (day 7, 9 and 11) and monitored for survival (FIG. 17B: n=5 for all groups except VEGF-C-mRNA+α4-1BB αPD1, n=7). Mice inoculated with 50,000 GL261 cells were treated with VEGF-C-mRNA/GFP-mRNA (day 7) and with either anti-PD1 (RMP1-14) antibodies (FIG. 17C), anti-TIM3

(RMT3-23) antibodies (FIG. 17D), anti-CTLA4 (9H10) antibodies (FIG. 17E) or PBS (day 7, 9 and 11) and monitored for survival (n=5). The same control mice were used for GFP-mRNA+PBS and VEGF-C-mRNA+PBS groups shown in the data of FIGS. 17D and 17E.

Figure 18H:
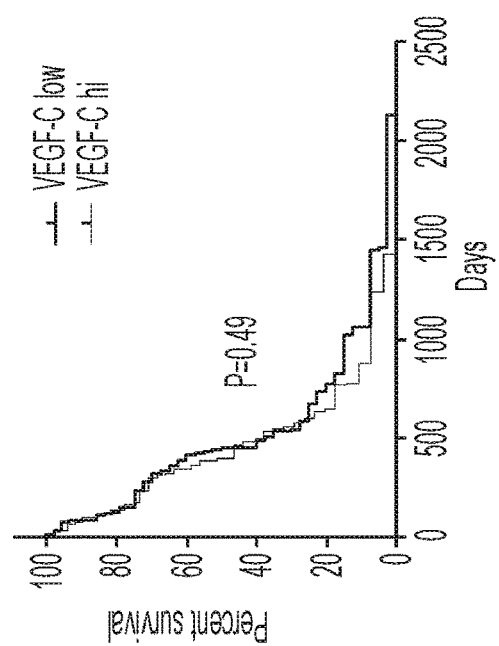
Figure 18G:
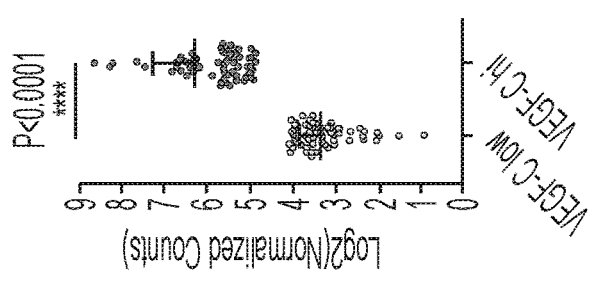
Figure 18F:
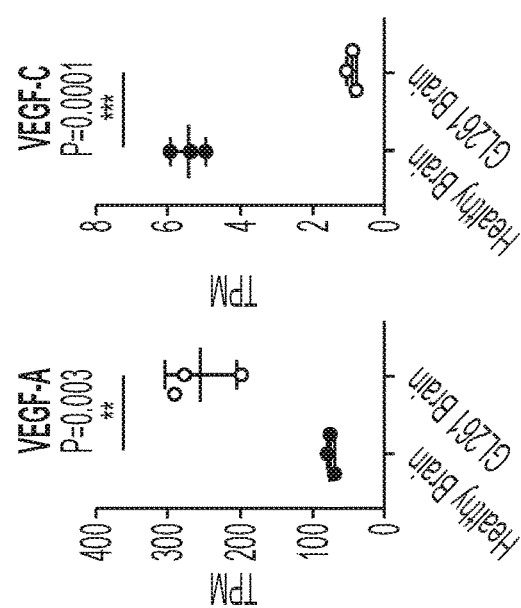

FIGS. 18A-18H show the correlation of VEGF-C expression profiles between human and murine GBM. In FIGS. 18A-18E, 18G and 18H, RNAseq data of tumor tissue and health brain tissue from different regions of the tissue (TCGA (phs000178.v10.p8) and GTEX respectively. FIGS. 18A-18B show results of analysis with GTEX (v6). FIGS. 18C-18E show results of analysis with GTEX (phs000424.v7.p2)). FIG. 18A shows an expression profile of VEGF-A. FIG. 18B shows an expression profile of VEGF-C. FIGS. 18C-18E show expression profiles of VEGF-A, CD31 (angiogenic) and VEGF-C, LYVE1 (lymphangiogenic) genes in cortex versus GBM samples (cortex, n=132; GBM, n=147). FIG. 18F shows results of analysis of RNAseq data of mice brain and GL261 tumors from mice brains (n=3). In FIG. 18G, ONCLNC (Onclnc.org) data of GBM patients stratified into two groups (VEGF-C low, lower 33%; VEGF-C hi, upper 33%; n=50). FIG. 18H is a Kaplan Meier Survival curve of patients represented in FIG. 18G (n=50).

Figure 19A:
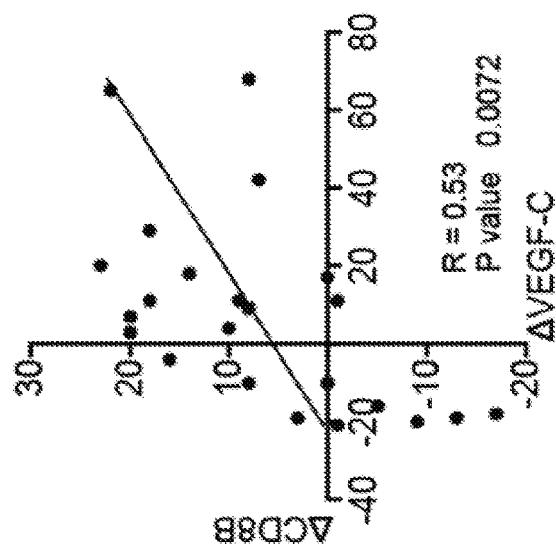
Figure 19B:
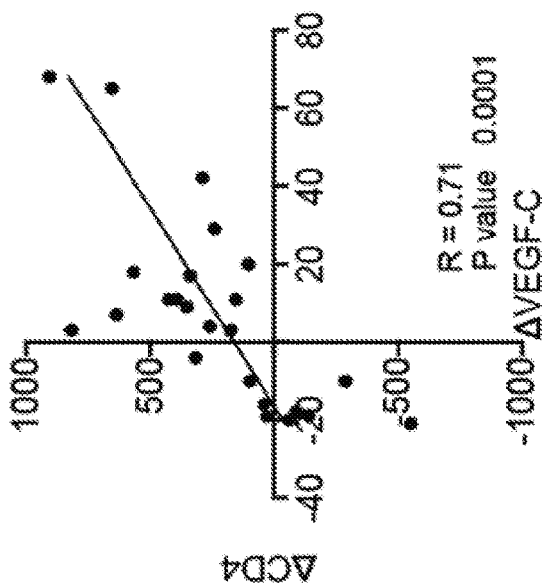
Figure 19C:
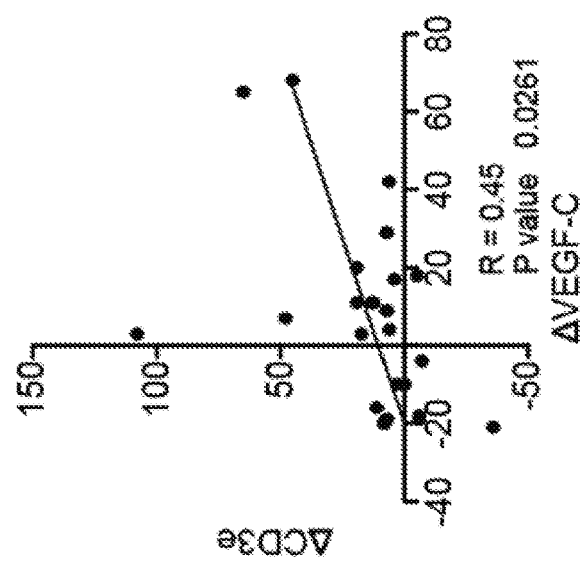

FIGS. 19A-19C show RNAseq correlation of change in VEGF-C and T cell markers after PD-1 therapy (data from GSE121810). *P<0.05; P<0.01; *P<0.001; ****P<0.0001 (two-tailed unpaired Student's t-test, Log-rank Mantel-Cox test)

FIGS. 20A-20C show the results of assays of VEGF-C expression and uptake tropism. FIGS. 20A and 20B show VEGF-C-mRNA and Cy5 labeled GFP-mRNA mixed at a 1:1 ratio and delivered in vivo with JETPEI. 24 hours later brains, meninges and lymph nodes of treated mice were collected for flow cytometry to measure % Cy5 positive cells in each compartment (control, n=6; Cy5-mRNA, n=9; data are pooled from two independent experiments). FIG. 20C shows the results of an experiment in which brains and serum were collected from mice treated with either AAVs (-CTRL or -VEGF-C, 2 month time point), or mRNAs (GFP or VEGF-C-mRNA, 24 h time point) or inoculated with tumors (days 7 and 28 time points), then were analyzed by ELISA (Brain; AAV-CTRL, GFP-mRNA, n=6; AAV-VEGF-C, VEGF-C-mRNA, n=5; d7 tumor, n=3; d28 tumor, n=7) (Serum; n=3). *P<0.05; P<0.01; *P<0.001; ****P<0.0001 (two-tailed unpaired Student's t-test)

Figure 21C:
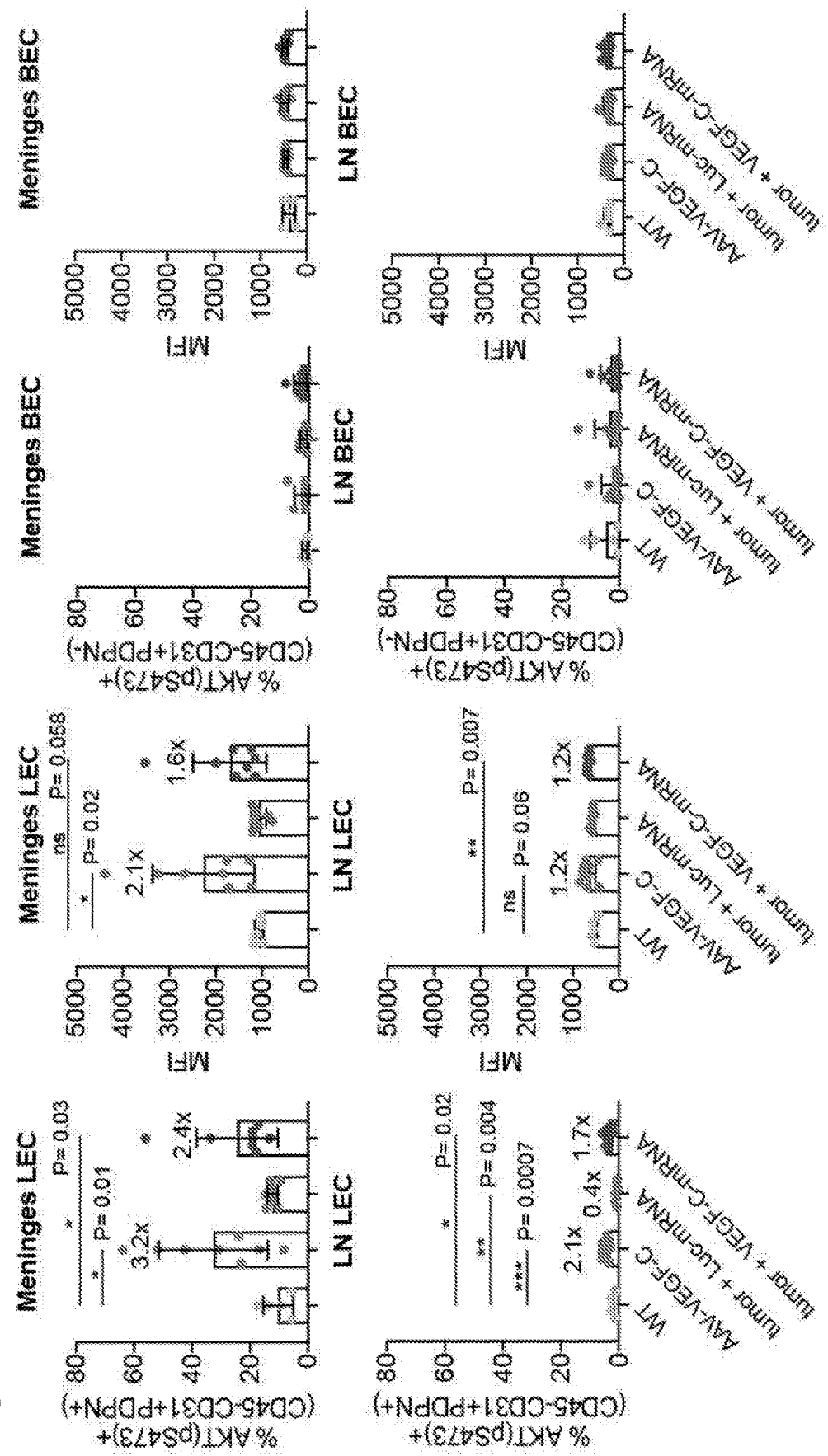

FIGS. 21A-21E illustrate experiments showing that VEGF-C signals specifically in lymphatic endothelial cells in the meninges and dCLNs. FIG. 21A depicts a gating strategy for lymphatic endothelial cells (LECs) and blood endothelial cells (BECs). FIG. 21B shows concatenated images of LECs and BECs from meninges and lymph node depicting AKT-phosphorylation intensity. FIG. 21C shows quantification of AKT(pS473) positive population and MFI within LECs and BECs in the meninges and dCLNs (meninges; WT, n=5; AAV-VEGF-C, tumor+Luc-mRNA, tumor+VEGF-C-mRNA, n=8) (lymph nodes; WT, n=5; AAV-VEGF-C, n=8; tumor+Luc-mRNA, n=7; tumor+VEGF-C-mRNA, n=8). FIGS. 21D and 21E show fluorescent microscope images of dCLN after VEGF-C-mRNA treatment in tumor bearing mice (CD31; LYVE1; DAPI) and shows fluorescent microscope images of meninges after VEGF-C-mRNA treatment in tumor bearing mice (CD31; LYVE1; DAPI). *P<0.05; P<0.01; *P<0.001; ****P<0.0001 (two-tailed unpaired Student's t-test)

Figure 22A:
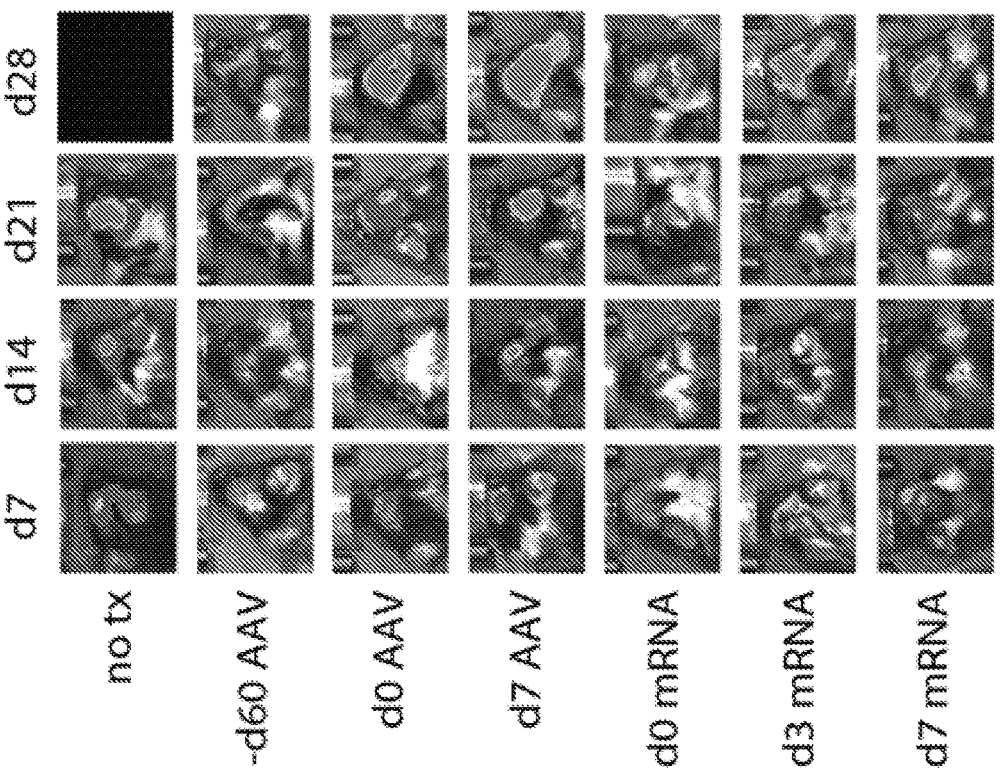
Figure 22B:
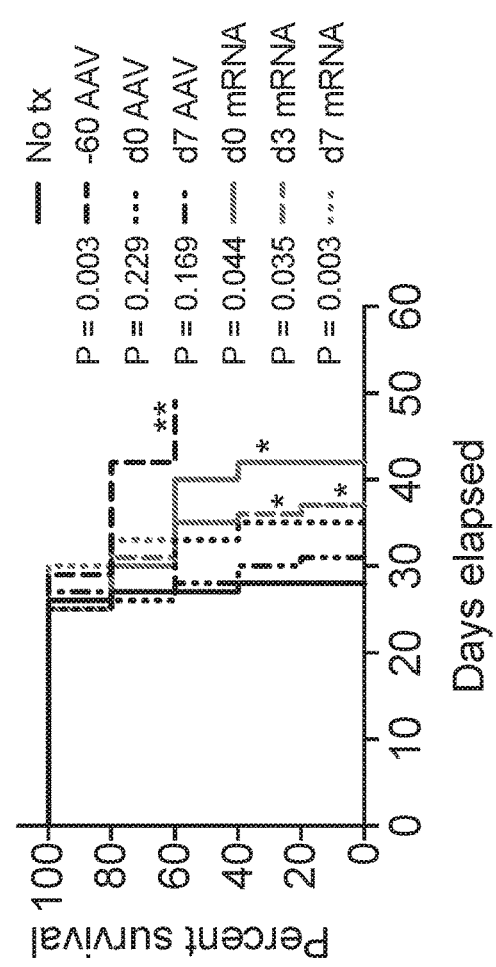
Figure 22C:
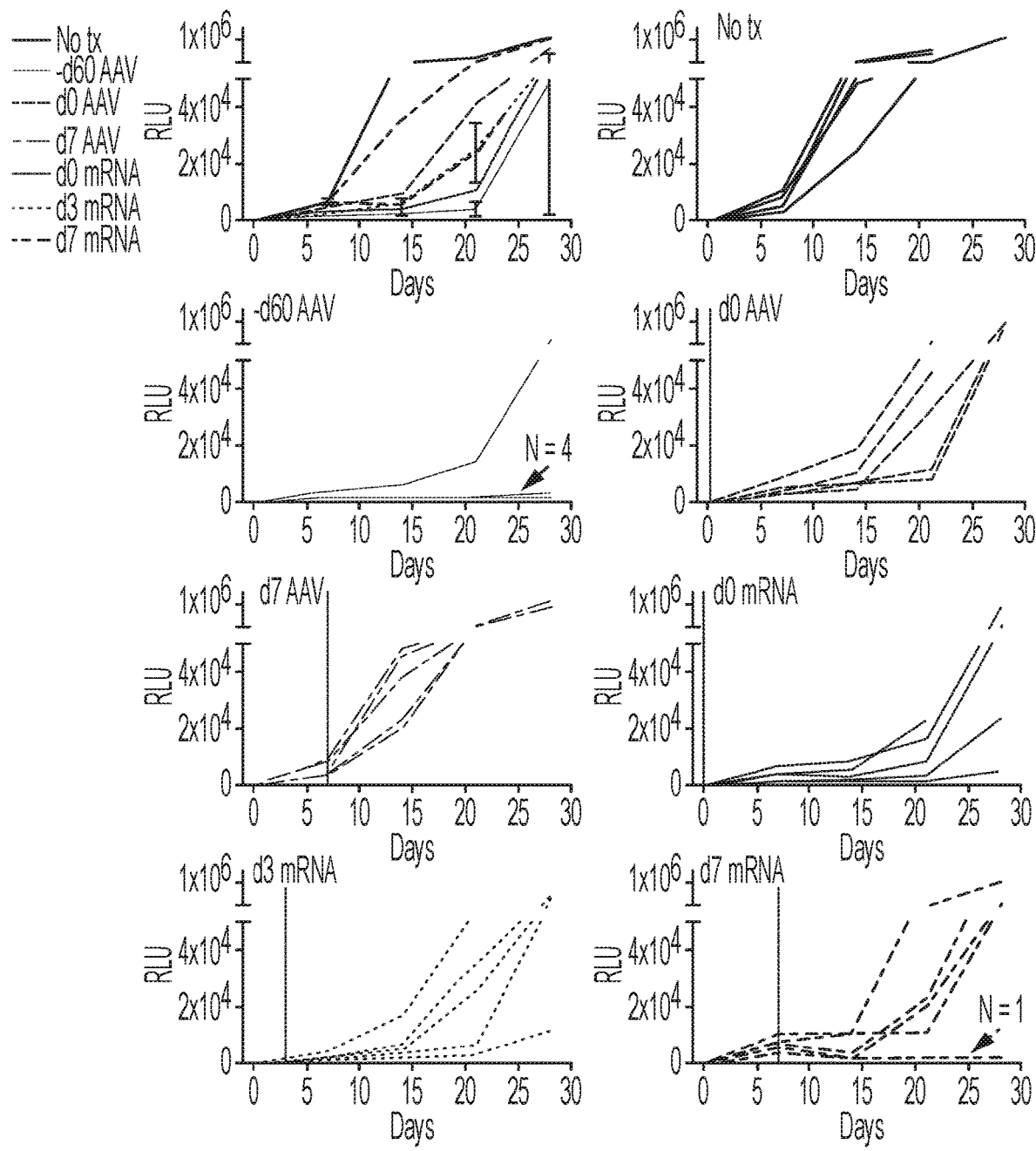

FIGS. 22A-22C illustrate the results of an experiment where mice were treated with AAV-VEGF-C or VEGF-C-mRNA at different timepoints relative to GL261-Luc tumor inoculation (at day zero). FIG. 22A shows the results of survival monitoring. FIGS. 22B-22C show the results of tumor growth kinetics. n=5 for all groups. *P<0.05; P<0.01; *P<0.001; ****P<0.0001 (Log-rank Mantel-Cox test)

Figure 23B:
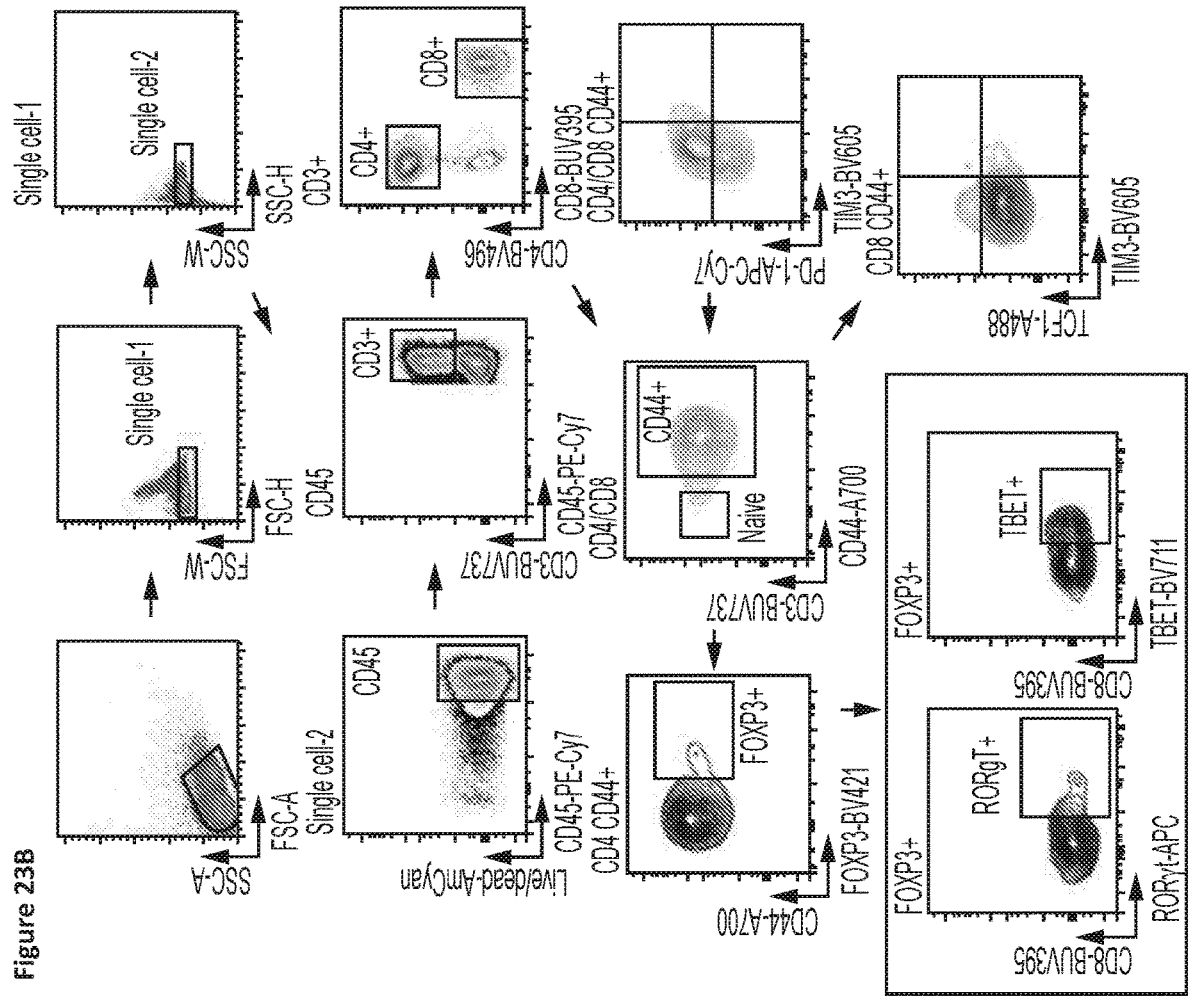
Figure 23A:
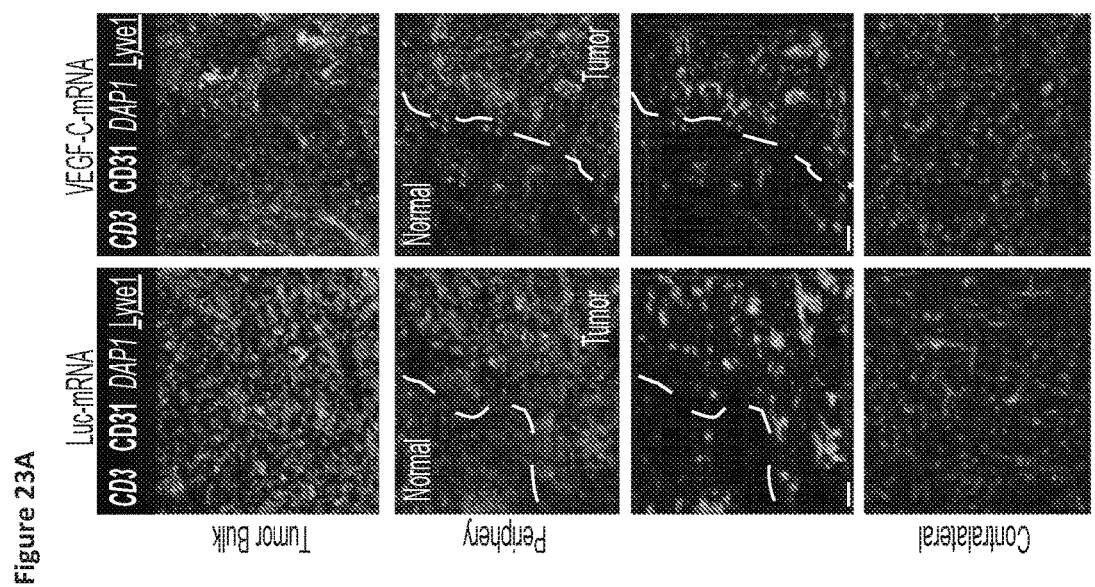

FIGS. 23A-23G show the results of assaying indicating that VEGF-C treatment changes T cell phenotypes and functionality. In the assays, mice bearing 7 day-tumors were treated with Luc-mRNA or VEGF-C-mRNA and evaluated for changes. In FIG. 23A, mice brains were collected 2 days after VEGF-C-mRNA treatment, cryosectioned and analyzed by immunofluorescence microscopy. FIG. 23B shows a gating strategy for flow cytometry analysis of T cells. FIG. 23C is an example of TCF7 staining in $CD3^+CD8^+CD44^+$ populations after VEGF-C-mRNA treatment. FIG. 23D shows quantification of cell counts in different compartments after VEGF-C-mRNA treatment. In FIG. 23E is shown the percent of cells expressing specific transcription factors or immune checkpoint inhibitors after VEGF-C-mRNA treatment, along with a gating strategy for cytokine production in T cells. FIGS. 23F and 23G show quantification of T cells expressing multiple cytokines (n=3, 3 animals pooled for each replicate). *P<0.05; P<0.01; *P<0.001; ****P<0.0001 (two-tailed unpaired Student's t-test)

FIG. 23H shows the results of use of flow cytometry to evaluate VEGFR-3 expression in leukocyte compartments in the tumor. In FIG. 23I, BMDCs were cultured with VEGF-C and evaluated for costimulatory molecule expression at naïve state (top row) or with LPS stimulation (bottom row). In FIG. 23J, isolated T cells were activated in vitro with CD3/CD28 and IL-2 in the presence of VEGF-C. *P<0.05; P<0.01; *P<0.001; ****P<0.0001 (two-tailed unpaired Student's t-test).

Figure 24A:
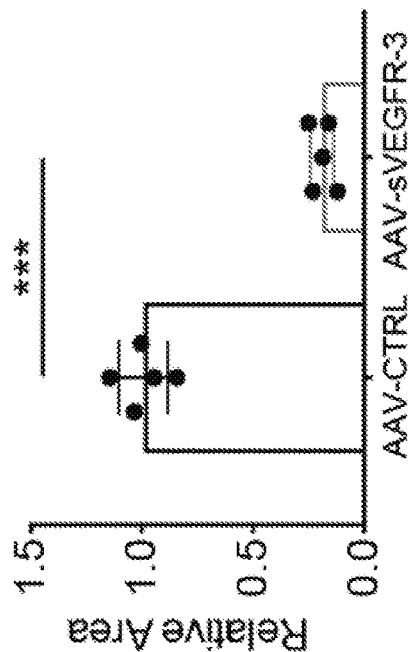
Figure 24B:
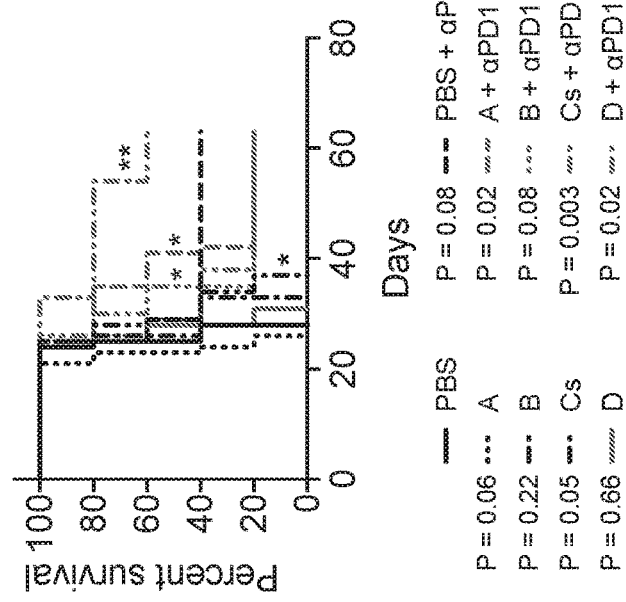
Figure 24C:
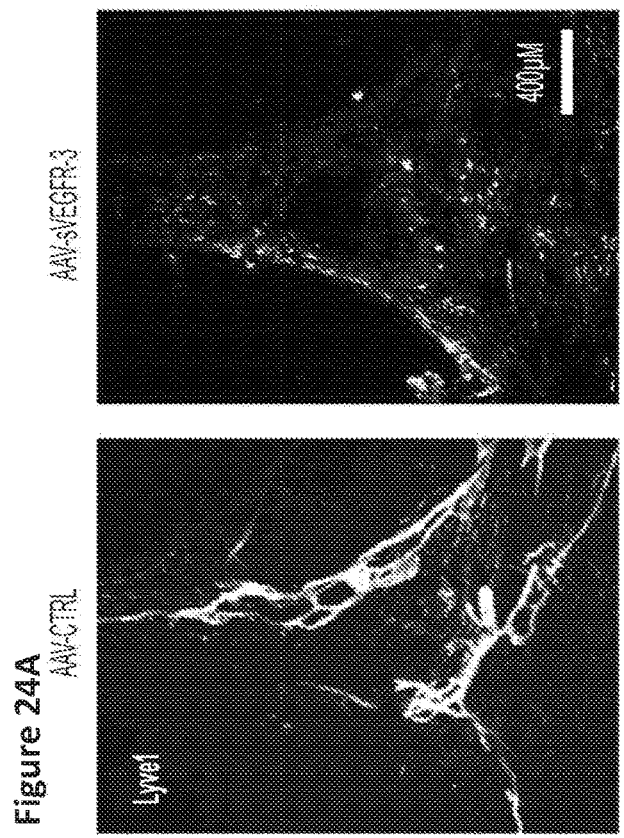
Figure 24D:
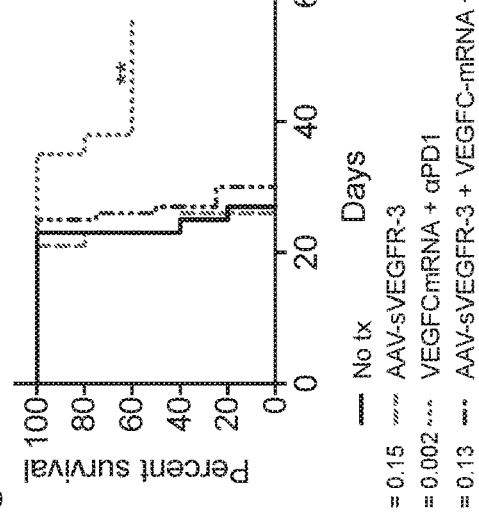
Figure 24E:
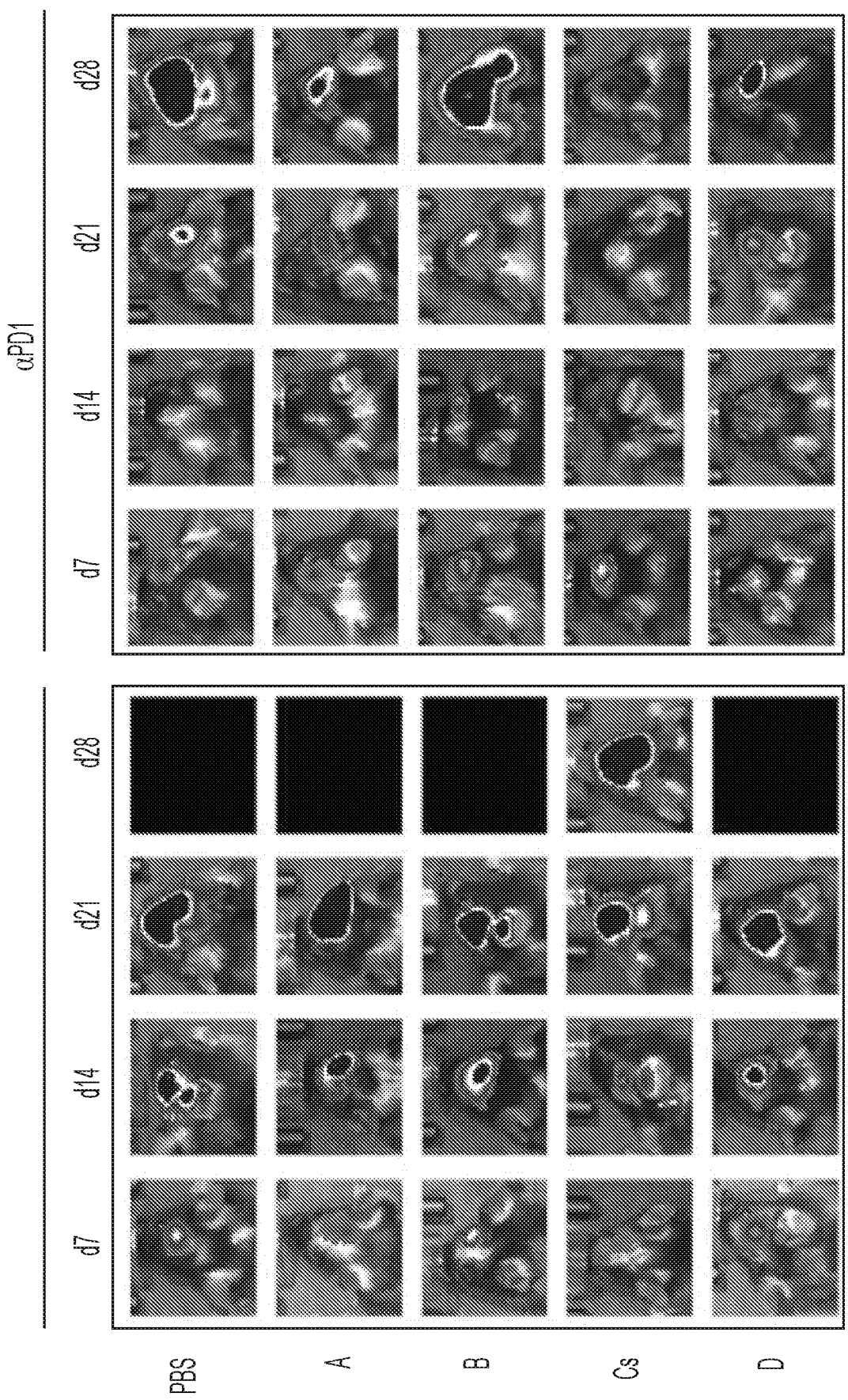
Figure 24F:
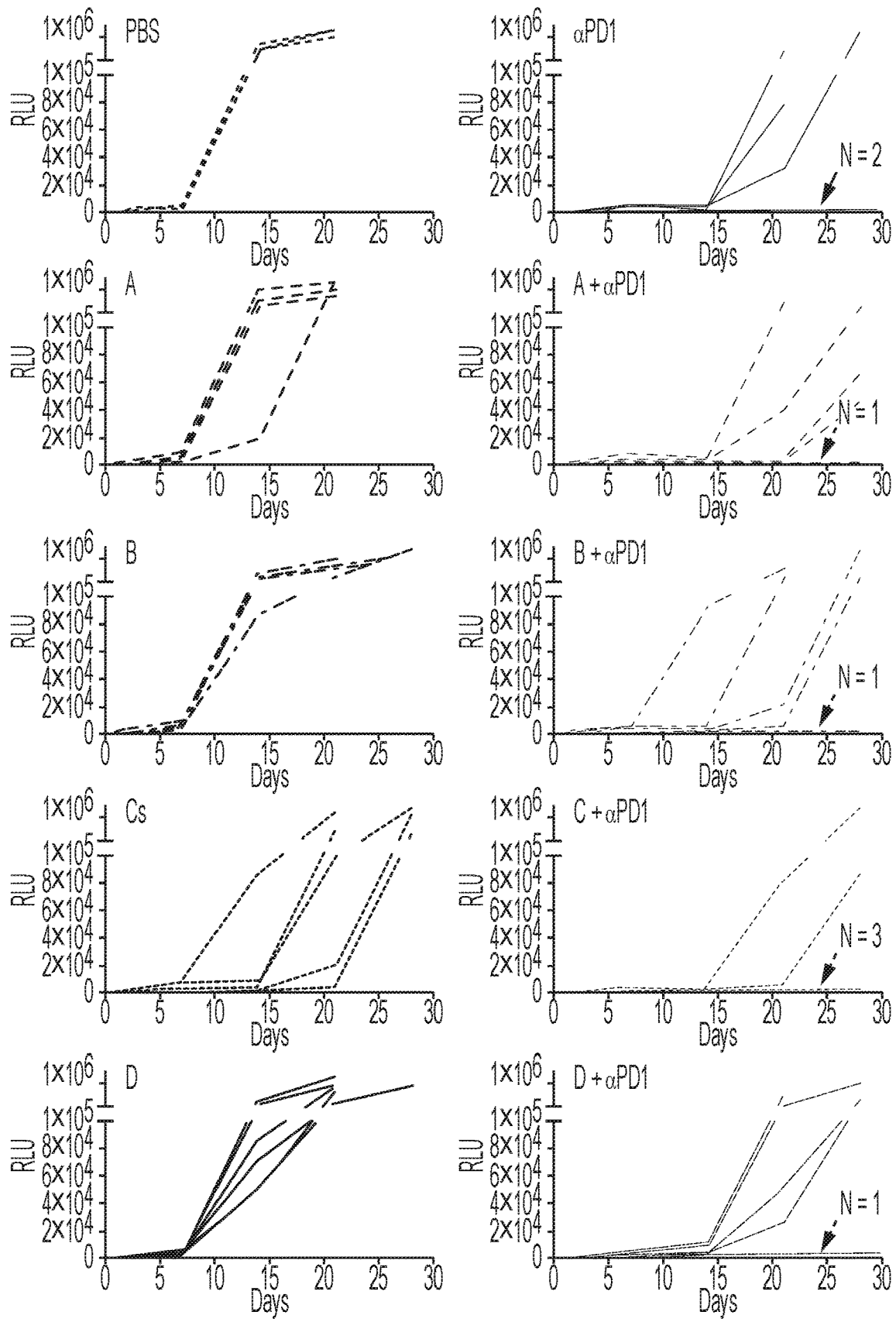

FIGS. 24A-24F illustrate assays showing that VEGF-C dependent anti-PD-1 potentiation is specific among other VEGF family proteins. FIGS. 24A-24B show the results of an assay where C57BL/6 mice received intra-cisterna magna (i.c.m.) injection of AAV-CTRL or -sVEGFR-3. After 4 weeks, mice were euthanized and the dura mater was collected to image the lymphatic vasculature (LYVE1) in the confluence of sinuses (FIG. 24B) (n=5). FIG. 24C shows the results of an assay where mice were pre-treated with AAV-sVEGFR-3 4-6 weeks prior to tumor inoculation. 7 days post tumor inoculation, mice were treated with VEGF-C-mRNA and anti-PD1 (RMP1-14) antibodies (days 7, 9 and 11) (n=5). FIGS. 24D-24F show the results of experiments in which mice were treated with 5 µg of recombinant protein (VEGF-A, B, C156S, or D) in combination with anti-PD1 (RMP1-14) antibodies (days 7, 9 and 11) and monitored for survival (n=5). *P<0.05; P<0.01; *P<0.001; ****P<0.0001 (Log-rank Mantel-Cox test)

Figure 25A:
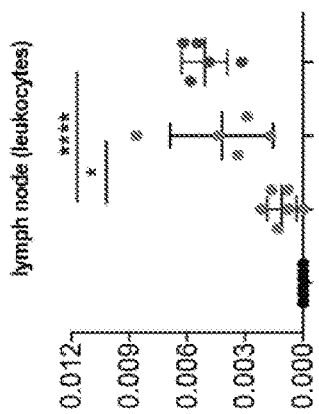
Figure 25B:
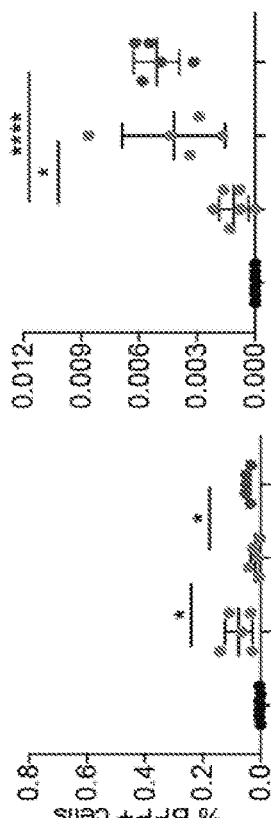
Figure 25C:
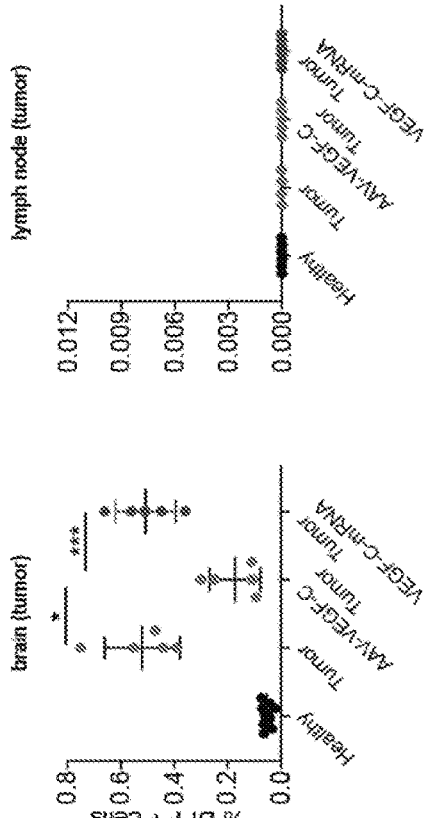
Figure 25D:
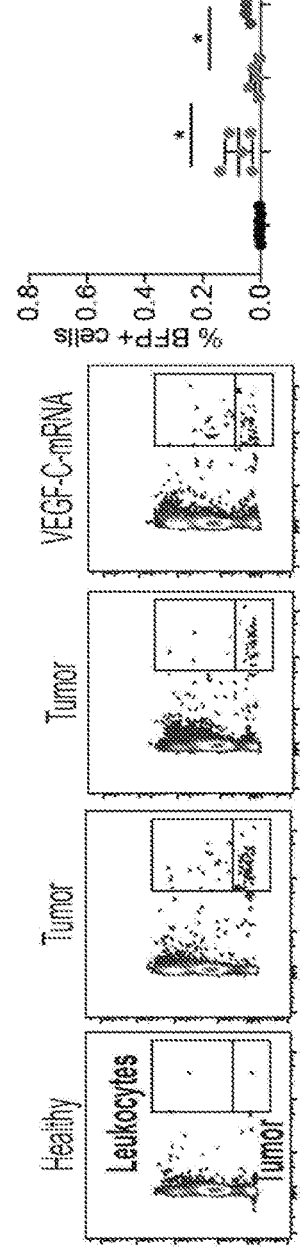
Figure 25E:
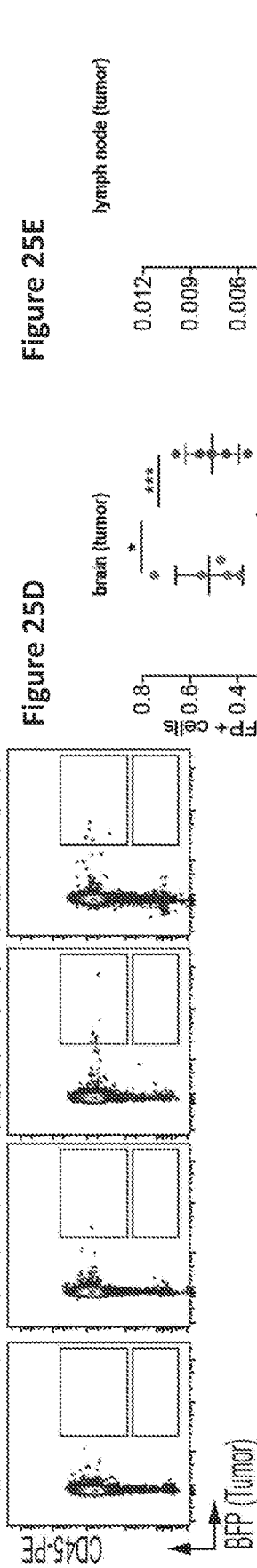
Figure 25G:
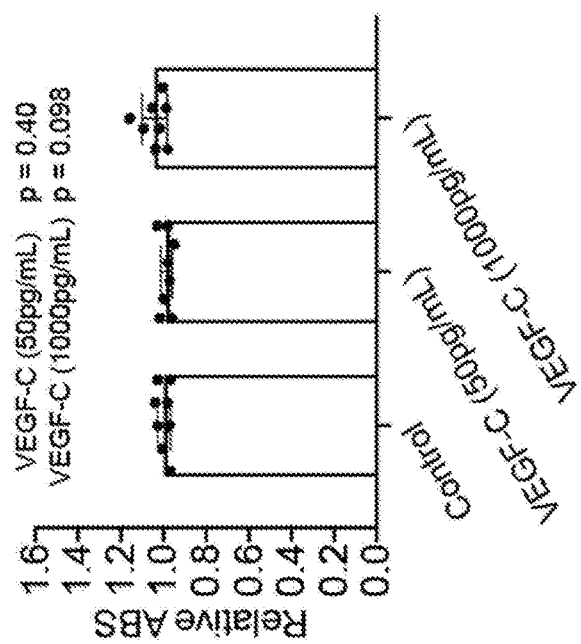
Figure 25F:
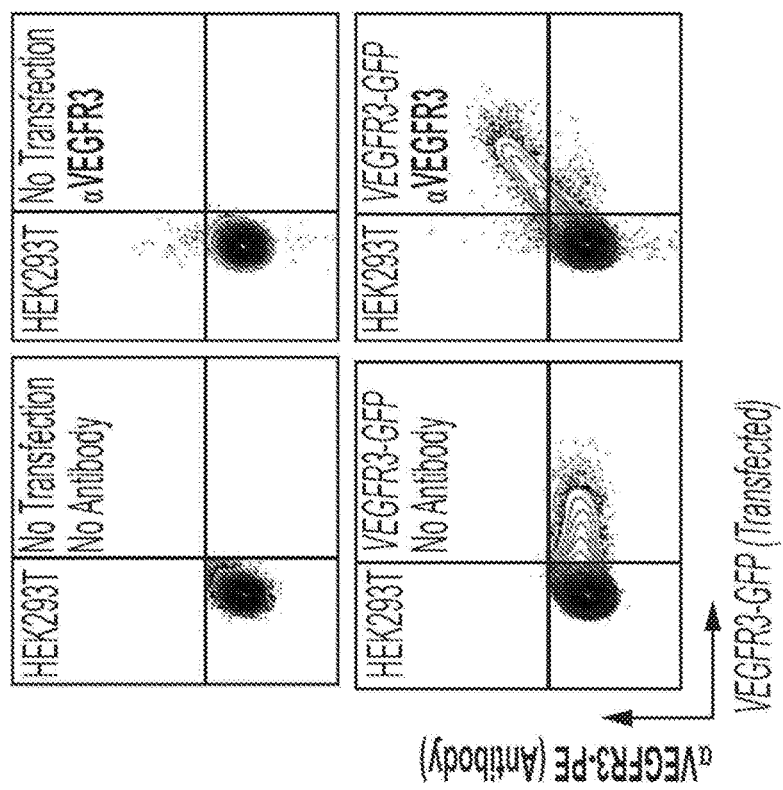

FIGS. 25A-25G illustrate assays showing that VEGF-C increases tumor antigen in draining lymph nodes without direct effects on T cells or dendritic cells. In the assays shown in FIGS. 25A-25E, mice were injected with CT2A-BFP tumors. Mice were treated with VEGF-C-mRNA at day 7. On day 8, brains and lymph nodes from all mice were collected and analyzed using flow cytometry. FIG. 25A illustrates sample plots of experiments, and FIG. 25B illustrates quantification of experiments (n=5). FIG. 25F illustrates the results of using flow cytometry to evaluate VEGFR-3 expression in GL261 cells. VEGFR3-GFP plasmid was transfected into HEK293T cells as a positive control. FIG. 25G shows the results of an MTT assay to measure GL261 cancer cell proliferation in the presence of VEGF-C after 48 hours. *P<0.05; P<0.01; *P<0.001; ****P<0.0001 (two-tailed unpaired Student's t-test)

Figure 26A:
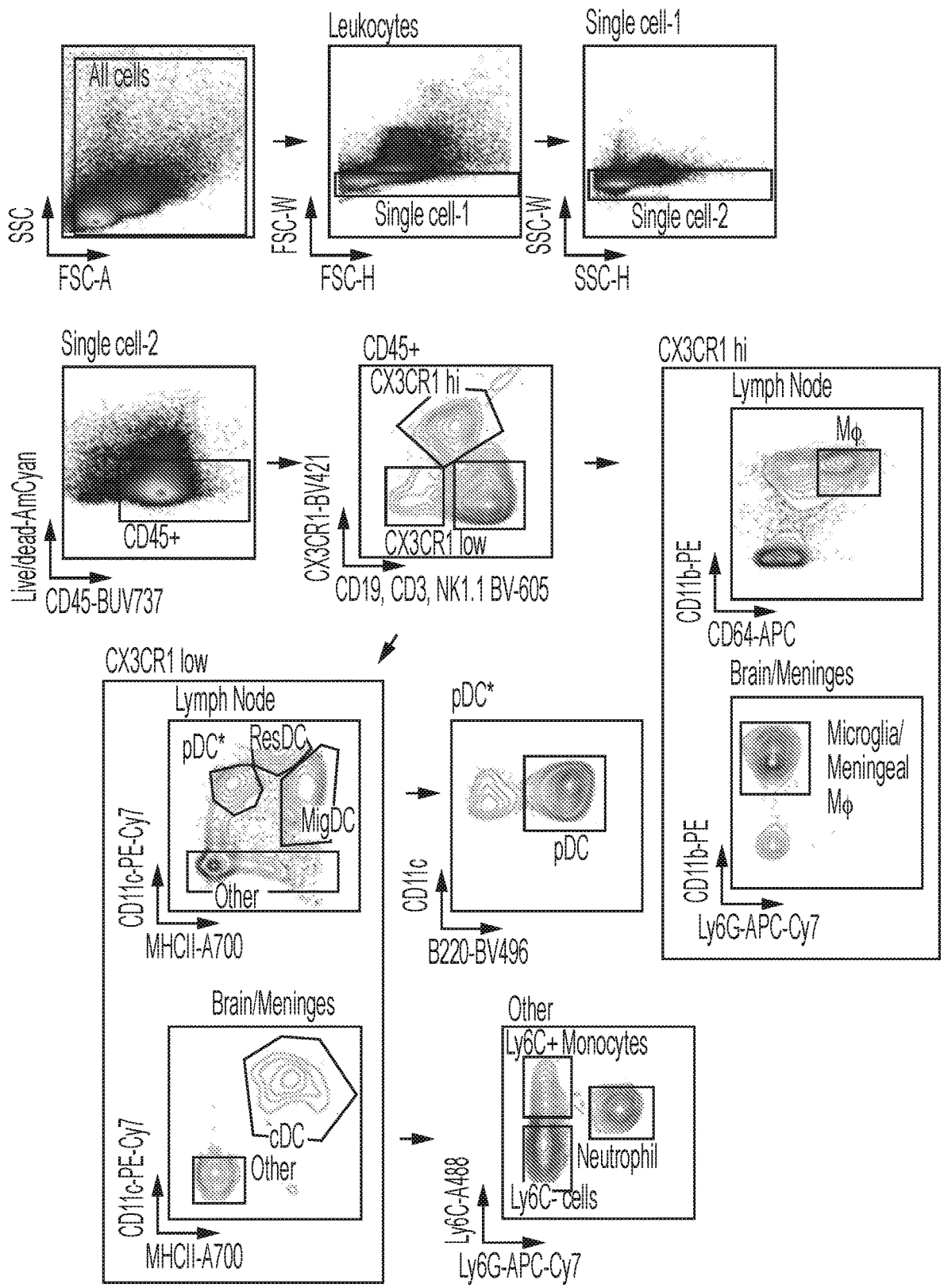
Figure 26B:
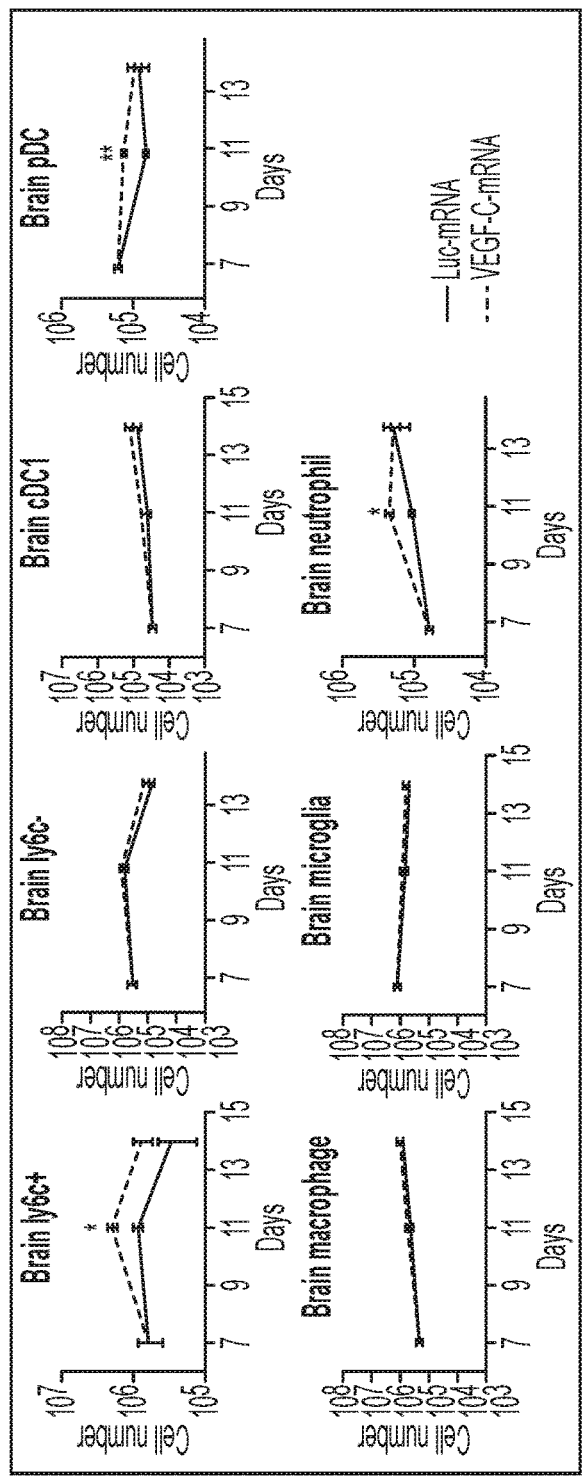
Figure 26C:
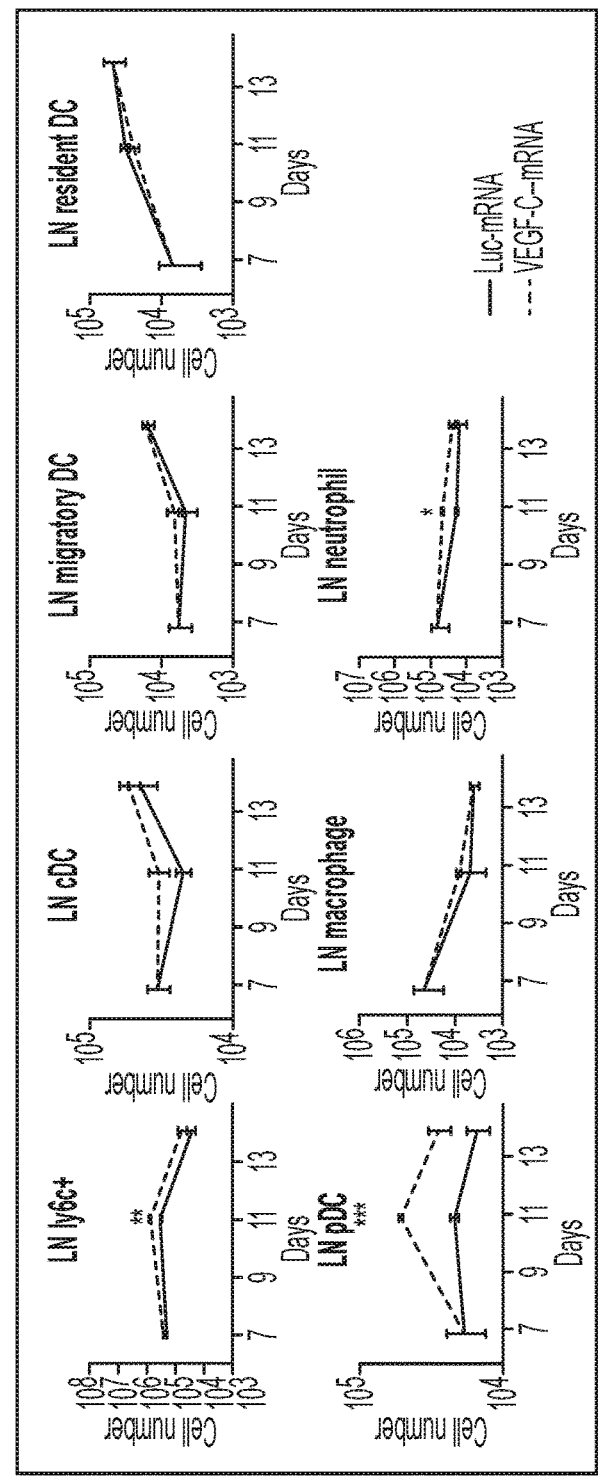
Figure 26D:
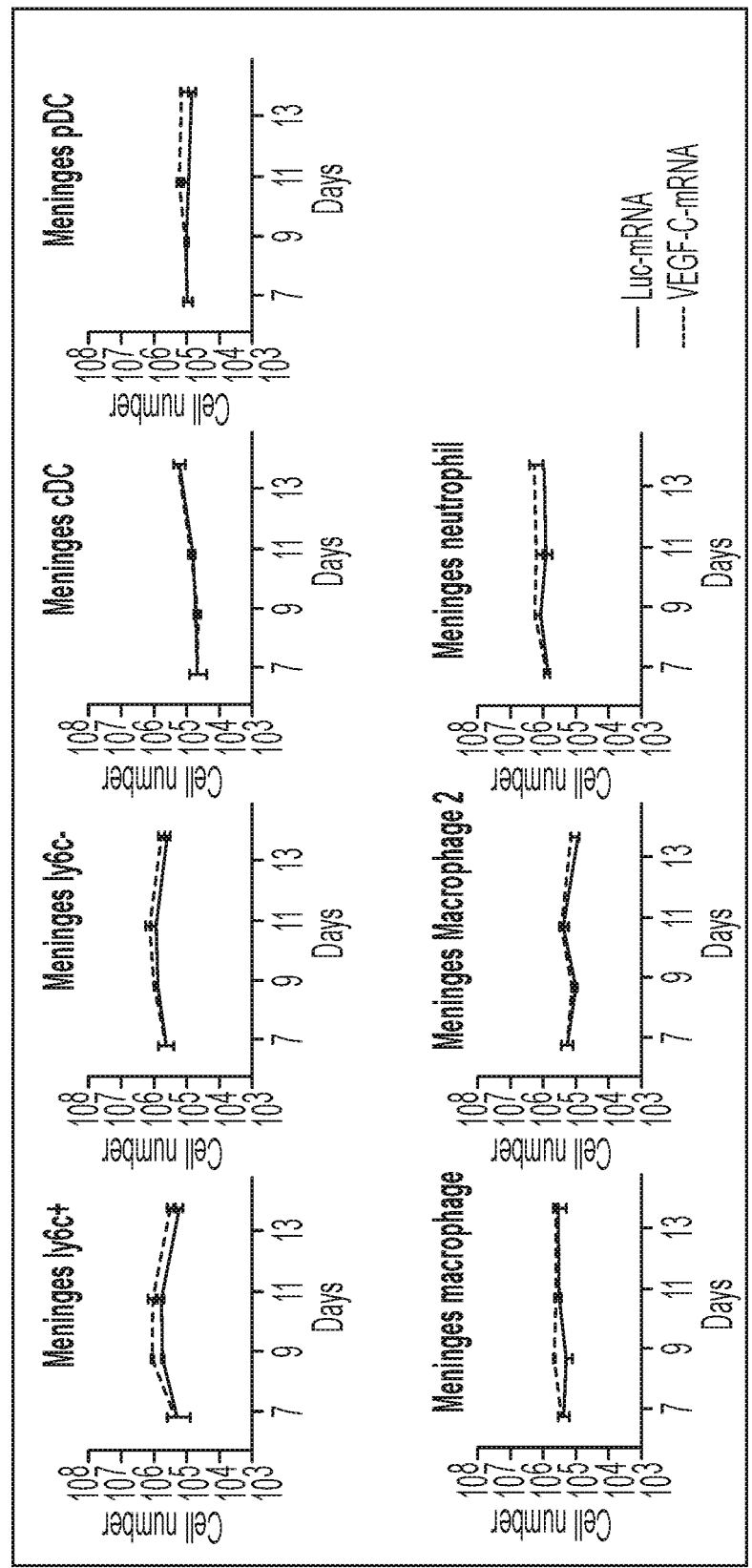
Figure 26E:
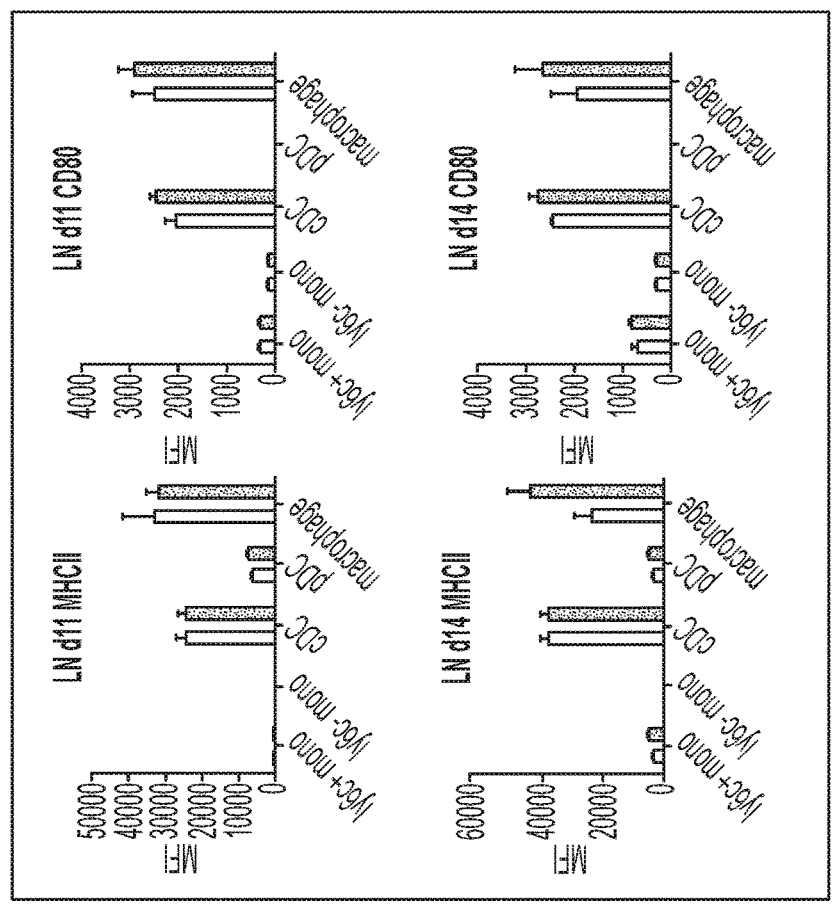
Figure 26F:
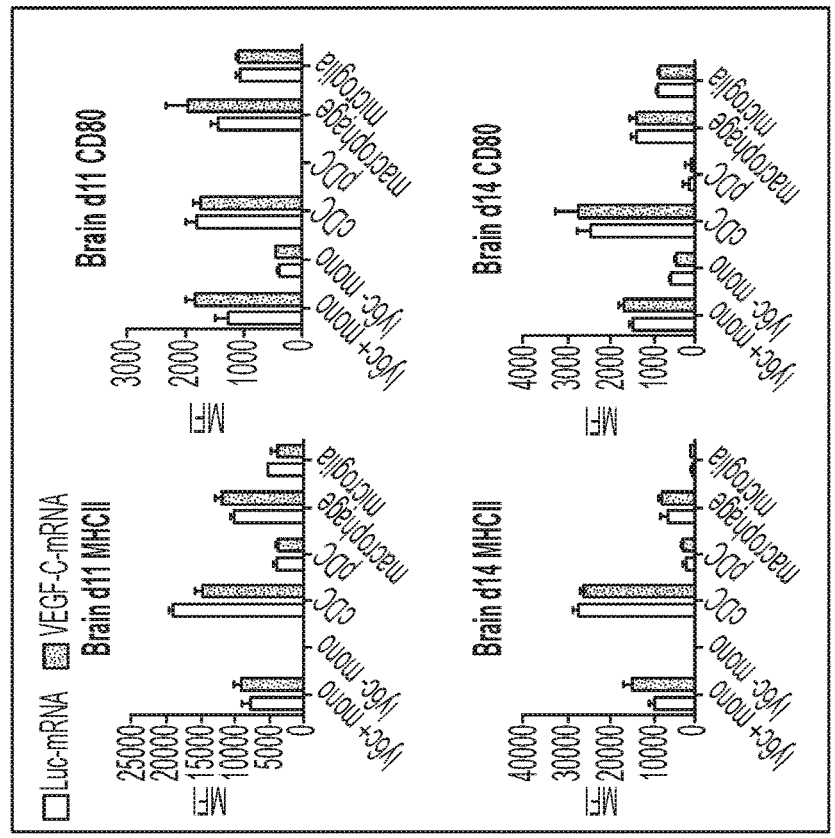
Figure 26G:
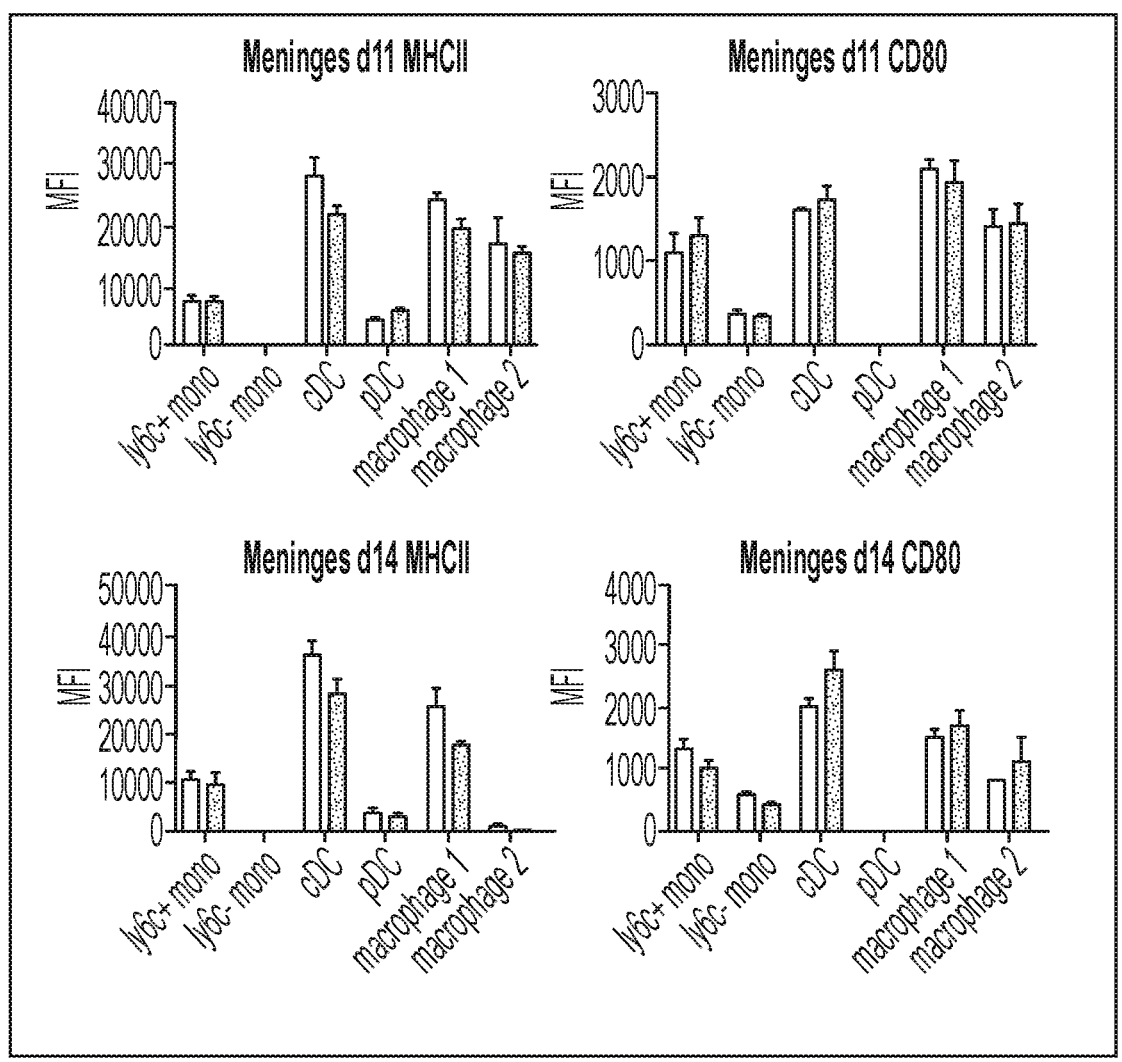

FIGS. 26A-26G show the results of flow cytometry analysis of myeloid cell populations after VEGF-C treatment. Mice bearing 7 day-tumors were treated with Luc-mRNA or VEGF-C-mRNA and evaluated for changes in myeloid populations. FIG. 26A shows a gating strategy for different myeloid cells. In FIGS. 26B-26D, cell counts of different cell types were measured at different time points after VEGF-C-mRNA treatment. In FIGS. 26E-26G, MHCII and CD80 MFI levels were graphed and showed no significant alteration after VEGF-C-mRNA treatment. The data in FIGS. 26B and 26E concern leukocytes from brain tissue. The data in FIGS. 26C and 26F concern leukocytes from draining cervical lymph nodes. The data in FIGS. 26D and 26G concern leukocytes from meninges (n=3, 3 animals pooled for each replicate). *P<0.05; P<0.01; *P<0.001; ****P<0.0001 (two-tailed unpaired Student's t-test).

DETAILED DESCRIPTION

Unless defined otherwise, technical and scientific terms used herein have the same meaning as commonly understood by one of ordinary skill in the art to which this invention belongs.

The terms "a", "an", and "the" do not denote a limitation of quantity, but rather denote the presence of "at least one" of the referenced item.

The terms "patient", "individual", "subject", "mammal", and "animal" are used interchangeably herein and refer to mammals, including, without limitation, human and veterinary animals (e.g., cats, dogs, cows, horses, sheep, pigs, etc.) and experimental animal models. In a preferred embodiment, the subject is a human.

The terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition but does not yet experience or display clinical or subclinical symptoms of the state, disorder or condition; or (2) inhibiting the state, disorder or condition, i.e., arresting, reducing or delaying the development of the disease or a relapse thereof (in case of maintenance treatment) or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

With the term "lymphatic channel" is meant a vascular duct that carries lymph which is eventually added to the venous blood circulation. With the term "lymphangiogenesis" is meant the process of the formation of lymphatic vessels.

In one aspect is provided a method of inducing lymphangiogenesis in the brain or central nervous system of a subject in need thereof, the method comprising administering to the subject an effective amount of a lymphangiogenesis inducer.

In one aspect is provided a method of inducing lymphangiogenesis in a tumor in the brain or central nervous system of a subject in need thereof, the method comprising administering to the subject an effective amount of a lymphangiogenesis inducer.

In another aspect is provided a method of treating a cancer in a subject in need thereof, the method comprising administering to the subject an effective amount of a lymphangiogenesis inducer, wherein the cancer is in the brain or the central nervous system of the subject. Examples of such cancer include, but are not limited to, glioma (e.g., astrocytoma, glioblastoma, oligodendroglioma, brain stem glioma, juvenile pilocytic astrocytoma, and optic nerve glioma), ependymoma, subependymoma, primitive neuroectodermal tumor, ganglioglioma, Schwannoma, germinoma, craniopharyngioma, meningioma, CNS lymphoma, pineal tumor, and rhabdoid tumor.

The glioma can be any tumor that arises from the glia tissue of the brain. In some embodiments the glioma can be a mixed glioma. The glioma can be a low grade glioma or high grade glioma. The glioma can be supratentorial, infratentorial, or pontine.

In certain embodiments, the cancer is glioblastoma. In certain embodiments, the cancer is glioblastoma multiforme (GBM). An initial diagnosis of GBM is generally made using CT or MRI, in which the glioblastomas generally appear as ring-enhancing lesions. Confirmation of the diagnosis can be made based on a biopsy, e.g., a stereotactic biopsy or a craniotomy with tumor resection.

In certain embodiment, the cancer is a metastatic cancer. In certain embodiment, the cancer is a metastatic cancer that has spread into the brain or the central nervous system of the subject. In certain embodiment, the cancer is a metastatic brain cancer.

Without wishing to be bound by theory, the findings described herein may illustrate why brain tumors may grow unhindered in the CNS, and provide for a novel prophylactic and therapeutic approach to GBM therapy. The observed low clinical efficacy of immunotherapy for GBM patients may be due to low antigen sampling from the CNS at steady state and during initial stages of tumor development. The methods and compositions described herein may enable the subject to generate an immune response against one or more endogenous tumor antigens.

In some embodiments of the above aspects, the method comprises administering an immunotherapeutic agent.

Without wishing to be bound by theory, the combination of lymphangiogenesis inducer and an immunotherapeutic agent (e.g., checkpoint inhibitor) can simultaneously overcome the following three problems: immune privilege of the brain, resistance to immunotherapy of brain tumors, and ineffectiveness of immune cells that get the brain. The immune privilege of the brain can be addressed by increasing antigen sampling from the brain (e.g., with VEGFC, VEGFA, VEGFB, or VEGFD). The resistance to immunotherapy (e.g., caused by a low number of immune cells) can be addressed by increasing immune cell access to the brain (e.g., with VEGFC, VEGFA, VEGFB, or VEGFD). The ineffectiveness/exhaustion of cells that reach brain tumors can be addressed by administration of immunotherapeutic agents such as checkpoint inhibitors (e.g., anti-CTLA-4, anti-PD-1, and anti-PD-L1 antibodies).

In some embodiments, the method does not comprise administering a tumor-specific antigen to the subject.

In some embodiments, the lymphangiogenesis inducer is VEGFC. In some embodiments, the lymphangiogenesis inducer is VEGFA. In some embodiments, the lymphangiogenesis inducer is VEGFB. In some embodiments, the lymphangiogenesis inducer is VEGFD. Exemplary advantages provided by VEGFC include, but are not limited to, non-toxicity, amenability to various delivery methods, ease of manufacture, and scalability. In some embodiments, the lymphangiogenesis inducer is administered as a protein. A human VEGFC protein may comprise a sequence that is at least or at most 70%, 80%, 85%, 86%, 87%, 88%, 89%, 90%, 91%, 92%, 93%, 94%, 95%, 96%, 97%, 98%, 99% or 100% identical to the following polypeptide sequence:

MHLLGFFSVACSLLAAALLPGPREAPAAAAAFESGLDLSDAEPDAGEAT

AYASKDLEEQLRSVSSVDELMTVLYPEYWKMYKCQLRKGGWQHNREQAN

LNSRTEETIKFAAAHYNTEILKSIDNEWRKTQCMPREVCIDVGKEFGVA

TNTFFKPPCVSVYRCGGCCNSEGLQCMNTSTSYLSKTLFEITVPLSQGP

KPVTISFANHTSCRCMSKLDVYRQVHSIIRRSLPATLPQCQAANKTCPT

NYMWNNHICRCLAQEDFMFSSDAGDDSTDGFHDICGPNKELDEETCQCV

CRAGLRPASCGPHKELDRNSCQCVCKNKLFPSQCGANREFDENTCQCVC

KRTCPRNQPLNPGKCACECTESPQKCLLKGKKFHHQTCSCYRRPCTNRQ

KACEPGFSQPLNPGKCACECTESPQKCLLKGKKFHHQTCSCYRRPCTNR

QKACEPGFS (SEQ ID NO: 1; available in the UniProt database under accession number #P49767).

A human VEGFA protein may comprise a sequence that is at least or at most 70%, 80%, 85%, 86%, 87%, 88%, 89%, 90%, 91%, 92%, 93%, 94%, 95%, 96%, 97%, 98%, 99% or 100% identical to the following polypeptide sequence:

MTDRQTDTAPSPSYHLLPGRRRTVDAAASRGQGPEPAPGGGVEGVGARG

VALKLFVQLLGCSRFGGAVVRAGEAEPSGAARSASSGREEPQPEEGEEE

EEKEEERGPQWRLGARKPGSWTGEAAVCADSAPAARAPQALARASGRGG

RVARRGAEESGPPHSPSRRGSASRAGPGRASETMNFLLSWVHWSLALLL

YLHHAKWSQAAPMAEGGGQNHHEVVKFMDVYQRSYCHPIETLVDIFQEY

PDEIEYIFKPSCVPLMRCGGCCNDEGLECVPTEESNITMQIMRIKPHQG

QHIGEMSFLQHNKCECRPKKDRARQEKKSVRGKGKGQKRKRKKSRYKSW

SVYVGARCCLMPWSLPGPHPCGPCSERRKHLFVQDPQTCKCSCKNTDSR

CKARQLELNERTCRCDKPRR (SEQ ID NO: 2; available in the GenBank database under accession number #NG_008732.1).

A human VEGFB protein may comprise a sequence that is at least or at most 70%, 80%, 85%, 86%, 87%, 88%, 89%, 90%, 91%, 92%, 93%, 94%, 95%, 96%, 97%, 98%, 99% or 100% identical to the following polypeptide sequence:

MSPLLRRLLLAALLQLAPAQAPVSQPDAPGHQRKVVSWIDVYTRATC

QPREVVVPLTVELMGTVAKQLVPSCVTVQRCGGCCPDDGLECVPTGQHQ

VRMQILMIRYPSSQLGEMSLEEHSQCECRPKKKDSAVKPDRAATPFIHR

PQPRSVPGWDSAPGAPSPADITHPTPAPGPSAHAAPSTTSALTPGPAAA

AADAAASSVAKGGA (SEQ ID NO: 3; available in the GenBank database under accession number #NG_029823.1).

A human VEGFD protein may comprise a sequence that is at least or at most 70%, 80%, 85%, 86%, 87%, 88%, 89%, 90%, 91%, 92%, 93%, 94%, 95%, 96%, 97%, 98%, 99% or 100% identical to the following polypeptide sequence:

MYREWVVVNVFMMLYVQLVQGSSNEHGPVKRSSQSTLERSEQQIRA

ASSLEELLRITHSEDWKLWRCRLRLKSFTSMDSRSASHRSTRFAATFYD

IETLKVIDEEWQRTQCSPRETCVEVASELGKSTNTFFKPPCVNVFRCGG

CCNEESLICMNTSTSYISKQLFEISVPLTSVPELVPVKVANHTGCKCLP

TAPRHPYSIIRRSIQIPEEDRCSHSKKLCPIDMLWDSNKCKCVLQEENP

LAGTEDHSHLQEPALCGPHMMFDEDRCECVCKTPCPKDLIQHPKNCSCF

ECKESLETCCQKHKLFHPDTCSCEDRCPFHTRPCASGKTACAKHCRFPK

EKRAAQGPHSRKNP (SEQ ID NO: 4; available in the GenBank database under accession number #NG_029823.1).

In some embodiments, the lymphangiogenesis inducer is administered as a polynucleotide molecule encoding the lymphangiogenesis inducer protein. The polynucleotide molecule may encode VEGFA. The polynucleotide molecule may encode VEGFB. The polynucleotide molecule may encode VEGFD. The polynucleotide molecule may encode VEGFC. The polynucleotide molecule may comprise the following VEGFC-encoding sequence:

(SEQ ID NO: 5)
ATGCACTTGCTGTGCTTCTTGTCTCTGGCGTGTTCCCTGCTCGCCGC

TGCGCTGATCCCCAGTCCGCGCGAGGCGCCCGCCACCGTCGCCGCCTTC

GAGTCGGGACTGGGCTTCTCGGAAGCGGAGCCCGACGGGGGCGAGGTCA

AGGCTTTTGAAGGCAAAGACCTGGAGGAGCAGTTGCGGTCTGTGTCCAG

CGTAGATGAGCTGATGTCTGTCCTGTACCCAGACTACTGGAAAATGTAC

AAGTGCCAGCTGCGGAAAGGCGGCTGGCAGCAGCCCACCCTCAATACCA

GGACAGGGGACAGTGTAAAATTTGCTGCTGCACATTATAACACAGAGAT

CCTGAAAAGTATTGATAATGAGTGGAGAAAGACTCAATGCATGCCACGT

GAGGTGTGTATAGATGTGGGGAAGGAGTTTGGAGCAGCCACAAACACCT

TCTTTAAACCTCCATGTGTGTCCGTCTACAGATGTGGGGGTTGCTGCAA

CAGCGAGGGGCTGCAGTGCATGAACACCAGCACAGGTTACCTCAGCAAG

ACGTTGTTTGAAATTACAGTGCCTCTCTCACAAGGCCCCAAACCAGTCA

CAATCAGTTTTGCCAATCACACTTCCTGCCGGTGCATGTCTAAACTGGA

TGTTTACAGACAAGTTCATTCAATTATTAGACGTTCTCTGCCAGCAACA

TTACCACAGTGTCAGGCAGCTAACAAGACATGTCCAACAAACTATGTGT

GGAATAACTACATGTGCCGATGCCTGGCTCAGCAGGATTTTATCTTTTA

TTCAAATGTTGAAGATGACTCAACCAATGGATTCCATGATGTCTGTGGA

CCCAACAAGGAGCTGGATGAAGACACCTGTCAGTGTGTCTGCAAGGGGG

GGCTTCGGCCATCTAGTTGTGGACCCCACAAAGAACTAGATAGAGACTC

ATGTCAGTGTGTCTGTAAAAACAAACTTTTCCCTAATTCATGTGGAGCC

AACAGGGAATTTGATGAGAATACATGTCAGTGTGTATGTAAAAGAACGT

GTCCAAGAAATCAGCCCCTGAATCCTGGGAAATGTGCCTGTGAATGTAC

AGAAAACACACAGAAGTGCTTCCTTAAAGGGAAGAAGTTCCACCATCAA

ACATGCAGTTGTTACAGAAGACCGTGTGCGAATCGACTGAAGCATTGTG

```
ATCCAGGACTGTCCTTTAGTGAAGAAGTATGCCGCTGTGTCCCATCGTA
TTGGAAAAGGCCACATCTGAACTAA.
```

The polynucleotide molecule may comprise a sequence with at least 90%, 91%, 92%, 93%, 94%, 95%, 96%, 97%, 98%, 99%, or 99.5% sequence identity to the following VEGFC-encoding sequence:

```
                                         (SEQ ID NO: 6)
ATGCACTTGCTGTGCTTCTTGTCTCTGGCGTGTTCCCTGCTCGCCGCTG

CGCTGATCCCCAGTCCGCGCGAGGCGCCCGCCACCGTCGCCGCCTTCGA

GTCGGGACTGGCTTCTCGGAAGCGGAGCCCGACGGGGGCGAGGTCAAG

GCTTTTGAAGGCAAAGACCTGGAGGAGCAGTTGCGGTCTGTGTCCAGCG

TAGATGAGCTGATGTCTGTCCTGTACCCAGACTACTGGAAAATGTACAA

GTGCCAGCTGCGGAAAGGCGGCTGGCAGCAGCCCACCCTCAATACCAGG

ACAGGGGACAGTGTAAAATTTGCTGCTGCACATTATAACACAGAGATCC

TGAAAAGTATTGATAATGAGTGGAGAAAGACTCAATGCATGCCACGTGA

GGTGTGTATAGATGTGGGGAAGGAGTTTGGAGCAGCCACAAACACCTTC

TTTAAACCTCCATGTGTGTCCGTCTACAGATGTGGGGGTTGCTGCAACA

GCGAGGGGCTGCAGTGCATGAACACCAGCACAGGTTACCTCAGCAAGAC

GTTGTTTGAAATTACAGTGCCTCTCTCACAAGGCCCCAAACCAGTCACA

ATCAGTTTTGCCAATCACACTTCCTGCCGGTGCATGTCTAAACTGGATG

TTTACAGACAAGTTCATTCAATTATTAGACGTTCTCTGCCAGCAACATT

ACCACAGTGTCAGGCAGCTAACAAGACATGTCCAACAAACTATGTGTGG

AATAACTACATGTGCCGATGCCTGGCTCAGCAGGATTTTATCTTTTATT

CAAATGTTGAAGATGACTCAACCAATGGATTCCATGATGTCTGTGGACC

CAACAAGGAGCTGGATGAAGACACCTGTCAGTGTGTCTGCAAGGGGGG

CTTCGGCCATCTAGTTGTGGACCCCACAAAGAACTAGATAGAGACTCAT

GTCAGTGTGTCTGTAAAAACAAACTTTTCCCTAATTCATGTGGAGCCAA

CAGGGAATTTGATGAGAATACATGTCAGTGTGTATGTAAAAGAACGTGT

CCAAGAAATCAGCCCCTGAATCCTGGGAAATGTGCCTGTGAATGTACAG

AAAACACACAGAAGTGCTTCCTTAAAGGGAAGAAGTTCCACCATCAAAC

ATGCAGTTGTTACAGAAGACCGTGTGCGAATCGACTGAAGCATTGTGAT

CCAGGACTGTCCTTTAGTGAAGAAGTATGCCGCTGTGTCCCATCGTATT

GGAAAAGGCCACATCTGAACTAA.
```

The polynucleotide molecule may comprise the following VEGFA-encoding sequence:

```
                                         (SEQ ID NO: 7)
CTGACGGACAGACAGACAGACACCGCCCCCAGCCCCAGCTACCACCTCC

TCCCCGGCCGGCGGCGGACAGTGGACGCGGCGGCGAGCCGCGGGCAGGG

GCCGGAGCCCGCGCCCGGAGGCGGGGTGGAGGGGGTCGGGGCTCGCGGC

GTCGCACTGAAACTTTTCGTCCAACTTCTGGGCTGTTCTCGCTTCGGAG

GAGCCGTGGTCCGCGCGGGGGAAGCCGAGCCGAGCGGAGCCGCGAGAAG

TGCTAGCTCGGGCCGGGAGGAGCCGCAGCCGGAGGAGGGGGAGGAGGAA

GAAGAGAAGGAAGAGGAGAGGGGGCCGCAGTGGCGACTCGGCGCTCGGA

AGCCGGGCTCATGGACGGGTGAGGCGGCGGTGTGCGCAGACAGTGCTCC

AGCCGCGCGCGCTCCCCAGGCCCTGGCCCGGGCCTCGGGCCGGGGAGGA

AGAGTAGCTCGCCGAGGCGCCGAGGAGAGCGGGCCGCCCCACAGCCCGA

GCCGGAGAGGGAGCGCGAGCCGCGCCGGCCCCGGTCGGGCCTCCGAAAC

CATGAACTTTCTGCTGTCTTGGGTGCATTGGAGCCTTGCCTTGCTGCTC

TACCTCCACCATGCCAAGTGGTCCCAGGCTGCACCCATGGCAGAAGGAG

GAGGGCAGAATCATCACGAAGTGGTGAAGTTCATGGATGTCTATCAGCG

CAGCTACTGCCATCCAATCGAGACCCTGGTGGACATCTTCCAGGAGTAC

CCTGATGAGATCGAGTACATCTTCAAGCCATCCTGTGTGCCCCTGATGC

GATGCGGGGCTGCTGCAATGACGAGGGCCTGGAGTGTGTGCCCACTGA

GGAGTCCAACATCACCATGCAGATTATGCGGATCAAACCTCACCAAGGC

CAGCACATAGGAGAGATGAGCTTCCTACAGCACAACAAATGTGAATGCA

GACCAAAGAAAGATAGAGCAAGACAAGAAAAAAAAATCAGTTCGAGGAAA

GGGAAAGGGGCAAAAACGAAAGCGCAAGAAATCCCGGTATAAGTCCTGG

AGCGTGTACGTTGGTGCCCGCTGCTGTCTAATGCCCTGGAGCCTCCCTG

GCCCCCATCCCTGTGGGCCTTGCTCAGAGCGGAGAAAGCATTTGTTTGT

ACAAGATCCGCAGACGTGTAAATGTTCCTGCAAAAACACAGACTCGCGT

TGCAAGGCGAGGCAGCTTGAGTTAAACGAACGTACTTGCAGATGTGACA

AGCCGAGGCGG.
```

The polynucleotide molecule may comprise a sequence with at least 90%, 91%, 92%, 93%, 94%, 95%, 96%, 97%, 98%, 99%, or 99.5% sequence identity to the following VEGFA-encoding sequence:

```
                                         (SEQ ID NO: 8)
CTGACGGACAGACAGACAGACACCGCCCCCAGCCCCAGCTACCACCTCC

TCCCCGGCCGGCGGCGGACAGTGGACGCGGCGGCGAGCCGCGGGCAGGG

GCCGGAGCCCGCGCCCGGAGGCGGGGTGGAGGGGGTCGGGGCTCGCGGC

GTCGCACTGAAACTTTTCGTCCAACTTCTGGGCTGTTCTCGCTTCGGAG

GAGCCGTGGTCCGCGCGGGGGAAGCCGAGCCGAGCGGAGCCGCGAGAAG

TGCTAGCTCGGGCCGGGAGGAGCCGCAGCCGGAGGAGGGGGAGGAGGAA

GAAGAGAAGGAAGAGGAGAGGGGGCCGCAGTGGCGACTCGGCGCTCGGA

AGCCGGGCTCATGGACGGGTGAGGCGGCGGTGTGCGCAGACAGTGCTCC

AGCCGCGCGCGCTCCCCAGGCCCTGGCCCGGGCCTCGGGCCGGGGAGGA

AGAGTAGCTCGCCGAGGCGCCGAGGAGAGCGGGCCGCCCCACAGCCCGA

GCCGGAGAGGGAGCGCGAGCCGCGCCGGCCCCGGTCGGGCCTCCGAAAC

CATGAACTTTCTGCTGTCTTGGGTGCATTGGAGCCTTGCCTTGCTGCTC

TACCTCCACCATGCCAAGTGGTCCCAGGCTGCACCCATGGCAGAAGGAG

GAGGGCAGAATCATCACGAAGTGGTGAAGTTCATGGATGTCTATCAGCG

CAGCTACTGCCATCCAATCGAGACCCTGGTGGACATCTTCCAGGAGTAC

CCTGATGAGATCGAGTACATCTTCAAGCCATCCTGTGTGCCCCTGATGC
```

GATGCGGGGGCTGCTGCAATGACGAGGGCCTGGAGTGTGTGCCCACTGA

GGAGTCCAACATCACCATGCAGATTATGCGGATCAAACCTCACCAAGGC

CAGCACATAGGAGAGATGAGCTTCCTACAGCACAACAAATGTGAATGCA

GACCAAAGAAAGATAGAGCAAGACAAGAAAAAAAATCAGTTCGAGGAAA

GGGAAAGGGGCAAAAACGAAAGCGCAAGAAATCCCGGTATAAGTCCTGG

AGCGTGTACGTTGGTGCCCGCTGCTGTCTAATGCCCTGGAGCCTCCCTG

GCCCCCATCCCTGTGGGCCTTGCTCAGAGCGGAGAAAGCATTTGTTTGT

ACAAGATCCGCAGACGTGTAAATGTTCCTGCAAAAACACAGACTCGCGT

TGCAAGGCGAGGCAGCTTGAGTTAAACGAACGTACTTGCAGATGTGACA

AGCCGAGGCGG.

The polynucleotide molecule may comprise the following VEGFB-encoding sequence:

(SEQ ID NO: 9)
GTCTCCCAGCCTGATGCCCCTGGCCACCAGAGGAAAGTGGTGTCATGGA

TAGATGTGTATACTCGCGCTACCTGCCAGCCCCGGGAGGTGGTGGTGCC

CTTGACTGTGGAGCTCATGGGCACCGTGGCCAAACAGCTGGTGCCCAGC

TGCGTGACTGTGCAGCGCTGTGGTGGCTGCTGCCCTGACGATGGCCTGG

AGTGTGTGCCCACTGGGCAGCACCAAGTCCGGATGCAGATCCTCATGAT

CCGGTACCCGAGCAGTCAGCTGGGGGAGATGTCCCTGGAAGAACACAGC

CAGTGTGAATGCAGACCTAAAAAAAAGGACAGTGCTGTGAAGCCAGACA

GGGCTGCCACTCCCCACCACCGTCCCCAGCCCCGTTCTGTTCCGGGCTG

GGACTCTGCCCCCGGAGCACCCTCCCCAGCTGACATCACCCAT.

The polynucleotide molecule may comprise a sequence with at least 90%, 91%, 92%, 93%, 94%, 95%, 96%, 97%, 98%, 99%, or 99.5% sequence identity to the following VEGFB-encoding sequence:

(SEQ ID NO: 10)
GTCTCCCAGCCTGATGCCCCTGGCCACCAGAGGAAAGTGGTGTCATGGA

TAGATGTGTATACTCGCGCTACCTGCCAGCCCCGGGAGGTGGTGGTGCC

CTTGACTGTGGAGCTCATGGGCACCGTGGCCAAACAGCTGGTGCCCAGC

TGCGTGACTGTGCAGCGCTGTGGTGGCTGCTGCCCTGACGATGGCCTGG

AGTGTGTGCCCACTGGGCAGCACCAAGTCCGGATGCAGATCCTCATGAT

CCGGTACCCGAGCAGTCAGCTGGGGGAGATGTCCCTGGAAGAACACAGC

CAGTGTGAATGCAGACCTAAAAAAAAGGACAGTGCTGTGAAGCCAGACA

GGGCTGCCACTCCCCACCACCGTCCCCAGCCCCGTTCTGTTCCGGGCTG

GGACTCTGCCCCCGGAGCACCCTCCCCAGCTGACATCACCCAT.

The polynucleotide molecule may comprise the following VEGFD-encoding sequence:

(SEQ ID NO: 11)
ATGTACAGAGAGTGGGTAGTGGTGAATGTTTTCATGATGTTGTACGTCC

AGCTGGTGCAGGGCTCCAGTAATGAACATGGACCAGTGAAGCGATCATC

TCAGTCCACATTGGAACGATCTGAACAGCAGATCAGGGCTGCTTCTAGT

TTGGAGGAACTACTTCGAATTACTCACTCTGAGGACTGGAAGCTGTGGA

GATGCAGGCTGAGGCTCAAAAGTTTTACCAGTATGGACTCTCGCTCAGC

ATCCCATCGGTCCACTAGGTTTGCGGCAACTTTCTATGACATTGAAACA

CTAAAAGTTATAGATGAAGAATGGCAAAGAACTCAGTGCAGCCCTAGAG

AAACGTGCGTGGAGGTGGCCAGTGAGCTGGGGAAGAGTACCAACACATT

CTTCAAGCCCCCTTGTGTGAACGTGTTCCGATGTGGTGGCTGTTGCAAT

GAAGAGAGCCTTATCTGTATGAACACCAGCACCTCGTACATTTCCAAAC

AGCTCTTTGAGATATCAGTGCCTTTGACATCAGTACCTGAATTAGTGCC

TGTTAAAGTTGCCAATCATACAGGTTGTAAGTGCTTGCCAACAGCCCCC

CGCCATCCATACTCAATTATCAGAAGATCCATCCAGATCCCTGAAGAAG

ATCGCTGTTCCCATTCCAAGAAACTCTGTCCTATTGACATGCTATGGGA

TAGCAACAAATGTAAATGTGTTTTGCAGGAGGAAAATCCACTTGCTGGA

ACAGAAGACCACTCTCATCTCCAGGAACCAGCTCTCTGTGGGCCACACA

TGATGTTTGACGAAGATCGTTGCGAGTGTGTCTGTAAAACACCATGTCC

CAAAGATCTAATCCAGCACCCCAAAAACTGCAGTTGCTTTGAGTGCAAA

GAAAGTCTGGAGACCTGCTGCCAGAAGCACAAGCTATTTCACCCAGACA

CCTGCAGCTGTGAGGACAGATGCCCCTTTCATACCAGACCATGTGCAAG

TGGCAAAACAGCATGTGCAAAGCATTGCCGCTTTCCAAAGGAGAAAAGG

GCTGCCCAGGGGCCCCACAGCCGAAAGAATCCT.

The polynucleotide molecule may comprise a sequence with at least 90%, 91%, 92%, 93%, 94%, 95%, 96%, 97%, 98%, 99%, or 99.5% sequence identity to the following VEGFD-encoding sequence:

(SEQ ID NO: 12)
ATGTACAGAGAGTGGGTAGTGGTGAATGTTTTCATGATGTTGTACGTCC

AGCTGGTGCAGGGCTCCAGTAATGAACATGGACCAGTGAAGCGATCATC

TCAGTCCACATTGGAACGATCTGAACAGCAGATCAGGGCTGCTTCTAGT

TTGGAGGAACTACTTCGAATTACTCACTCTGAGGACTGGAAGCTGTGGA

GATGCAGGCTGAGGCTCAAAAGTTTTACCAGTATGGACTCTCGCTCAGC

ATCCCATCGGTCCACTAGGTTTGCGGCAACTTTCTATGACATTGAAACA

CTAAAAGTTATAGATGAAGAATGGCAAAGAACTCAGTGCAGCCCTAGAG

AAACGTGCGTGGAGGTGGCCAGTGAGCTGGGGAAGAGTACCAACACATT

CTTCAAGCCCCTTGTGTGAACGTGTTCCGATGTGGTGGCTGTTGCAAT

GAAGAGAGCCTTATCTGTATGAACACCAGCACCTCGTACATTTCCAAAC

AGCTCTTTGAGATATCAGTGCCTTTGACATCAGTACCTGAATTAGTGCC

TGTTAAAGTTGCCAATCATACAGGTTGTAAGTGCTTGCCAACAGCCCCC

CGCCATCCATACTCAATTATCAGAAGATCCATCCAGATCCCTGAAGAAG

ATCGCTGTTCCCATTCCAAGAAACTCTGTCCTATTGACATGCTATGGGA

TAGCAACAAATGTAAATGTGTTTTGCAGGAGGAAAATCCACTTGCTGGA

ACAGAAGACCACTCTCATCTCCAGGAACCAGCTCTCTGTGGGCCACACA

TGATGTTTGACGAAGATCGTTGCGAGTGTGTCTGTAAAACACCATGTCC

```
-continued
CAAAGATCTAATCCAGCACCCCAAAAACTGCAGTTGCTTTGAGTGCAAA

GAAAGTCTGGAGACCTGCTGCCAGAAGCACAAGCTATTTCACCCAGACA

CCTGCAGCTGTGAGGACAGATGCCCCTTTCATACCAGACCATGTGCAAG

TGGCAAAACAGCATGTGCAAAGCATTGCCGCTTTCCAAAGGAGAAAAGG

GCTGCCCAGGGGCCCCACAGCCGAAAGAATCCT.
```

In some embodiments, the polynucleotide molecule encoding the lymphangiogenesis inducer is a mRNA.

mRNA can provide several advantages to AAV and other gene delivery systems, which include, but are not limited to one or more of the following: mRNA can be highly customizable, mRNA can prevent recognition from pattern recognition receptors and nucleases to allow for sustained expression, mRNA can provide for well-controlled expression kinetics with the option of repeated dosing [53, 54], and mRNA can provide for low risk of integration into the genome due to its localization in the cytosol. mRNA can also be cost-effective.

The mRNA may comprise a modified nucleotide. In some embodiments, the modified nucleotide is a 5-methyl-cytosine or a pseudo-uridine. In some embodiments, the polynucleotide molecule encoding the lymphangiogenesis inducer comprises a 5' cap. In some embodiments, the 5' cap is added using the CleanCap Reagent AG. CleanCap is made up of $C_{32}H_{43}N_{15}O_{24}P_4$ and allows for high capping efficiencies resulting in more active mRNA. Cap 1 does not activate Pattern Recognition Receptors and is important for proficient in vivo expression. Without wishing to be bound by theory, any one or more of 5-methyl-cytosine, pseudo-uridine, and the 5' cap may improve stability of the mRNA, which in turn can prolong expression of the lymphangiogenesis inducer.

In some embodiments, the polynucleotide molecule encoding the lymphangiogenesis inducer is comprised within a viral vector. Exemplary viral vectors include, but are not limited to, herpes virus, cytomegalovirus, poliovirus, alphavirus, vaccinia virus, rabies virus, adeno-associated virus (AAV), a retrovirus and adenovirus. The retrovirus may be a lentivirus. The recombinant viral particle may be derived from an adeno-associated virus (AAV). In some embodiments, the AAV is AAV2. In some embodiments, the AAV is AAV5. In some embodiments, the AAV is AAV9.

In some embodiments, the lymphangiogenesis inducer can be administered in a dosage regimen involving a combination of mRNA and AAV. One or more administrations of mRNA can be undertaken to quickly obtain high expression, such as within 2 hours post-delivery of the mRNA. The expression of lymphangiogenesis inducer provided by AAV may take 7-14 days, or even up to four weeks, depending on the serotype. Administration of protein can be undertaken to get instantaneous expression. Administration of both mRNA and AAV, conjointly or in short succession, can provide a sustained expression of the lymphangiogenesis inducer. Without wishing to be bound by theory, administering protein can provide for instantaneous expression and controlled expression kinetics, with multiple doses possible. Without wishing to be bound by theory, administering mRNA can provide for instantaneous expression, controlled expression kinetics, and high expression, with multiple doses possible. Without wishing to be bound by theory, administering AAV can provide for delayed expression and high levels of expression. The expression kinetics can be effectively and sensitively measured using ELISA and Western blotting.

In some embodiments, the polynucleotide molecule encoding the lymphangiogenesis inducer is comprised within a liposome. The lymphangiogenesis inducer may be encapsulated in the aqueous interior of a liposome, interspersed within the lipid bilayer of a liposome, attached to a liposome via a linking molecule that is associated with both the liposome and the polynucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. The liposome comprising the lymphangiogenesis inducer may be present in a bilayer structure, as micelles, or with a "collapsed" structure. The liposomes may also simply be interspersed in a solution, possibly forming aggregates which are not uniform in either size or shape. For example, a nucleotide (e.g., siRNA) may be encapsulated in a neutral liposome using a method involving ethanol and calcium. The shape may be that of a spherical vesicle. In various embodiments, the liposomes may comprise one or more concentric layers of lipid bilayer molecules. In some embodiments, the lipid components include a combination of C12-200, XTC, MC3, NC98-5, DLinDMA, HGT5001cis, HGT5001trans, HGT5000, HGT4003, DLinKC2DMA, ALNY100, ICE, DLinKC2DMA, CHOL, DOPE, DMG-PEG-2000, C12-200, DOPE, CHOL, and DMGPEG2K.

In some embodiments, the polynucleotide molecule encoding the lymphangiogenesis inducer is attached to a nanoparticle or a polymer. In certain embodiments, present nanoparticles further comprise at least one agent that specifically binds a particular type or category of cells and/or other particular type compounds, (e.g., a moiety that targets a specific ceil or type of cell). In some embodiments, the nanoparticle is a nanosphere. In some embodiments, the polymer is dextran, poly (amine-co-ester), poly(beta-aminoester), polyethylenimine, poly-L-Lysine, polyethylene glycol, or dendrimers In some embodiments, the polynucleotide molecule encoding the lymphangiogenesis inducer is comprised within a recombinant viral particle or within a virus-like particle (VLP).

In some embodiments, the immunotherapeutic agent is an immune checkpoint inhibitor. The immune checkpoint inhibitor may target PD-1, PD-L1, CTLA-4, TIGIT, TIM-3, LAG-3, BTLA, GITR, 4-1BB, or Ox-40. The immune checkpoint inhibitor may be an anti-PD-1 antibody, an anti-PD-L1 antibody, an anti-CTLA-4 antibody, an anti-TIGIT antibody, an anti-TIM-3 antibody, an anti-LAG-3 antibody, an anti-BTLA antibody, an anti-GITR antibody, an anti-4-1BB antibody, or an anti-Ox-40 antibody. In some embodiments, the immune checkpoint inhibitor is an anti-PD-1 antibody.

The lymphangiogenesis inducer and the immunotherapeutic agent may be administered conjointly. For example, the lymphangiogenesis inducer and the immunotherapeutic agent are administered in the same composition.

Alternatively, the lymphangiogenesis inducer and the immunotherapeutic agent may be administered sequentially.

In various embodiments, the lymphangiogenesis inducer is administered prior to administering the immunotherapeutic agent. The lymphangiogenesis inducer can be administered locally to the brain or central nervous system (e.g., to the cisterna magna) and then the immunotherapeutic agent can be administered systemically (e.g., intravenously). The lymphangiogenesis inducer can be administered intratumorally and then the immunotherapeutic agent can be administered systemically (e.g., intravenously). The lymphangiogenesis inducer can be administered intrathecally and then the immunotherapeutic agent can be administered systemically (e.g., intravenously). The lymphangiogenesis inducer can be administered directly into the lymphatic system and then the immunotherapeutic agent can be administered systemically (e.g., intravenously).

In various embodiments, the method further comprises administering an additional anti-cancer treatment to the subject. Examples of the additional anti-cancer treatment include, but are not limited to, surgery, radiation therapy, administration of a chemotherapeutic agent, and any combinations thereof. These additional anti-cancer treatments may be administered before, conjointly with, or after the administration of the lymphangiogenesis inducer.

In various embodiments, the subject is a human patient. The human patient can be a child or an adult.

In various embodiments, the method is effective to treat the cancer in the subject. In some embodiments, the method is effective to induce lymphangiogenesis in the tumor in the brain or the central nervous system of the subject. In various embodiments, lymphangiogenesis can be confirmed through MRI imaging, e.g., in which the diameter of lymphatic vasculature can be calculated using a contrast agent. In various embodiments, lymphangiogenesis can be confirmed through serial CSF collection to measure VEGFA, VEGFB, VEGFC or VEGFD concentrations. In various embodiments, lymphangiogenesis can be confirmed through serial CSF collection to measure VEGFC concentrations. The method may be effective to reduce tumor volume. In some embodiments, the method is effective to reduce the volume of a tumor in the brain or the central nervous system of the subject. In various embodiments, the method is effective to provide an immune memory against the tumor. Without wishing to be bound by theory, low clinical efficacy of immunotherapy for GBM patients may be due to a low antigen sampling from the CNS at steady state and during initial stages of tumor development. The administration of a lymphangiogenesis inducer may increase the amount of antigen sampling that occurs in the brain, which in turn could improve the efficacy and outcome of any other immunotherapy (e.g., anti-CTLA-4 antibody) administered. Although VEGFC's role in cancer has been thought to promote metastasis through (lymph)angiogenesis, the inventors have surprisingly shown that in the brain, VEGFC can reduce tumor size through an increase in immunosurveillance. VEGFC may stimulate lymphatic endothelial cell proliferation through VEGFR3 and increase lymphatic vessel functions [59, 60]

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

MATERIALS AND METHODS

The following materials and methods were used, unless described otherwise in a specific Example.

Mice. Four- to eight-week-old mixed sex C57BL/6 mice, B6.129S2-Igh$^{tm1Cgn}$/J (μMT) mice, B6.SJL-Ptprc$^a$Pepc$^b$/BoyCrl mice, were purchased from the National Cancer Institute, Jackson Laboratory and Charles River respectively and subsequently bred and housed at Yale University. All procedures used in this study (sex-matched, age-matched) complied with federal guidelines and institutional policies by the Yale School of Medicine Animal Care and Use Committee.

Cells. GL261 parental cells were obtained from the NIH cancer cell repository. GL261-Luciferase cells were kind gifts from Dr. Jiangbing Zhou (Yale Neurosurgery) and Dr. Carla Rothlin (Yale Immunobiology). YUMMER 1.7 cell lines are previously reported [75]. CT2A and CT2A-BFP cells were a kind gift from Dr. Thomas Mathivet (PARCC, Paris). B16 cells were a kind gift from Dr. Noah Palm (Yale Immunobiology). HEK293T cells were purchased from ATCC. HEK293T, CT2A, CT2A-BFP and B16 cells were cultured in complete DMEM (4.5 g/L glucose, 10% FBS, 1% penicillin/streptomycin). YUMMER 1.7 cells were cultured in DMEM/F12 media (10% FBS, 1% nonessential amino acids, 1% penicillin/streptomycin). GL261 and GL261-Luc cells were cultured in RPMI (10% FBS, 1% penicillin/streptomy cin).

Viral vectors. AAV9 encoding either human VEGF-C, mouse VEGF-C or soluble mVEGFR3 was used. AAV$_9$-mouse VEGF-C was generated using psubCMV WPRE plasmid as previously reported for human VEGF-C [36]. Control AAV$_9$-mouse Vegfr34-7-Ig encodes the domains 4-7 of mouse Vegfr3 (that do not bind VEGF-C or VEGF-D) fused to the mouse IgG1 Fc domain. mVEGFR3(1-3)-Ig, encoding the domains 1-3 of mouse Vegfr3, was used to sequester VEGF-C in vivo. Young mice (2-4 week-old, AAV-mVEGFR-3; 4-6 week-old, AAV-VEGF-C) received i.c.m injection of a single AAV dose ($3 \times 10^{12}$ viral particles/mouse/3 μl) of AAVs. After 6-8 weeks, they were engrafted with intra-cerebral GL261 or CT-2A GBM cells.

Antibodies and tetramer. Anti-CD45 (30-F11, APC-Cy7, B266564; 104, BUV737, 9051755; 104, PE-Cy7, B268066; A20, APC, B254042; 30-F11, BV605, B278000), anti-CD3 (17A2, BV605, B264993; 145-2C11, APC-Cy7; 17A2, BUV737, 9042537; 17A2, Biotin, B259691), anti-CD4 (GK1.5, Pacific Blue, B199050; GK1.5, BUV496, 8080653), anti-CD8 (53-6.7, BV711, B259953; 53-6.7, BUV395, 8306672), anti-IFNγ (XMG1.2, BV711, B236526), anti-GZMB (GB11, FITC, B275568), anti-TNFα (MP6-XT22, PE-Cy7, B251190), anti-IL2 (JES6-5H4, APC, B248053), anti-CD44 (IM7, A700, B244378), anti-TBET (4B10, BV711, B268785), anti-TIM3 (RMT3-23, BV605, B262042), anti-FOXP3 (FJK-16s, BV421, B266620), anti-TCF7 (C63D9, A488, 8, Cell Signaling Technology), anti-PD-1 (29F.1A12, APC-Cy7, B260172), anti-RORγT (B2D, APC, E16663-102), anti-CD40 (PE, E028955), anti-CD80 (16-10A1, BUV395; 16-10A1, FITC, E029730), anti-CD86 (APC, B175381), anti-CX3CR1(SA011F11, BV421, B231871), anti-Ly6C (AL21, FITC, 33380), anti-CD11c (N418, PE-Cy7, B264758; BV421, B264454), anti-CD11b (M1/70, PE, B228654), anti-Ly6G (IA8, APC-Cy7, B153128), anti-MHCII (M5/114.15.2, A700, B264454), anti-CD64 (X54-5/7.1, APC, B254424), anti-B220 (RA3-6B2, BUV496, 8096734), anti-NK1.1 (PK136, biotin, B255213), anti-CD19 (6D5, biotin, B250292), anti-F4/80 (BM8, biotin, B253458), anti-Podoplanin (eBio8.1.1, PE, E11344-399, eBioscience), anti-CD31 (390, A647, 8187629), anti-AKT (pS473) (M89-61, BV421, 7198801) antibodies were purchased from BioLegend or BD Biosciences. anti-VEGFR-3/FLT-4 (FAB743P, PE, ACBF0117091) antibodies were purchased from R&D biosciences. $K^b$-restricted peptides aa 604-611 of p15E protein (KSPWFTTL) tetramer was made through the NIH tetramer core facility. KSPWFTTL peptide was made by Biomatik Corporation (Ontario, CA). Depletion antibodies anti-CD4 (GK1.5), anti-CD8 (YTS169.4), anti-PD1 (RMP1-14), anti-CTLA4 (9H10), anti-TIM3 (RMT3-23), anti-4-1BB (LOB12.3) antibodies were purchased from BioXCell (West Lebanon, NH).

VEGF-C-mRNA. VEGF-C-mRNA (see FIG. 12) was made by TriLink BioTechnologies (San Diego, CA), with full substitution of pseudo-uridine and 5-methyl-cytosine bases, capped using CleanCap™ AG and polyadenylated (120A). mRNA was mixed at a ratio of 1 µg/0.1 µL of in vivo-jetPEI (Polyplus transfection, France) and vortexed for 30 seconds and incubated in room temperature for 15 minutes before use. Control mRNA (Cy5 labeled GFP, GFP-mRNA; Luciferase, Luc-mRNA) was also purchased from TriLink Biotechnologies. Recombinant proteins (VEGF-A, VEGF-B, VEGF-C Cys156Ser, VEGF-D) were purchased from R&D systems.

Tissue processing and microscopy. Meningeal lymphatic vessels were detected on whole-mount preparation of the dura matter. Skullcap samples were dissected, fixed in 2% PFA for one hour and promptly processed in a blocking solution (10% normal donkey serum, 1% bovine serum albumin and 0.3% PBS-Triton X-100) for overnight incubation at 4° C. For lymphatic vessel detection, samples were incubated with the primary antibody anti-LYVE-1 (Angio-Bio, #11-034, 1:400), overnight at 4° C., then washed in PBS and 0.5% Triton X-100, five times at room temperature, before incubation with a fluoro-conjugated secondary antibody (Alexa Fluor anti-rabbit 647 Thermo Fischer, 1:500) diluted in PBS and 5% normal donkey serum. Meningeal lymphatic vessel images were acquired using a spinning-disk confocal (Nikon Eclipse Ti). Quantitative analysis of meningeal lymphatic coverage was performed using either FIJI or ImageJ (NIH/Bethesda) image processing software. LYVE-1$^+$ macrophages that are less intensely labeled than lymphatic vessels were eliminated by adjusting image contrast. Otsu's threshold was then used to convert captured images into binary images. The fluorescence labeled area covered by meningeal lymphatic vessels was measured in the confluence of sinuses and the sagittal sinus regions, and was normalized to the average fluorescence of the same regions of meningeal lymphatic vasculature in CTRL-AAV-treated mice. For brain sections, anti-CD3 (17A2, biotin), anti-CD31 (2H8, GeneTex) and anti-LYVE1 (AF2125, R&D systems) antibodies were used with anti-streptavidin (FITC, BD biosciences, 4031801), anti-hamster (127-165-160, Cy3, Jackson ImmunoResearch, 128827), and anti-goat (705-175-147, Cy5, Jackson ImmunoResearch, 138513) secondary antibodies respectively. Confocal images were taken on a Leica SP8. 3D rendering was completed on Imaris 8 (Oxford Instruments).

Western Blot. HEK293T cells were transfected with VEGF-C-mRNA combined with lipofectamine. Samples were lysed in RIPA buffer and boiled for 5 minutes with sample buffer. For in vivo delivery, VEGF-C-mRNA with JETPEI was used. CSF was pooled from 10 animals and spun down to remove cells. CSF was then filtered using a 100 k Amicon filter and the wash through was boiled with sample buffer for a Western blot, which was performed similarly to previously reported [32]. Briefly, 15% gels were used and run at 10 A per gel for 30 minutes and 40 A per gel until separation of ladder. Wet transfer was performed at 120 A per gel for 90 minutes on ice. Anti-VEGF-C antibody was used at a concentration of 1:1000 (R&D systems, AF752) and incubated overnight in the cold room. After washing, anti-Goat-HRP secondary antibodies were used at a concentration of 1:5000 at room temperature for 2 hours and imaged using ChemiDoc MP imaging system (Biorad).

Procedures.

Intra-Cisterna Magna (i.c.m), CSF collection. For i.c.m. injections, mice were anesthetized using ketamine and xylazine, and the dorsal neck was shaved and cleaned with alcohol. A 2 cm incision was made at the base of the skull, and the dorsal neck muscles were separated using forceps. After visualization of the cisterna magna, a Hamilton syringe with a 15 degree 33 gauge needle was used to puncture the dura. 3 µL of AAV$_9$ (3×10$^{12}$ viral particles/mouse) or mRNA (4-5 µg) was administered per mouse at a rate of 1 µL min$^{-1}$. Upon completion of the injection, needle was left in to prevent backflow for an additional 3 minutes. For CSF collection, a custom pulled micro pipette 0.75/1 1br1 GF (Stoelting co) was used to penetrate the dura and made sure no blood was collected. The skin was stapled, cleaned and same post-operative procedures as tumor inoculations were performed.

Adoptive Transfer. To evaluate memory against tumor using adoptive transfer, T cells from deep cervical lymph nodes and spleens of mice that rejected tumors after VEGF-C-mRNA and α-PD-1 treatment were isolated using Easy-Sep Mouse T cell Isolation Kit (StemCell Technologies, Canada) and transferred into naïve mice 24 hours before tumor inoculation (one mouse T cells to one mouse).

To study leukocyte trafficking after VEGF-C treatment, CD45.2 mice were inoculated with GL261 tumors. At day 7, Mice were given GFP-mRNA or VEGF-C-mRNA treatment. At day 7 post-treatment, deep cervical lymph nodes were collected, filtered through 70 µm filter paper and whole leukocyte suspensions (30 million cells per mouse; roughly ~3-5 mouse dCLNs transferred into one mouse) were adoptively transferred in to CD45.1 mice bearing 7 day old tumors. After transfer, mice were given GFP-mRNA or VEGF-C-mRNA treatment i.c.m. 5 days after, deep cervical lymph nodes and brain tissue were collected to evaluate immune cell trafficking. 5 minutes prior to euthanizing the mouse, 25 µg of anti-CD45 PE (30-F11, PE, Biolegend) antibodies were administered intravenously to stain circulating immune cells.

IVIS imaging. Mice were anesthetized using isoflurane and injected intraperitoneally with RediJect D-Luciferin Ultra (PerkinElmer) (200 µL, 30 mg/mL). After 10 minutes mice were imaged using the IVIS Spectrum In Vivo Imaging System (PerkinElmer).

RNA-seq. RNA-seq data was aligned using STAR (STAR/2.5.3a-foss-2016b, mm10 assembly) with parameters: —runThreadN 20—outSAMtype BAM SortedByCoordinate—limitBAMsortRAM 35129075129—outFilterMultimapNmax 1—outFilterMismatchNmax 999—outFilterMismatchNoverLmax 0.02—alignIntronMin 20—alignIntronMax 1000000—alignMatesGapMax 1000000 for mapping of repetitive elements. Counts were counted using BEDTools (BEDTools/2.27.1-foss-2016b), coverageBed function, normalized using DESEQ2 and graphed using broad institute Morpheus web tool. Human RNA-seq data was obtained from TCGA and GTEX databases and analyzed using the above parameters (hg38 assembly) (see FIGS. 18A-18E), and survival stratified by VEGF-C expression was analyzed using OncoLnc (www.OncoLnc.org) (see FIG. 18H).

Isolation of mononuclear cells and flow cytometry. Tissue was harvested and incubated in a digestion cocktail containing 1 mg ml$^{-1}$ collagenase D (Roche), 1 mg ml$^{-1}$ collagenase A (Roche) and 30 µg ml$^{-1}$ DNase I (Sigma-Aldrich) in complete RPMI (10% FBS) at 37° C. for 30 min. Tissue was then filtered through a 70 µm filter. For brain tissues, cells were mixed in 4 mL of 25% Percoll (Sigma-Aldrich) solution and centrifuged at 530 g for 15 minutes without a brake. The Percoll layer was removed and cells were diluted in 5 mL of 1% BSA. Cells were treated with ACK buffer, and resuspended in 1% BSA. At this point cells were counted using an automated cell counter (Thermo Fisher).

For tetramer experiments, staining was performed with antibodies (1:200) and tetramer (1:50) for 60 minutes at room temperature. Cells were washed to remove excess antibodies and resuspended in 1% BSA with 10 µL of CountBright absolute counting beads (Life technologies, OR) for multiparameter analyses on the LSR II flow cytometer (Becton Dickinson), and subsequently analyzed using FlowJo software (10.5.3, Tree Star). For calculation of tetramer positive T cells in each organ this calculation was used: number of tetramer positive T cells*(# of input beads/# of counted beads)*(# of cells from automated counter/# of total events in flow cytometry).

For cytokine stimulation, surface markers were first stained on ice for 30 minutes. After washing, cells were stimulated in complete RPMI with 200 µL of 1× Cell stimulation cocktail without protein transporter inhibitor (eBioscience Cell Stimulation Cocktail, ThermoFisher) for 1 hour at 37° C. 50 µl of 5× Cell stimulation cocktail with protein transporter (eBioscience Cell Stimulation Cocktail, ThermoFisher) was added and incubated for an additional 4 hours. Cells were then fixed with 100 µL 2% formaldehyde on ice for 45 minutes. Cells were washed with 1× Perm/Wash Buffer (BD Cytofix/Cytoperm, BD Biosciences), and then permeabilized with 1× Perm/Wash Buffer (BD Cytofix/Cytoperm, BD Biosciences) for 10 minutes on ice. Intracellular antigens were stained on ice for 30 minutes.

For transcription factor staining, surface markers were first stained on ice for 30 minutes. Cells were then fixed with 100 µL 2% formaldehyde on ice for 45 minutes. Cells were washed with 1× Perm/Wash Buffer (eBioscience Foxp3/Transcription Factor Staining Buffer Set, ThermoFisher), and then permeabilized with 1× FOXP3Perm/Wash Buffer for 10 minutes on ice. Intracellular antigens were stained on ice for 30 minutes.

For AKT phosphorylation staining, surface markers were first stained on ice for 30 minutes. Cells were then fixed and washed following BD Phosflow kit directions. Samples were run on Attune NxT Flow Cytometer.

ELISA. ELISA was performed using a Mouse Vascular Endothelial Cell Growth Factor C, VEGF-C ELISA Kit, by Cusabio LLC (lifeome, Oceanside CA, E07361m-96) following the manufacturer's instructions.

mRNA Tropism. Mice were injected in the cisterna magna with Cy5 labeled GFP mRNA with JETPEI. 24 h post injection, brains, meninges and lymph nodes were collected for flow cytometry. Samples were run on Attune NxT Flow Cytometer.

BBB permeability. Mice were injected intravenously with 70,000 MW Fluorescein labeled Dextran (ThermoFisher) or 0.5% Evans Blue (EB). For microscopy, brains were collected 2 hours after and flash frozen for sectioning. For EB quantification, mice were perfused with ice cold PBS intraventricularly (heart) and EB was extracted using Dimethylformamide. Relative absorbance was measured using SpectraMax i3 (Molecular Devices) at 620 nm wavelength.

T cell proliferation. T cells were isolated using Easy Sep Mouse T cell Isolation Kit (StemCell Technologies, Canada). T cells were stained using CellTrace Violet, and stimulated with CD3/CD28 antibodies from Bioxcell for 24 hours in cRPMI. After 24 h, cells were resuspended in media containing IL-2 and VEGF-C for 4 days and FACS was performed at the end of 4 days.

BMDC culture and Stimulation. Bone marrow was collected from wild type mice and cultured in cRPMI supplemented with GM-CSF for six days. After six days, cells were stimulated with LPS and VEGF-C for 24 h and FACS was performed.

Statistical analysis. No statistical methods were used to predetermine sample size. The animals getting treatment were randomized after tumor size measurement at day seven. The investigators were not blinded during experiments and outcome assessment, but outcome assessment was additionally evaluated by animal technicians and vets blinded to the study. Survival curves were analyzed using a log-rank (Mantle-Cox) test. For other data, normally distributed continuous variable comparisons used a two-tailed unpaired Student's t-test or paired Student's t-test with Prism software.

Example 1: Assay of Inducement of Lymphatic Vasculature Proliferation in the Dural Lymphatics by VEGF-C In order to address how immune surveillance affects tumor growth, the inventors used a model to examine tumor growth in the presence of increased meningeal lymphatics.

GL261, a C57BL/6 syngeneic GBM cell line, was transduced to express the luciferase gene (GL261-Luc) [58]. GL261 parental cells were obtained from the NIH cancer cell repository. GL261-Luciferase cells were obtained from Yale University. GL261 and GL261-Luc cells were cultured in RPMI (10% FBS, 1% penicillin/streptomycin).

Wild type C57BL/6 mice bred in house aged 8 weeks were used for all the experiments. The C57BL/6 mice were purchased from the National Cancer Institute and Jackson Laboratory and subsequently bred and housed at Yale University. All procedures were performed in accordance to animal protocols. For tumor inoculation, animals were anaesthetized using a mixture of ketamine (50 mg kg$^{-1}$) and xylazine (5 mg kg$^{-1}$), injected intraperitoneally. Mice heads were shaved and then placed in a stereotaxic frame. After sterilization of the scalp with alcohol and betadine, a midline scalp incision was made to expose the coronal and sagittal sutures, and a burr hole was drilled 2 mm lateral to the sagittal suture and 0.5 mm posterior to the bregma. A 10 µl Hamilton syringe loaded with tumor cells, was inserted into the burr hole at a depth of 2.5 mm from the surface of the brain and left to equilibrate for 1 min before infusion. A micro-infusion pump (World Precision Instruments, Sarasota, FL, USA) was used to infuse 3 µl of tumor cells at 1 µl min$^{-1}$. Once the infusion was finished, the syringe was left in place for another minute before removal of the syringe. Bone wax was used to fill the burr hole and skin was stapled and cleaned. Following intramuscular administration of analgesic (Meloxicam and buprenorphine, 1 mg kg$^{-1}$), animals were placed in a heated cage until full recovery. For statistical analysis, survival curves were analyzed using a log-rank (Mantle-Cox) test. For other data, normally distributed continuous variable comparisons used a two-tailed unpaired Student's t-test or paired Student's t-test with Prism software. Data are presented as mean±S.D. Significance levels are defined as *P<0.05; P<0.01; *P<0.001; ****P<0.0001 using a two-tailed unpaired Student's t-test or Log-rank Mantel-Cox test.

Intracranial inoculation of varying numbers of GL261-Luc resulted in cell number-dependent growth kinetics and lethality, as shown in FIGS. 14A-14C. These results showed that intracranial injection of GL261-Luc alone is not sufficient to promote rejection of this tumor in the CNS.

To increase the lymphatic vasculature, an adeno-associated virus (AAV) coding for VEGF-C was injected into the cisterna magna of mice to induce lymphangiogenesis. For cisterna magna injection, mice were anesthetized using ketamine and xylazine. The necks of the mice were shaved and sterilized using ethanol and betadine (povidone iodine). $3 \times 10^{12}$ viral particles of VEGF-AAV were injected into the cisterna magna using the procedure described above in Materials and Methods. For control mice, mock-AAV, with a scrambled coding sequence was injected with the same procedure to rule out any inflammatory effects of the procedure on tumor growth.

When the syringe was removed, VET Tech glue was used to seal the puncture site. The mouse neck was stapled, cleaned and topical ointment was applied. Meloxicam was administered for analgesia, and proper post-operative care was noted.

Figure 1B:
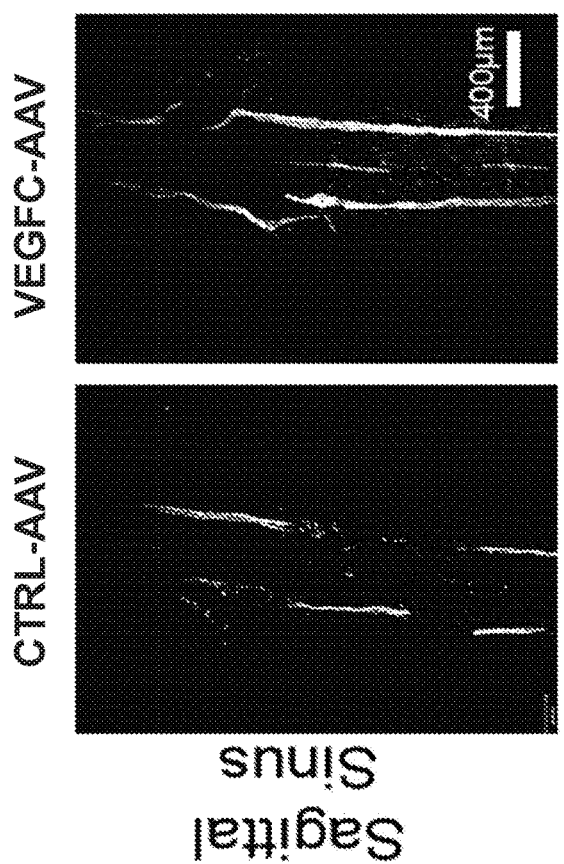
FIGS. 1A-1D show that VEGFC induces lymphatic vasculature proliferation in the dural lymphatics after administration into the cisterna magna.
Figure 1A:
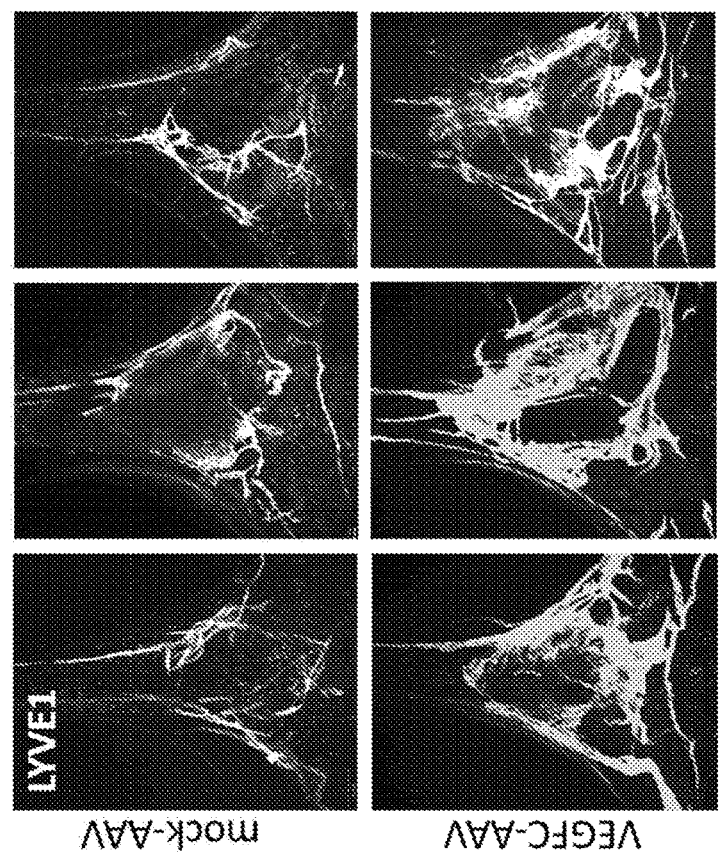
Figures 1C, 1D:
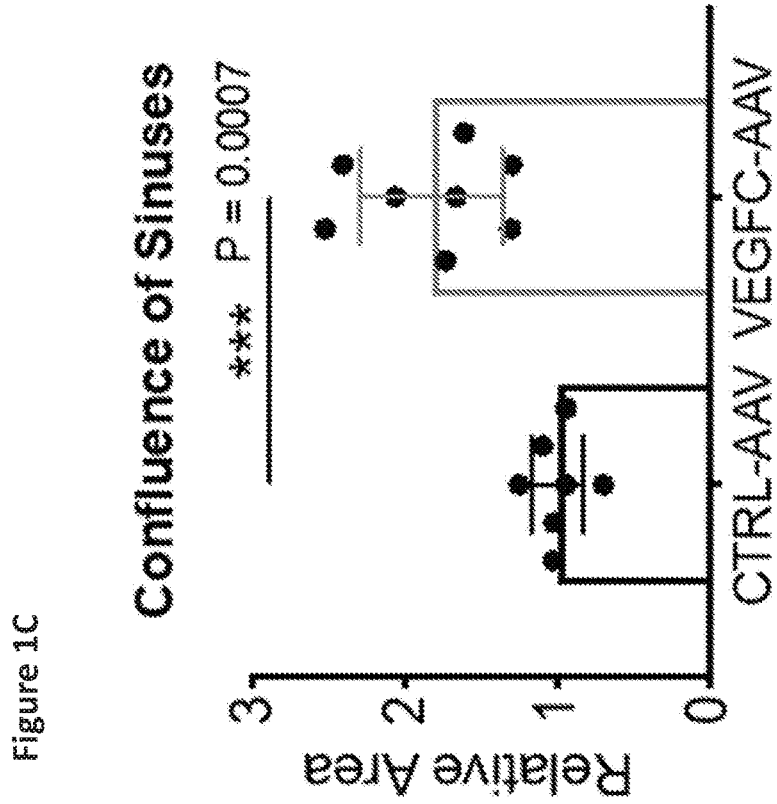

The lymphatic vasculature proliferation was confirmed after 6 months by staining for LYVE1, a lymphatic endothelial cell marker. Mice skulls were collected and fixed with 4% PFA. Entire skulls were then stained using anti-LYVE-1 goat antibody (R&D) at a concentration of 1:250. After three washes of one hour each, the skulls were stained with fluorescent anti-goat secondary antibodies (Thermo Scientific) at a concentration of 1:500. The lymphatic vasculature in the dural confluence of sinuses were visualized under a fluorescent microscope, with the data shown in FIG. 1A. The lymphatic vasculature area was calculated using ImageJ, with the results shown in the graph in FIG. 1C. There was at least three times the amount of lymphatic vasculature (expressed in coverage as percentage of area) in VEGFC-AAV-treated mice as compared to mock-AAV-treated mice.

Injection of VEGFC-AAV into cerebrospinal fluid (CSF) through the cisterna magna resulted in significant increases in the dural lymphatic vessels, which is consistent with previous reports [34, 35, 36]. Whole mount fluorescent images of the dural confluence of sinuses (FIG. 1A) and sagittal sinuses (FIG. 1B) showed an increase in total vascular volume (FIGS. 1C and 1D), which persisted for over six months.

Example 2: Assay of Inducement of Lymphatic Vasculature Proliferation in the Dural Lymphatics by VEGF-C Manipulation of lymphatic vasculature can affect macromolecule clearance from the brain parenchyma [34-36, 50].

Mice were treated with VEGFC-AAV or mock-AAV as described in Example 1. A third group of wild type mice were treated only with PBS. Two months elapsed.

Syngeneic mouse GBM cells (GL261-Luc) were implanted into the striatum of mice that previously received either AAV coding for VEGF-C, a scrambled sequence (mock-AAV), or PBS (WT) two months prior. Specifically, 5,000 or 50,000 GL261-Luc cells were implanted intracranially into the striatum (coordinates 3 mm lateral and 1 mm posterior from bregma). The mice were observed for significant weight loss, signs of lethargy, back hunch or periorbital bleeding for survival end-points. All brains were collected after death or end-points to confirm tumor growth. Mice that did not die after 100 days were injected with 500,000 GL261-cells suspended in a 1:1 volume with Matrigel (Corning) into the flank, to observe memory against the tumor. For flank tumor inoculation, mice were anesthetized using ketamine and xylazine. Flank was shaved and sterilized. A 1 mL syringe with 30 g needle was used to deliver 100 µL of 500,000 cells subcutaneously. The expected tumor related end-points were observed.

Figure 2A:
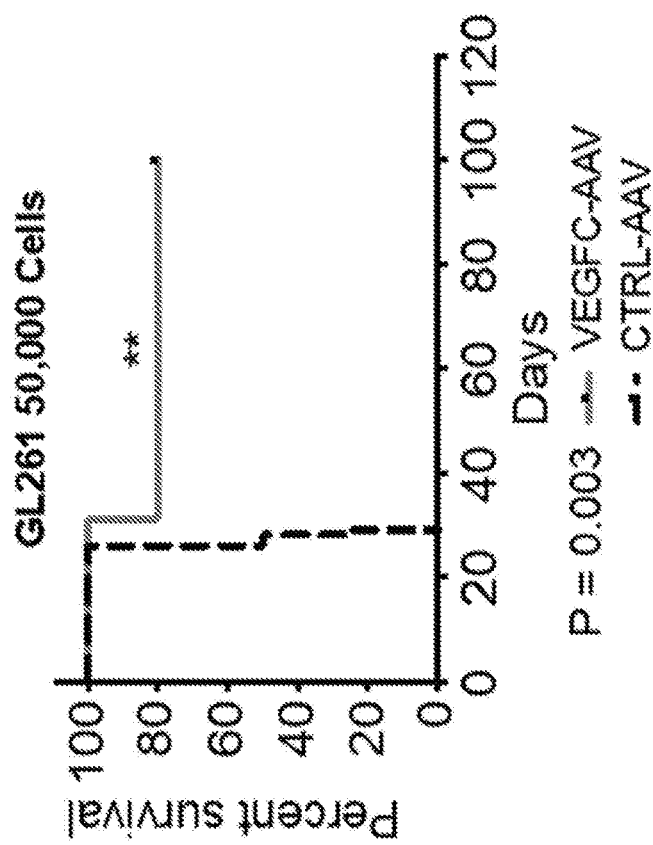
FIGS. 2A-2B show the results of an assay of inducement vasculature proliferation in the dural lymphatics of mice by VEGF-C AAV. Prophylactic treatment of VEGFC-AAV into wild type mice protects the mice against brain tumor formation.
Figure 2B:
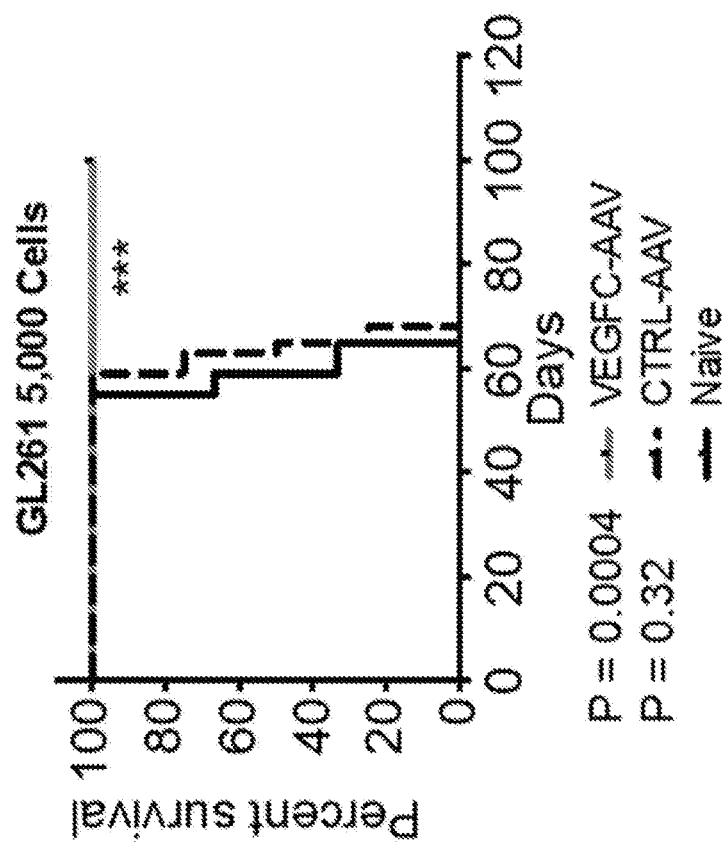

FIG. 2A shows the degree of survival for mice treated with 5,000 GL261-Luc cells. All of the mice pretreated with VEGFC-AAV survived 100 days, while none of the mice pretreated with mock-AAV survived 100 days. The same was observed with mice treated with 50,000 GL261-Luc cells, as shown in FIG. 2B. Near-complete rejection of tumors was observed in mice that were prophylactically treated with VEGFC-AAV after a lower (5,000 cells) or a higher (50,000 cells) dose GL261-Luc challenge, as shown in FIGS. 2A, 2B and 5A. Mice with VEGFC-AAV prophylactic treatment did not develop any tumors while mice injected with scrambled sequence AAV or with just PBS developed tumors.

Previous studies showed that tumor intrinsic overexpression of VEGFC results in poorer prognosis in malignancies outside the CNS [45-47]. This result reveals a surprising role of VEGFC, namely, its ability to confer protection against GBM in the CNS.

To examine the importance of lymphocytes, CD4 or CD8 T cells were depleted from VEGFC-treated GL261-Luc injected mice. Mice pre-treated with either mock-AAV or VEGFC-AAV two months ago received intraperitoneally 200 µg of anti-CD4 (clone GK1.5) or anti-CD8 (clone YTS 169.4) antibodies purchased from BIOXCELL. Two days later, 5,000 or 50,000 GL261-Luc cells were implanted intra-cranially. Mice were given an additional dose of 200 µg anti-CD4 or anti-CD8 antibody, and re-dosed with 200 µg of antibodies every 4 days until the end of the study. Mice were monitored for survival endpoints and brains were collected after death or after 100 days to confirm tumor growth.

Figure 3B:
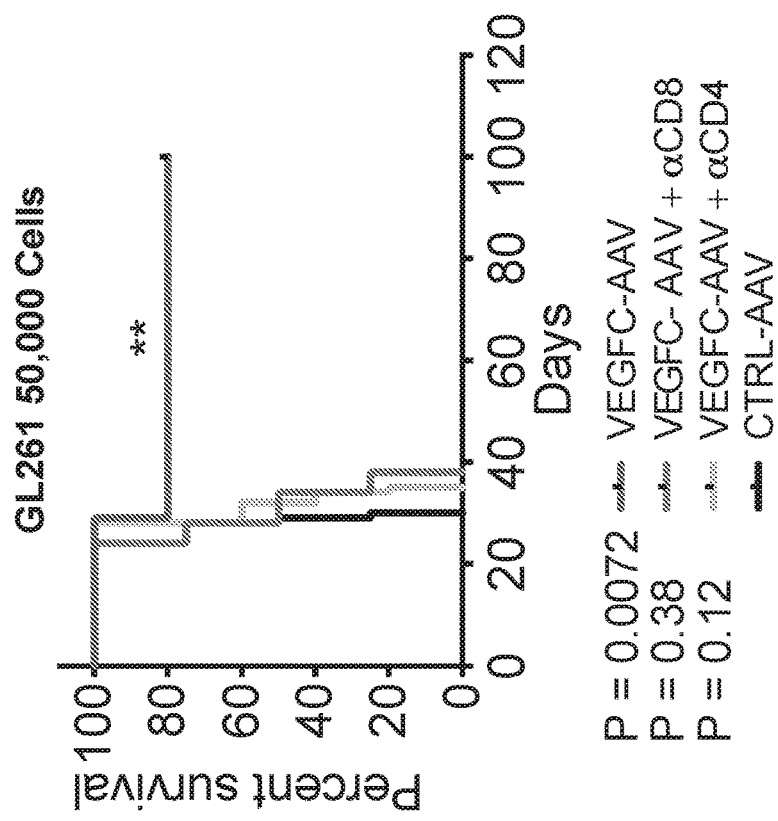
FIGS. 3A-3B show the degree of survival for mice treated with 5,000 GL261-Luc cells and 50,000 GL261-Luc cells and depleted of CD4 or CD8 T cells.
Figure 3A:
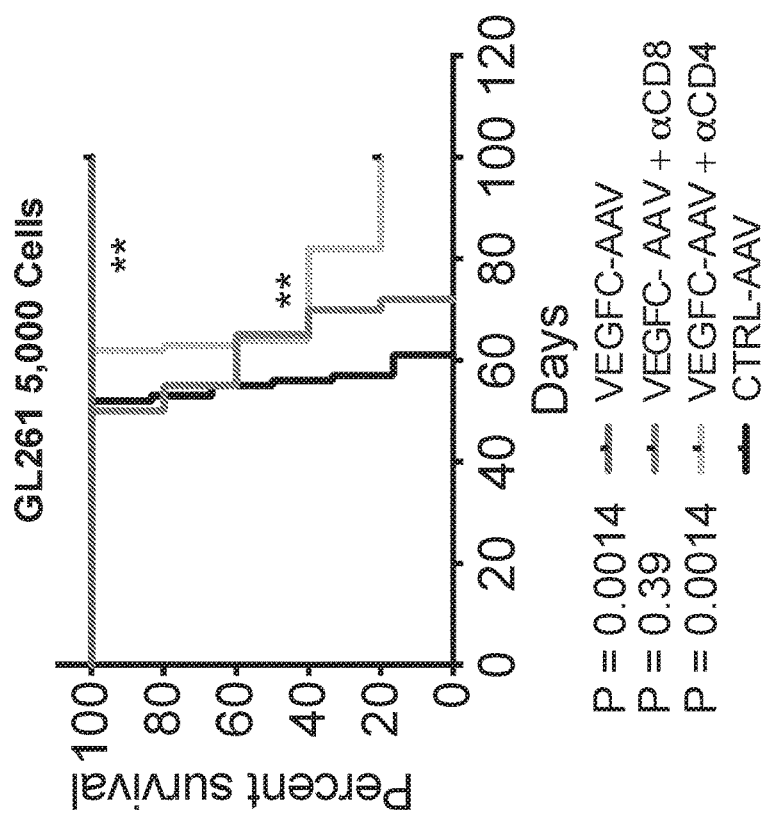

FIGS. 3A and 3B show the degree of survival for mice treated with 5,000 GL261-Luc cells and 50,000 GL261-Luc cells, respectively. Strikingly, no growth of brain tumor was found in mice with increased lymphatic vasculature (VEGFC-AAV). The majority of the mice pretreated with VEGFC-AAV but not with anti-CD4 or anti-CD8 antibodies survived 100 days, consistent with the data in FIGS. 2A-2B. Depletion of CD4 or CD8 T cells negated the protection conferred by VEGFC treatment. None of the mice pretreated with VEGFC-AAV and anti-CD8 antibody survived 100 days. When CD4 or CD8 T cells are depleted before tumor implantation in these mice, the tumors continued to grow, suggesting a T cell mediated immune response. Less than 40% of the mice pretreated with VEGFC-AAV and anti-CD4 antibody survived 100 days after 5,000 GL261-Luc cells were administered (FIG. 3A). None of the of the mice pretreated with VEGFC-AAV and anti-CD4 antibody survived 100 days after 50,000 GL261-Luc cells were administered (FIG. 3B). When CD4 or CD8 T cells are depleted before tumor implantation in these mice, the tumors continue to grow, suggesting a T cell mediated immune response.

In a parallel set of experiments, the requirement for lymph node drainage was examined. Mice were injected with VEGFC-AAV in the cisterna magna. Two months later, deep cervical lymph nodes were surgically ligated or removed from mice. For lymph node ligation, mice were anesthetized using ketamine and xylazine, and the rostral neck was shaved and sterilized. A 2 cm incision was made and the salivary glands containing the superficial cervical lymph nodes were retracted and deep cervical lymph nodes were visualized. The afferent lymph nodes were tied off with a 4-0 Vicryl suture, and then cauterized. The incision was closed with 4-0 Vicryl suture and mice were subjected to the same post-operative procedures as described in Example 1. A schematic of the lymph node ligation procedure is shown in FIG. 4A. One week post-surgery, mice were inoculated intracranially into the striatum with GL261 tumors and growth of the tumor was observed. The data is shown in FIG. 4B. Mice that received VEGFC-AAV prophylactic treatment all lived. Albeit having prolonged survival compared to control (CTRL)-AAV-treated mice, mice with the deep cervical lymph node ligation succumbed to the tumor, indicating that VEGFC-mediated protection against GBM required lymph drainage to the dCLN.

Next, the durability of immune response against GBM in VEGFC-treated mice that reject the GL261-Luc tumors was examined. After day 100, the VEGFC-AAV mice that rejected the intracranial tumor (FIG. 5A) were re-challenged with GL261-Luc cell lines into their flank (FIG. 5D). For flank tumor inoculation, mice were anesthetized using ketamine and xylazine. Flank was shaved and sterilized. A 1 mL syringe with 30 g needle was used to deliver 100 μL of 500,000 cells subcutaneously. For GL261-Luc cells, cells were mixed in a 1:1 volume with Matrigel (Corning) before delivering. There was still no tumor growth detected in VEGFC-treated mice whereas naïve mice all developed flank tumors, as shown in FIGS. 5A-5C. These data indicate that a robust and long lasting T cell dependent systemic memory response was formed against the tumor in mice with increased lymphatic surveillance from the brain. These data suggest that such memory T cells circulate throughout the host to eliminate recurrent and metastatic tumors.

Example 3: VEGFC-mRNA Production and Validation

VEGFC-mRNA was custom ordered from TriLink Biotechnologies with the sequence shown in FIG. 12. The mRNA was made with the TriLink Biotechnologies Cap1, and had complete 5-methyl cytosine and pseudo-uridine substitutions for stability. Specifically, 5-methyl cytosine increased stability and decreases deamination, while pseudo-uridine substitutions decreased nuclease activity, decreased innate recognition and could increase translation. Cap 1 does not active PR receptors. The mRNA was also polyadenylated (120A).

2 μg of VEGFC-mRNA was transfected into HEK293T cells using lipofectamine. HEK293T cells were purchased from ATCC. HEK293T cells were cultured in complete DMEM (4.5 g/L glucose, 10% FBS, 1% penicillin/streptomycin). Cy5-GFP mRNA was used as a control. Cell lysate was collected 6 hours and 24 hours after transfection. Samples were lysed in RIPA buffer and boiled for 5 minutes with sample buffer. Media was collected 24 hours after transfection. A Western blot was performed in which the membrane was probed with an anti-VEGFC antibody from R&D systems. Western blotting was performed similarly to previously reported [57]. Briefly, 15% gels were used and run at 10 A per gel for 30 minutes and 40 A per gel until separation of ladder. Wet transfer was performed at 120 A per gel for 90 minutes on ice. Anti-VEGFC antibody was used at a concentration of 1:1000 (AF752) and incubated overnight in the cold room. After washing, anti-Goat-HRP secondary antibodies were used at a concentration of 1:5000 at room temperature for 2 hours and imaged using Chemi-Doc MP imaging system (Biorad). The results are shown in FIG. 6A. VEGFC-mRNA was made with the indicated modifications, and was able to create full length protein (50 kDa), secreted protein (37 kDa), and active form (25 kDa) of the protein in HEK293T cells. The cell lysate showed the full-peptide form of VEGFC (50 kDa) while the media showed the cleaved and activated forms of VEGFC (37 kDa and 22 kDa respectively).

Figure 7A:
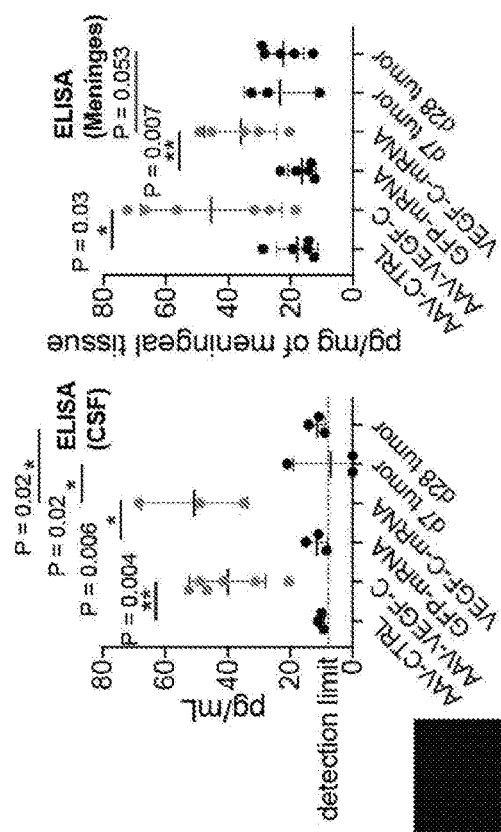
FIGS. 7A-7C show the results of a single administration of VEGFC-mRNA using JETPEI. Significant expression of VEGFC was induced.
Figure 7C:
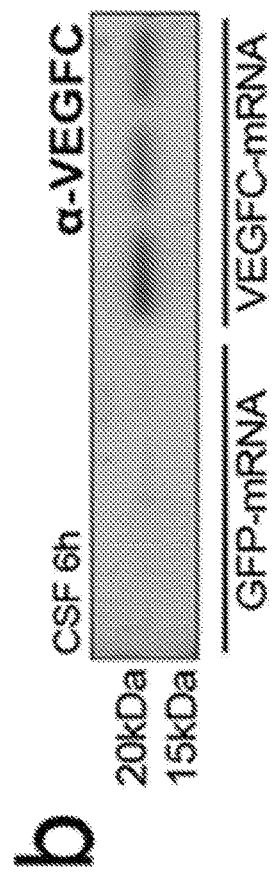
Figure 7B:
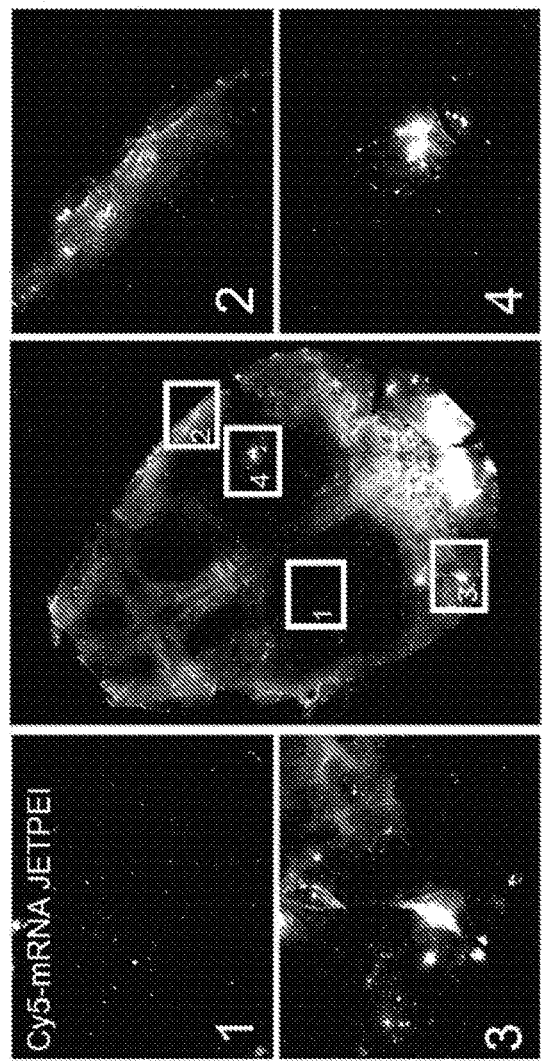

VEGFC-mRNA was transfected into the cisterna magna of mice using a polymer carrier, JETPEI. mRNA was mixed at a ratio of 1 μg/0.1 μL of in vivo-jetPEI (Polyplus transfection, France) and vortexed for 30 seconds and incubated in room temperature for 15 minutes before use. Six hours after injection of VEGFC-mRNA-JETPEI into the cisterna magna, CSF was collected. For CSF collection, a custom pulled micro pipette 0.75/1 1brl GF (Stoelting co) was used to penetrate the dura and made sure no blood was collected. CSF was pooled from 10 animals and spun down to remove cells. CSF was then filtered using a 100 k Amicon filter and the wash through was boiled with sample buffer for Western blot. A Western blot was run using the collected CSF and probed for VEGFC with an antibody from R&D systems as described previously. The results are shown in FIG. 7A. VEGFC-mRNA mixed with Cy5 labeled GFP-mRNA was combined to make a JETPEI polyplex and injected into the cisterna magna for visualization. Imaging of Cy5 showed wide distribution of polyplexes among the skull cap, as shown in FIG. 7B.

Example 4: VEGFC-mRNA Production In Vivo and Monotherapy in Mice

JETPEI was used to deliver a mixture of mRNA (90% VEGFC-mRNA, 10% Cy5-GFP mRNA) into the cisterna magna. JETPEI for in vivo use was purchased from polyplus transfection. For VEGFC-mRNA JETPEI nanoparticles, 3 μg of VEGFC-mRNA was mixed with 0.3 uL of in-vivo jetPEI. After vortexing for 15 seconds, the mixture was allowed to sit for 5 minutes. A procedure was performed as in Example 1, with VEGFC-mRNA JETPEI nanoparticles injected into the cisterna magna. CSF was collected from the mouse six hours later using a custom-pulled micropipette. The CSF was concentrated 100 fold and a Western blot was performed (FIG. 7A) High amounts of VEGFC protein were detected in the mice treated with VEGFC-mRNA versus GFP-mRNA (control) as early as six hours post-injection. Distribution of the jetPEI particles was observed throughout the skullcap and meninges of the mice along with robust protein expression at 6 hours. The distribution of the mRNA within the dura is shown in FIG. 7B. These results indicated the ability of VEGFC-mRNA to produce high amounts of protein with a reliable expression profile in vivo.

CSF and Meninges were collected at 2 month-time point (AAV-CTRL, AAV-VEGF-C), 24 h-time point (GFP-mRNA, VEGF-C-mRNA), or days 7 and 28 after tumor inoculation and ELISA was performed to detect VEGF-C (CSF; AAV-VEGF-C, n=6; other groups n=3; 5 animals were pooled for each sample) (Meninges; AAV-VEGF-C, n=6; d7 tumor, n=3; other groups n=5). The results are shown in FIG. 7C.

VEGFC-mRNA was then used as a monotherapy to treat mice that had GL261-Luc implanted 7 days prior. Wild type mice were inoculated intracranially into the striatum with 50,000 GL261 luciferase cells at day 0. Mice were treated with a single injection of VEGFC-mRNA-JETPEI into the cisterna magna and mice were imaged every 7 days using IVIS to monitor tumor size. A schematic of the protocol is shown in FIG. 9A. A single administration of VEGFC-mRNA resulted in delayed growth in the tumor (FIG. 9B) and conferred a significant survival benefit (FIG. 9C), as compared with mice treated with scrambled mRNA (mock). This monotherapy of VEGFC-mRNA was enough to provide a therapeutic benefit that prolonged survival. However, none of these mice survived in the face of rapid GBM development.

Example 5: Effect of VEGFC-mRNA Treatment on T Cell Priming

To assess T cell priming against GBM in the draining lymph node, an endogenous tumor antigen present in many mouse cancers was used [70, 71]. Endogenous retroviruses (ERVs) are previously integrated retrovirus remnants in the host genome that are silenced epigenetically, but often become aberrantly expressed in dysregulated transcriptional states found in cancers [72, 73].

Mice were injected with 500,000 GL261 cells or PBS in the flank. Seven days after tumor inoculation, draining inguinal lymph nodes were collected and emv2-env (Kb-restricted peptides aa 604-611 of p15E protein (KSPWFTTL)) tetramers were used to validate tumor specific T cell proliferation.

The overexpression of the ERVs in GL261 was detected in publicly available RNA-Seq data (FIGS. 15A-C). For RNA-seq analysis, the data was aligned using STAR with parameters: —runThreadN 20—outSAMtype BAM SortedByCoordinate—limitBAMsortRAM 35129075129—outFilterMultimapNmax 1—outFilterMismatchNmax 999—outFilterMismatchNoverLmax 0.02—alignIntronMin 20—alignIntronMax 1000000—alignMatesGapMax 1000000 for mapping of repetitive elements. Counts were counted using BEDTools, coverageBed function, normalized using DESEQ2 and graphed using broad institute Morpheus web tool. emv2-based ERV sequences overexpressed in GL261 are shown in FIG. 15C.

Mononuclear cells (including T cells) were isolated from the tumor sites and other brain tissues of the mice and subjected to flow cytometry analysis. Tissue was harvested and incubated in a digestion cocktail containing 1 mg ml$^{-1}$ collagenase D (Roche), 1 mg ml$^{-1}$ collagenase A (Roche) and 30 µg ml$^{-1}$ DNase I (Sigma-Aldrich) in complete RPMI (10% FBS) at 37° C. for 30 min. Tissue was then filtered through a 70 µm filter. For brain tissues, cells were mixed in 4 mL of 25% Percoll (Sigma-Aldrich) solution and centrifuged at 530 g for 15 minutes without a brake. The Percoll layer was removed and cells were diluted in 5 mL of 1% BSA. Cells were treated with ACK buffer, and resuspended in 1% BSA. At this point cells were counted using an automated cell counter (Thermo fisher). Staining was performed with antibodies (1:200) and tetramer (1:50) for 60 minutes at room temperature. Anti-CD45 (30-F11, APC-Cy7), anti-CD3 (17A2, BV605), anti-CD4 (GK1.5, Pacific Blue), anti-CD8 (53-6.7, BV711) antibodies were purchased from Biolegend. Kb-restricted peptides aa 604-611 of p15E protein (KSPWFTTL; SEQ ID NO: 13) tetramer was made through the NIH tetramer core facility. KSPWFTTL (SEQ ID NO: 13) peptide was made by Biomatik Corporation (Ontario, CA). Cells were washed to remove excess antibodies and resuspended in 1% BSA with 10 µL of CountBright absolute counting beads (Life technologies, OR) for multiparameter analyses on the LSR II flow cytometer (Becton Dickinson), and subsequently analyzed using FlowJo software (Tree Star). For calculation of tetramer positive T cells in each organ this calculation was used: number of tetramer positive T cells*(# of input beads/# of counted beads)*(# of cells from automated counter/# of total events in flow cytometry).

The inventors identified emv2-based ERV sequences overexpressed in GL261 (FIG. 15C). Using tetramers against emv2-env (Kb-restricted peptides aa 604-611 of p15E protein (KSPWFTTL; SEQ ID NO: 13)) [70], an enrichment of tetramer positive CD8 T cells was observed in the draining inguinal lymph nodes after administration of GL261 in the flank of mice. Mice were injected with 500,000 GL261 cells or PBS in the flank. Seven days after tumor inoculation, draining inguinal lymph nodes were collected and emv2-env (Kb-restricted peptides aa 604-611 of p1 5E protein (KSPWFTTL; SEQ ID NO: 13)) tetramers were used to validate tumor specific T cell proliferation. The data are shown in FIG. 15D, demonstrating endogenous tumor specific antigen-dependent T cell priming in response to GL261 injection. Gating strategies for tetramer staining are shown in FIG. 15E.

Intracranial GL261-Luc inoculation resulted in small tetramer positive T cell populations in dcLNs (1.54%) (FIGS. 8D-8F, 9H, and 17B). However, a single CSF administration of VEGF-C-mRNA allowed for significant increases in the tetramer specific T cell population in the dcLN (3.65%) (FIGS. 8A-8D). In addition, more tumor-specific T cells infiltrated the brain, showing an increase in both percent (FIGS. 8A-8D) and absolute numbers of tetramer positive T cells (FIG. 8D) in mice inoculated with VEGF-C-mRNA. These data indicated that tumor introduced into the brain elicits minimal CD8 T cell immune response in the draining lymph nodes. However, VEGF-C-mRNA expression enables enhanced CD8 T cell priming against tumors introduced into the brain.

Mice were inoculated with 50,000 GL261-Luc cells and treated with Luc-mRNA or VEGF-C-mRNA at day 7. Tumor inoculated brain hemisphere was collected and analyzed using FACS (n=3; 3 animals were pooled for each n). The data are shown in FIGS. 8A-8G. FIG. 8E shows the number of CD3-positive cells (n=3; 3 animals were pooled for each n). FIG. 8G shows the percent of TCF7+ T cells in CD3+ CD8+CD44+ population in the brain (Luc-mRNA, n=14; VEGF-C-mRNA, n=9, data pooled from 3 independent experiments). FIG. 23E-G shows the number of cells CD3+ CD8+CD44+ cells producing IFNγ, TNFα, IL2 and GZMB in the brain (n=3; 3 animals were pooled for each n). Data are mean±S.D. *P<0.05; P<0.01; *P<0.001; ****P<0.0001 (two-tailed unpaired Student's t-test, Log-rank Mantel-Cox test). The largest change induced by VEGF-C was in the number and the phenotypes of T cells infiltrating the brain (FIGS. 8E and 23).

VEGF-C-mRNA therapy showed sustained TCF7+ CD8 T cells (as shown in FIGS. 8G and 23C-23D) in the three compartments along with increased FOXP3+ CD4 T cells (as shown in FIG. 23D). Interestingly, higher proportion of FOXP3+ cells in the VEGF-C treated animals expressed T-bet, a critical regulator of the T helper 1 (Th1) differentiation program (as shown in FIG. 23D). Th1 profiles in Tregs have been associated with increased IFNγ production and reduced suppression of CD4 effector cells [79].

These data suggest a shift towards an anti-tumor environment in the VEGF-C treated mice. Consistent with this, CD8 T cells in the brain of VEGF-C treated host were poised to produce multiple cytokines after ex vivo stimulation (as shown in FIGS. 23E-23G), including IFNγ, a positive prognostic factor for immunotherapy [11, 75, 79-83].

The proportion of CD8 T cells with an exhausted phenotype (PD-1 only and PD-1+TIM3+ double positive cells) did not change significantly, suggesting that checkpoint blockade plus VEGF-C combination therapy induces potent and durable anti-tumor T cell responses without causing overt exhaustion.

All of these changes seemed to be independent of direct VEGF-C effect on T cells, as no VEGFR-3 expression was detectable in CD4 or CD8 T cells (as shown in FIG. 23H), and VEGF-C did not affect T cell proliferation in vitro (as shown in FIG. 23J). VEGFR-3 expression was also not observed in other immune compartments (as shown in FIG. 23H), and BMDCs stimulation with VEGF-C induced no change in MHCII or costimulatory molecule expression levels (as shown in FIG. 23I). Conditional knockout mice should be used in the future to selectively delete VEGFR-3 in various cellular compartments to determine cell-type specific effects of VEGFC in coordinating its antitumor effects. Altogether, these results highlight a potent anti-tumor property provided by VEGF-C, associated with increased lymphatic drainage and antigen presentation in the draining lymph nodes to promote multifunctional and durable anti-GBM T cell immunity.

It was next examined whether the anti-tumor effects of VEGF-C was due to the expansion and differentiation of T cells capable of trafficking to the brain (T cell intrinsic), or to changes in the brain environment increasing T cell recruitment (T cell extrinsic). Adoptive transfer of the same number of leukocytes from the draining lymph node of tumor bearing mice (treated with GFP-mRNA or VEGF-C-mRNA) into the recipient mice also bearing tumors (treated with GFP-mRNA or VEGF-C-mRNA) was performed (as shown in FIGS. 8L-8M). T cell infiltration into the brain was slightly increased if the T cells were from VEGF-C-mRNA treated mice (T cell intrinsic=1.6-fold increase). However, even T cells from tumor-bearing control mice (GFP-mRNA donor) were able to migrate into the brain with GBM if recipient was treated with VEGF-C-mRNA (T cell extrinsic=3.1-fold increase) (as shown in FIG. 8L). Moreover, donor T cells from VEGF-C treated animal transferred into VEGF-C treated host were able to most efficiently infiltrate the tumor bearing brain (Combinatorial=4.2-fold increase). Additionally, increases in T cell numbers in the lymph node was dependent on the recipient mice having VEGF-C-mRNA treatment (as shown in FIG. 8M), in agreement with the idea that antigen specific T cells proliferate only after increased drainage of tumor antigen from the CNS (as shown in FIGS. 8A, 8B, 8C, and 25C). Collectively, these results show that VEGF-C provides an anti-tumor environment through a combination of its effect on the meningeal lymphatic vasculature in addition to changes in T cell intrinsic properties.

Recent reports showed that combined nivolumab and ipilimumab therapy had clinical intracranial efficacy, concordant with extracranial activity, in patients with melanoma who had untreated brain metastases [75]. Mice with both a flank and intracranial tumor responded better to immunotherapy compared to those just bearing a intracranial melanoma [76]. To examine whether VEGF-C-mRNA therapy is effective in treating non-GBM cancer types, two melanoma cell lines, YUMMER 1.7 and B16 (FIGS. 8H-8K and 13) were used. The YUMMER 1.7 cells harbor $Braf^{V600E}$, $Pten^{-/-}$, $Cdkn2a^{-/-}$ mutations along with somatic mutations from UV exposures that make them susceptible to T cell dependent immunotherapy responses [77]. Mice bearing only intracranial YUMMER1.7 showed significant survival benefits when given both VEGF-C-mRNA and checkpoint inhibitor therapy (FIGS. 8I-K and 13A). In contrast, mice with both intracranial (IC) and flank (FT) YUMMER1.7 tumors saw benefits from checkpoint inhibitor therapy regardless of VEGF-C-mRNA treatment (FIGS. 8K and 13C). In fact, mice injected with only IC YUMMER1.7 tumors that received the combination therapy had similar survival benefits as those that had both IC and FT YUMMER1.7 tumors and were treated with checkpoint inhibitor therapy (FIGS. 8I-K and 13C). Additionally, ligation of the dcLNs seemed to only affect mice with IC, while it did not affect mice with both IC and FT tumors (FIGS. 8I-8K and 13A-13C). Similar results were observed with the B16 tumors (FIGS. 13A-13C). These results are consistent with the idea that T cell priming, either via CSF VEGF-C expression or a flank tumor, enables for efficient checkpoint inhibitor therapy responses in the CNS. However, in the case of a tumor confined to the CNS at steady state, regardless of tumor type, immune checkpoint inhibitors did not exhibit significant benefits.

While it is possible that immune or tumor cell intrinsic VEGF-C signaling may be causing this phenomenon, there were no observable changes in immune cells or tumor cells after direct VEGF-C stimulation, as shown in FIGS. 23H-23J. Instead, the data suggest that increased CNS immune priming is dependent on VEGF-C and its relationship with its main receptor partner, VEGFR-3, which results in the increased lymphatic drainage [84] necessary for immuno-surveillance against GBM.

Example 6: Effect of VEGFC-mRNA Treatment on T Cell Priming

VEGF-C signaling mediates protection against intracranial tumor and is equivalent to peripheral priming. Congenic CD45.2 mice were injected with GL261 tumors. 7 days post tumor inoculation (pti), mice were treated with GFP-mRNA or VEGF-C-mRNA. At 7 days post mRNA-treatment (14 day-pti) draining lymph nodes were harvested and leukocytes were transferred into congenic CD45.1 mice bearing 7 day-tumors. Five days after leukocyte transfer, draining lymph nodes and brain tissues were harvested to analyze T cell infiltration.

Example 7: VEGFC-mRNA and PD-1 Combination Therapy in Mice

VEGFC-mRNA was used as an adjuvant therapy to PD-1 therapy. Administration of VEGFC-mRNA at day 7 along with 3 administrations of anti-PD-1 antibodies at days 7, 11 and 15 resulted in complete remission of the tumor while VEGFC monotherapy and PD-1 monotherapy only resulted in delayed tumor growth.

Wild type C57BL/6 mice were implanted with GL261-Luc cells intracranially. As shown in FIG. 9A, at day 7 post-tumor implantation, tumors were imaged using the IVIS machine after administration of 3 mg of Luciferin per mouse. For IVIS imaging, mice were anesthetized using isoflurane and injected intraperitoneally with RediJect D-Luciferin Ultra (PerkinElmer) (200 µL, 30 mg/mL). After 10 minutes mice were imaged using the IVIS Spectrum In Vivo Imaging System (PerkinElmer). The Mice tumors were visualized and mice were randomized into four groups.

The Mock group underwent surgery and received GFP-mRNA jetPEI into the cisterna magna and 200 µg of isotype antibodies injected intraperitoneally. Tumor growth started by day 14, as shown in FIG. 9B.

The VEGFC group received 3 µg of VEGFC-mRNA jetPEI into the cisterna magna and 200 µg of isotype antibodies intraperitoneally. As compared to the Mock group, tumor growth in the VEGFC group was delayed and started largely between days 14 to 21, as shown in FIG. 9C.

The PD1 group received GFP-mRNA jetPEI into the cisterna magna and 200 µg of anti-PD1 (Bioxcell, clone RMP1-14) intraperitoneally. Tumor growth in the PD1 group (as compared to other groups) is indicated in FIGS. 9D and 9F. Tumor growth in the PD1 group started at about day 14, as shown in FIG. 9F.

The PD1/VEGFC group received 3 µg of VEGFC-mRNA jetPEI into the cisterna magna and 200 µg of anti-PD1 (Bioxcell, clone RMP1-14) intraperitoneally. There was negligible tumor growth in the PD1/VEGFC group. See FIGS. 9D and 9G.

The two groups that received anti-PD1 antibodies had additional 200 µg of anti-PD1 antibodies administered to them on days 11 and 15. Mice that did not receive anti-PD1 antibodies received isotype antibodies on days 11 and 15. The tumors were imaged using IVIS on days 10, 14, 21 and the mice were monitored for death and end-points.

FIGS. 9F and 9G show the percent survival of each of the four groups: Mock, VEGFC, PD1, and PD1/VEGFC. While anti-PD-1 antibody alone had a marginal effect on survival, the combination of VEGFC-mRNA administration with anti-PD-1 antibody resulted in regression of tumors in two different models of GBM with significant survival benefit (FIGS. 9F, 9G, 10B and 17A-17E). The long-term surviving mice re-challenged with tumor cells in the contralateral hemisphere 100 days after the first tumor challenge showed complete resistance to the secondary challenge (FIG. 9G).

Mice were treated with VEGFC and PD1 combination therapy, and treated with anti-CD4 or anti-CD8 antibodies to deplete T cells. A schematic of the study protocol is shown in FIG. 10A. Depletion antibodies anti-CD4 (GK1.5), anti-CD8 (YTS169.4) were purchased from BioXCell (West Lebanon, NH). CD4 and CD8 T cell depleted mice did not have the same regression of tumors as the VEGFC+PD1 treated mice. The data is shown in FIG. 10B. In conclusion, VEGFC-mRNA as adjuvant therapy to PD1 is dependent on T cell activity.

The combination therapy was tested for its protective effects when given to mice at late stage of GBM development. When mice were treated after significant amount of the tumor bulk was established (day 20), the combination therapy showed survival benefits while the VEGFC-mRNA or immune checkpoint inhibitor therapies showed no survival benefits (FIGS. 16C and 16D).

Tumor cell lines were injected into mice with different ages. The data is shown in FIG. 11A. It was observed that there was no significant difference in tumor growth and survival between the mice at different ages.

AAV-VEGFC treatment efficacy is independent of B cell activity. As shown in FIG. 11B, AAV-VEGFC pre-treated B6.129S2-IghtmICgn/J (muMT) mice, which lack functional B cells, showed same survival benefits as AAV-VEGFC pre-treated wild type mice. (The muMT mice were purchased from the National Cancer Institute and Jackson Laboratory and subsequently bred and housed at Yale University.) Together with the T cells results presented in FIGS. 3A-3B, the data indicates that VEGFC-induced protection against GBM requires both CD4 and CD8 T cells but not B cells.

Mice were inoculated with GL261-Luc tumors, and 7 days later were given a single injection into the cisterna magna of VEGFC-mRNA, or GFP-mRNA as a control. Five days after treatment, mice were euthanized and deep cervical lymphnodes were collected for FACS and stained for tumor specific tetramers. As shown in FIG. 8B, VEGFC-mRNA treated mice showed higher number of antigen specific T cells in the deep cervical lymph node 5 days after treatment (9.29% vs 2.26%).

Example 8VEGFC-mRNA and Checkpoint Inhibitor Combination Therapy in Mice

In a similar experiment, mice inoculated with 50,000 CT2A-BFP cells were treated with VEGFC-mRNA/GFP-mRNA (day 7) and with either anti-PD1(RMP1-14) and anti-4-1BB (LOB12.3; purchased from BioXCell) antibodies or PBS (day 7, 9 and 11) and monitored for survival. The protocol used is shown in FIG. 16A. CT2A-BFP cells were obtained from Yale University and were cultured in complete DMEM (4.5 g/L glucose, 10% FBS, 1% penicillin/streptomycin). The data on the degree of survival is shown in FIG. 16B. Mice inoculated with 50,000 GL261-Luc cells were treated with VEGFC-mRNA/GFP-mRNA (day 20) and with either anti-PD1 (RMP1-14) and anti-TIM3 (RMT3-23; purchased from BioXCell) antibodies or PBS (day 20, 22, 24) and monitored for survival. The protocol used is shown in FIG. 16C. The data on the degree of survival is shown in FIG. 16D.

Mice that rejected tumors after VEGF-C-mRNA+anti-PD1 (RMP1-14) combination therapy were re-challenged in the contralateral hemisphere and observed for survival (Naïve, n=5; d100 rejected, n=4). The data are shown in FIG. 9G. T cells from lymph nodes and spleens from mice that rejected tumors after VEGF-C-mRNA+anti-PD1 (RMP1-14) combination therapy or naïve WT mice were isolated and transferred into naïve WT mice intravenously. 24 h later, GL261 tumors were inoculated intracranially and observed for survival (WT, n=5; WT Naïve T cell transfer, n=5; WT Memory T cell transfer, n=7). The data are shown in FIG. 17A. Mice inoculated with 50,000 GL261-Luc cells were treated with VEGF-C-mRNA/GFP-mRNA (day 7) and with either anti-PD1 (RMP1-14) antibodies or isotype antibodies (day 7, 9 and 11) and monitored for survival. Mice were depleted of CD4 or CD8 T cells using anti-CD4 (GK1.5) or anti-CD8 (YTS169.4) antibodies starting one day before tumor inoculation and re-dosed every four days after (VEGF-C-mRNA+αPD-1, n=6; GFP-mRNA+αPD-1, n=6; VEGF-C-mRNA+αPD-1+αCD4, n=5; VEGF-C-mRNA+αPD-1+αCD8, n=5). The data are shown in FIG. 10B. As shown in the schematic of FIG. 16A, mice inoculated with 50,000 CT2A-BFP cells (FIG. 16B) or CT2A cells (FIG. 17B) were treated with VEGF-C-mRNA/GFP-mRNA (day 7) and with either anti-PD1(RMP1-14) and/or anti-4-1BB (LOB12.3) antibodies or PBS (day 7, 9 and 11) and monitored for survival (f VEGF-C-mRNA+αPD1+α4-1BB, n=5; GFP-mRNA+αPD1+α4-1BB, n=5; VEGF-C-mRNA+PBS, n=4; GFP-mRNA+PBS, n=6) . Mice inoculated with 50,000 GL261 cells were treated with VEGF-C-mRNA/GFP-mRNA (day 7) and with either anti-PD1 (RMP1-14) antibodies (as shown in FIG. 17C), anti-TIM3 (RMT3-23) antibodies (as shown in FIG. 17D), anti-CTLA4 (9H10) antibodies (as shown in FIG. 17E) or PBS (day 7, 9 and 11) and monitored for survival (n=5). The data shown for FIGS. 17D and 17E involve use of the same control mice for GFP-mRNA+PBS and VEGF-C-mRNA+PBS groups. As shown in the schematic of FIG. 16C, mice inoculated with 50,000 GL261-Luc cells were treated with VEGF-C-mRNA/GFP-mRNA (day 20) and with either anti-PD1 (RMP1-14) and anti-TIM3 (RMT3-23) antibodies or PBS (day 20, 22, 24) and monitored for survival (n=5). The data are shown in FIG. 16D. *P<0.05; P<0.01; *P<0.001; ****P<0.0001 (two-tailed unpaired Student's t-test , Log-rank Mantel-Cox test).

Example 9: VEGFC-mRNA Therapy in Non-GBM Cancer Types

To examine whether VEGFC-mRNA therapy is effective in treating non-GBM cancer types, the inventors used two melanoma cell lines, YUMMER 1.7 and B16. YUMMER 1.7 cell lines were developed in Dr. Marcus Bosenberg's lab [32]. YUMMER 1.7 cells were cultured in DMEM/F12 media (10% FBS, 1% nonessential amino acids, 1% penicillin/streptomycin). B16 cells were cultured in complete DMEM (4.5 g/L glucose, 10% FBS, 1% penicillin/streptomycin).

Mice were given either only intracranial tumors (IC) or a flank tumor and intracranial tumor (FT) and were treated with GFP/VEGFC-mRNA on day 7 and anti-PD1 (RMP1-14), anti-CTLA4 (9H10; purchased from BioXCell) on days 7, 9 and 11. A schematic of the study protocol is shown in FIG. 8H. The YUMMER 1.7 cells harbor BrafV600E, Pten−/−, Cdkn2a−/− mutations along with somatic mutations from UV exposures that make them susceptible to T cell dependent immunotherapy responses [77].

In a similar set of experiments, mice were given either only intracranial tumors (IC) or a flank tumor and intracranial tumor (FT) and were treated with GFP/VEGFC-mRNA on day 7 and anti-PD1 (RMP1-14), anti-CTLA4 (9H10) and anti-TIM3 (RMT3-23) on days 7, 9 and 11, in accordance with the experimental design of FIG. 8H. The date on the degree of survival of mice received only intracranial tumors (IC) and a flank tumor and intracranial tumor (FT) are shown in FIG. 13A and 13B, respectively. Flank tumor growth kinetics were measured using a caliper (n=12 for all groups except; ligation groups, n=7).

Mice with only intracranial YUMMER1.7 saw significant survival benefits when given both VEGFC-mRNA and checkpoint inhibitor therapy (FIGS. 8I). In contrast, mice that were injected with YUMMER1.7 both intracranial (IC) and flank (FT) tumors saw benefits from checkpoint inhibitor therapy regardless of VEGFC-mRNA treatment (FIG. 8J and FIG. 13A). In fact, mice injected with YUMMER1.7 only IC that received the combination therapy had similar survival benefits as those that had both IC and FT YUMMER1.7 and treated with checkpoint inhibitor therapy (FIG. 14D and FIG. 13B). These results are consistent with the idea that peripheral priming, either via CNS VEGFC expression or a flank tumor, can allow for efficient checkpoint inhibitor therapy responses in the CNS. However, in the case of a tumor confined in the CNS, regardless of tumor type, immune checkpoint inhibitors did not exhibit significant benefits.

In another experiment, at day −3, 500,000 YUMMER1.7 cells were injected into one set of mice so as to form a flank tumor. At day zero, another set of mice was given 50,000 YUMMER1.7 cells injected intracranially into the same mouse. At day 7, VEGF-C-mRNA/GFP-mRNA was injected intracisternally to all mice. On each of days 7, 9, and 11, anti-PD1 (RMP1-14), anti-CTLA4 (9H10) antibodies (200 μg) were administered. Survival of the mice were monitored. The experimental design is shown in FIG. 8H. The data are shown in FIG. 8I for mice were given only YUMMER1.7 intracranial tumors, and in FIG. 8J for mice given a YUMMER1.7 flank tumor and YUMMER1.7 intracranial tumor. In both FIGS. 8I and 8J, mice were treated with GFP/VEGF-C-mRNA on day 7 and anti-PD1 (RMP1-14), anti-CTLA4 (9H10) on days 7, 9 and 11. *P<0.05; P<0.01; *P<0.001; **P<0.0001 (two-tailed unpaired Student's t-test, Log-rank Mantel-Cox test). Select results from FIGS. 8I and 8J are shown in FIG. 8**K.

The inventors have demonstrated a potential to manipulate the meningeal lymphatics with ectopic VEGFC in conferring immune surveillance and T cell mediated immune responses against brain tumors (FIG. 13D).

Example 10: GL261-Luc Tumor Model Validation and Long Term-Survival of AAV-VEGF-C Treated Mice Mice inoculated with 50,000 GL261-Luc cells were imaged every 7 days, and showed consistent and reliable tumor growth (n=4) as shown in FIGS. 14A-15D. The results of FIG. 14C show that GL261-Luc grows in mice in a cell number dependent way (500 cells, n=5; 5000 cells, n=5; 50,000 cells, n=9). FIG. 14D shows long term survival monitoring of mice after AAV-VEGF-C and AAV-CTRL injections into the cisterna magna (n=5). *P<0.05; P<0.01; *P<0.001; **P<0.0001 (two-tailed unpaired Student's t-test). Mice were injected I.V. with 70 k MW Dextran-fluorescein and euthanized after 2 hours. Brains were collected and cryosectioned (n=4). The results are shown in FIG. 14E. Mice were injected I.V. with 0.5% Evans Blue. After 2 hours mice were perfused intraventricularly and EB was extracted from brain tissue using DMF (WT, LPS, AAV-VEGF-C, VEGF-C-mRNA, n=4; Tumor, Tumor+VEGF-C-mRNA, n=5). The results are shown in FIG. 14F. A representative image of AAV-CTRL and AAV-VEGF-C treated mice after implantation of 5,000 cells is shown in FIG. 5**A.

Example 11: Correlation of VEGF-C Expression Profiles between Human and Murine GBM An analysis of RNAseq data of tumor tissue and brain health tissue from different regions of the tissue was performed. The data shown in FIGS. 18A-18E and 18G-19H relate to RNAseq data of tumor tissue and health brain tissue from different regions of the tissue (TCGA (phs000178.v10.p8) and GTEX respectively. GTEX (v6) was analyzed, with results shown in FIGS. 18A-18E. FIG. 18A shows the expression profile of VEGF-A, and FIG. 18B shows the expression profile of VEGF-C . Also shown in FIGS. 18C-18E are expression profiles of VEGF-A, CD31 (angiogenic) and VEGF-C, LYVE1 (lymphangiogenic) genes in cortex versus GBM samples (cortex, n=132; GBM, n=147). RNAseq data of mice brain and GL261 tumors from mice brains were analyzed (n=3), with results shown in FIG. 18F. ONCLNC (Onclnc.org) data of GBM patients stratified into two groups (VEGF-C low, lower 33%; VEGF-C hi, upper 33%; n=50) is shown in FIG. 18G. In FIG. 18H is shown a Kaplan Meier Survival curve of patients (n=50) described in FIG. 18G. An RNAseq correlation of change in VEGF-C and T cell markers after PD-1 therapy (data from GSE121810) was performed, with results shown in FIGS. 19A-19C. *P<0.05; P<0.01; *P<0.001; ****P<0.0001 (two-tailed unpaired Student's t-test, Log-rank Mantel-Cox test)

Example 12: VEGF-C Expression and Uptake Tropism

To further examine the localization of VEGF-C mRNA and protein upon VEGF-C-mRNA administration, the uptake of mRNA was measured across various cell types and compartments using flow cytometry. Cy-5 labeled mRNA was taken up by cells in the brain, meninges and the dcLNs, and was found in immune cells (CD45+), endothelial cells (CD45-CD31+) and other cells (CD45-CD31−). VEGF-C-mRNA and Cy5 labeled GFP-mRNA were mixed at a 1:1 ratio and delivered in vivo with JETPEL 24 h later brains, meninges and lymph nodes of treated mice were collected for flow cytometry to measure % Cy5 positive cells in each compartment (control, n=6; Cy5-mRNA, n=9; data are pooled from two independent experiments). The data are shown in FIGS. 20A and 20B.

Brains and serum were collected from mice treated with either AAVs (-CTRL or -VEGF-C, 2 month time point), or mRNAs (GFP or VEGF-C-mRNA, 24 h time point) or inoculated with tumors (days 7 and 28 time points), then were anayzed by ELISA (Brain; AAV-CTRL, GFP-mRNA, n=6; AAV-VEGF-C, VEGF-C-mRNA, n=5; d7 tumor, n=3; d28 tumor, n=7) (Serum; n=3). *P<0.05; P<0.01; *P<0.001; ****P<0.0001 (two-tailed unpaired Student's t-test). The data are shown in FIG. 20C. Increased protein levels of secreted VEGF-C specific to the CSF and meninges was observed (FIG. 7C), with no detectable VEGF-C in the brain or serum of mice given exogenous VEGF-C mRNA (FIG. 20C).

Example 13: VEGF-C Signals Specifically in Lymphatic Endothelial Cells in the Meninges and dCLNs Phosphoflow experiments were performed to measure VEGFR signaling in endothelial cells after VEGF-C treatment. A gating strategy for lymphatic endothelial cells (LECs) and blood endothelial cells (BECs), is shown in FIG. 21A. FIG. 21B shows concatenated images of LECs and BECs from meninges and lymph node depicting AKT-phosphorylation intensity. Quantification of AKT(pS473) positive population and MFI within LECs and BECs in the meninges and dCLNs was performed, with data shown in FIG. 21C (meninges; WT, n=5; AAV-VEGF-C, tumor+Luc-mRNA, tumor+VEGF-C-mRNA, n=8) (lymph nodes; WT, n=5; AAV-VEGF-C, n=8; tumor+Luc-mRNA, n=7; tumor+VEGF-C-mRNA, n=8). An increase in AKT phosphorylation specifically within the lymphatic endothelial cell (LEC) population with no changes in the blood endothelial cells (BEC) in the meninges was observed (FIG. 21C). Increased AKT phosphorylation of LECs in the dCLNs, but the % positive population was much smaller compared to the meninges (FIG. 21B).

In FIGS. 21D and 21E are shown fluorescent microscope images of dCLN after VEGF-C-mRNA treatment in tumor bearing mice(CD31; LYVE1; DAPI). Fluorescent microscope images of meninges after VEGF-C-mRNA treatment in tumor bearing mice are also shown in FIG. 21D (CD31; LYVE1; DAPI). *P<0.05; P<0.01; *P<0.001; ****P<0.0001 (two-tailed unpaired Student's t-test).

This increased signaling was specific to the LECs and was not accompanied by structural deformities after VEGF-C treatment in either the LECs or BECs even within an angiogenic tumor environment (FIGS. 21D, 21E, and 23A). These data indicated that while VEGF-C-mRNA was taken up by various cells of the brain, meninges and dCLN, VEGF-C protein was mostly confined to the CSF and meninges and activating LEC but not BEC.

Example 14: Timing of VEGF-C-mRNA and AAV-VEGF-C Therapy Affects Survival Outcome Mice were treated with AAV-VEGF-C or VEGF-C-mRNA at different timepoints relative to GL261-Luc tumor inoculation (at day zero). Tumor growth kinetics (results shown in FIGS. 22B-22C) and survival (results shown in FIG. 22A) was monitored (n=5 for all groups). *P<0.05; P<0.01; *P<0.001; ****P<0.0001 (Log-rank Mantel-Cox test)

Expression kinetics of VEGF-C-mRNA and AAV-VEGF-C differ significantly, with the former showing peak expression after 24 hours and the latter showing increasing expression for weeks with maximal expression not expected until several weeks after [20, 21]. The therapeutic efficacy of both modalities against GL261 was evaluated by administrating the therapy at different days. Only prophylactic (−d60) AAV-VEGF-C resulted in long-term survivors, as shown in FIGS. 22A-22C. This is likely due to a combination of factors, including tumor burden at the time of treatment and the microenvironment an established tumor provides. However, using VEGF-C-mRNA monotherapy administered at days 0, 3 or 7, survival benefits were still observed, although none of these treated-mice survived in the face of rapid GBM development (FIG. 22A).

Example 15: VEGF-C Dependent Anti-PD-1 Potentiation is Specific Among other VEGF Family Proteins C57BL/6 mice received intra-cisterna magna (i.c.m.) injection of AAV-CTRL or -sVEGFR-3. After 4 weeks, mice were euthanized and the dura mater was collected to image the lymphatic vasculature (LYVE1) in the confluence of sinuses (n=5). The data are shown in FIGS. 24A and 24B. Mice were pre-treated with AAV-sVEGFR-3 4-6 weeks prior to tumor inoculation. 7 days post tumor inoculation, mice were treated with VEGF-C-mRNA and anti-PD1 (RMP1-14) antibodies (days 7, 9 and 11) (n=5). The data are shown in FIG. 24C. Mice were treated with 5 µg of recombinant protein (VEGF-A, B, C156S, or D) in combination with anti-PD1 (RMP1-14) antibodies (days 7, 9 and 11) and monitored for survival (n=5). *P<0.05; P<0.01; *P<0.001; ****P<0.0001 (Log-rank Mantel-Cox test) The data are shown in FIGS. 24D-24F.

Example 16: VEGF-C Increases Tumor Antigen in Draining Lymph Nodes without Direct Effects on T Cells or Dendritic Cells Mice were injected with CT2A-BFP tumors. Mice were treated with VEGF-C-mRNA at day 7. On day 8, brains and lymph nodes from all mice were collected and analyzed using flow cytometry. Sample plots of experiments are shown in FIG. 25A, with quantification of experiments (n=5) shown in FIGS. 25B-25E. Flow cytometry was used to evaluate VEGFR-3 expression in GL261 cells, with VEGFR3-GFP plasmid transfected into HEK293T cells as a positive control. The data are shown in FIG. 25F. An MTT assay was performed to measure GL261 cancer cell proliferation in the presence of VEGF-C after 48 hours, with data shown in FIG. 25G. Flow cytometry was used to evaluate VEGFR-3 expression in leukocyte compartments in the tumor, with data shown in FIG. 23H. BMDCs were cultured with VEGF-C and evaluated for costimulatory molecule expression at naïve state (top row) or with LPS stimulation (bottom row). The data is shown in FIG. 23I. Isolated T cells were activated in vitro with CD3/CD28 and IL-2 in the presence of VEGF-C, with the data shown in FIG. 23J. *P<0.05; P<0.01; *P<0.001; ****P<0.0001 (two-tailed unpaired Student's t-test)

Example 17: Flow Cytometry Analysis of Myeloid Cell Populations after VEGF-C Treatment Mice bearing 7 day-tumors were treated with Luc-mRNA or VEGF-C-mRNA and evaluated for changes in myeloid populations. FIG. 26A shows a gating strategy for different myeloid cells. Cell counts of different cell types were measured at different time points after VEGF-C-mRNA treatment. The data is shown in FIGS. 26B-26D. MHCII and CD80 MFI levels were graphed, as shown in FIGS. 26E-26G, with the data showing no significant alteration after VEGF-C-mRNA treatment. In FIGS. 26B and 26E are leukocytes from brain tissue. In FIGS. 26C and 26F are leukocytes from draining cervical lymph nodes. In FIGS. 26D and 26G are leukocytes from meninges (n=3, 3 animals pooled for each replicate). *P<0.05; P<0.01; *P<0.001; ****P<0.0001 (two-tailed unpaired Student's t-test).

Example 18: Treating Metastatic Tumor with VEGF-C Therapy

In order to address how immune surveillance affects tumor growth, a model is used to examine metastatic tumor growth in the presence of increased meningeal lymphatics. Wild type mice are injected intrathoracically with approximately $10^3$-$10^5$ LLC cells. 3 days after intrathoracic tumor implantation, mice are given $10^4$ cells intracranially or intrathecally. 4 days after CNS tumor implantation, mice are either given intracranial X-ray irradiation, VEGF-C-mRNA treatment intrathecally, anti-PD1 treatment intraperitoneally, or a combination of these therapies. Survival of the mice is monitored, and tumor burden is monitored using luciferase imaging. Survival benefits and delayed tumor growth is observed with the VEGF-C-mRNA monotherapy or combination therapy with anti-PD1 treatment.

REFERENCES

1. Pisapia, D. J., *The Updated World Health Organization Glioma Classification: Cellular and Molecular Origins of Adult Infiltrating Gliomas.* Arch Pathol Lab Med, 2017. 141(12): p. 1633-1645.
2. Paolillo, M., C. Boselli, and S. Schinelli, *Glioblastoma under Siege: An Overview of Current Therapeutic Strategies.* Brain Sci, 2018. 8(1).
3. Desjardins, A., et al., *Recurrent Glioblastoma Treated with Recombinant Poliovirus.* N Engl J Med, 2018. 379(2): p. 150-161.
4. Howitt, B. E., et al., *Association of Polymerase e-Mutated and Microsatellite-Instable Endometrial Cancers With Neoantigen Load, Number of Tumor-Infiltrating Lymphocytes, and Expression of PD-1 and PD-L1.* JAMA Oncol, 2015. 1(9): p. 1319-23.
5. Strickland, K. C., et al., *Association and prognostic significance of BRCA1/2-mutation status with neoantigen load, number of tumor-infiltrating lymphocytes and expression of PD-1/PD-L1 in high grade serous ovarian cancer.* Oncotarget, 2016. 7(12): p. 13587-98.
6. Le, D. T., et al., *PD-1 Blockade in Tumors with Mismatch Repair Deficiency.* N Engl J Med, 2015. 372(26): p. 2509-20.
7. Riaz, N., et al., *Tumor and Microenvironment Evolution during Immunotherapy with Nivolumab.* Cell, 2017. 171(4): p. 934-949 e15.
8. Gopalakrishnan, V., et al., *Gut microbiome modulates response to anti-PD-1 immunotherapy in melanoma patients.* Science, 2018. 359(6371): p. 97-103.
9. Hugo, W., et al., *Genomic and Transcriptomic Features of Response to Anti-PD-1 Therapy in Metastatic Melanoma.* Cell, 2016. 165(1): p. 35-44.
10. Johnson, D. B., et al., *Melanoma-specific MHC-II expression represents a tumour-autonomous phenotype and predicts response to anti-PD-1/PD-L1 therapy.* Nat Commun, 2016. 7: p. 10582.
11. Rizvi, N. A., et al., *Cancer immunology. Mutational landscape determines sensitivity to PD-1 blockade in non-small cell lung cancer.* Science, 2015. 348(6230): p. 124-8.
12. Rizvi, N. A., et al., *Activity and safety of nivolumab, an anti-PD-1 immune checkpoint inhibitor, for patients with advanced, refractory squamous non-small-cell lung cancer (CheckMate 063): a phase 2, single-arm trial.* Lancet Oncol, 2015. 16(3): p. 257-65.
13. Groot, J. F. D., et al., *Window-of-opportunity clinical trial of a PD-1 inhibitor in patients with recurrent glioblastoma.* Journal of Clinical Oncology, 2018. 36(15_suppl): p. 2008-2008.
14. Maxwell, R., C. M. Jackson, and M. Lim, *Clinical Trials Investigating Immune Checkpoint Blockade in Glioblastoma.* Curr Treat Options Oncol, 2017. 18(8): p. 51.
15. Medawar, P. B., *Immunity to Homologous Grafted Skin. III. The Fate of Skin Homografts Transplanted to the Brain, to Subcutaneous Tissue, and to the Anterior Chamber of the Eye.* Br J Exp Pathol, 1947.
16. Perry, V. H., *A revised view of the central nervous system microenvironment and major histocompatibility complex class II antigen presentation.* J Neuroimmunol, 1998. 90(2): p. 113-21.
17. Perry, V. H., et al., *The blood-brain barrier and the inflammatory response.* Mol Med Today, 1997. 3(8): p. 335-41.
18. Clarkson, B. D., et al., *Innate-adaptive crosstalk: how dendritic cells shape immune responses in the CNS.* Adv Exp Med Biol, 2012. 946: p. 309-33.
19. Harris, M. G., et al., *Immune privilege of the CNS is not the consequence of limited antigen sampling.* Sci Rep, 2014. 4: p. 4422.
20. Clarkson, B. D., et al., *T cell-derived interleukin (IL)-21 promotes brain injury following stroke in mice.* J Exp Med, 2014. 211(4): p. 595-604.
21. Clarkson, B. D., et al., *CCR2-dependent dendritic cell accumulation in the central nervous system during early effector experimental autoimmune encephalomyelitis is essential for effector T cell restimulation in situ and disease progression.* J Immunol, 2015. 194(2): p. 531-41.
22. Clarkson, B. D., et al., *CCR7 deficient inflammatory Dendritic Cells are retained in the Central Nervous System.* Sci Rep, 2017. 7: p. 42856.
23. Rayasam, A., et al., *Regional distribution of CNS antigens differentially determines T-cell mediated neuroinflammation in a CX3CR1 dependent manner.* J Neurosci, 2018.
24. Viglietta, V., et al., *Loss of functional suppression by CD4+CD25+ regulatory T cells in patients with multiple sclerosis.* J Exp Med, 2004. 199(7): p. 971-9.
25. International Multiple Sclerosis Genetics, C., et al., *Genetic risk and a primary role for cell-mediated immune mechanisms in multiple sclerosis.* Nature, 2011. 476(7359): p. 214-9.
26. Iijima, N. and A. Iwasaki, *Access of protective antiviral antibody to neuronal tissues requires CD4 T-cell help.* Nature, 2016. 533(7604): p. 552-6.
27. Frei, K., et al., *Production of B cell stimulatory factor-2 and interferon gamma in the central nervous system*

*during viral meningitis and encephalitis. Evaluation in a murine model infection and in patients.* J Exp Med, 1988. 168(1): p. 449-53.
28. Furr, S. R. and I. Marriott, *Viral CNS infections: role of glial pattern recognition receptors in neuroinflammation.* Front Microbiol, 2012. 3: p. 201.
29. Iliff, J. J., et al., *Brain-wide pathway for waste clearance captured by contrast-enhanced MRI.* J Clin Invest, 2013. 123(3): p. 1299-309.
30. Iliff, J. J., et al., *Impairment of glymphatic pathway function promotes tau pathology after traumatic brain injury.* J Neurosci, 2014. 34(49): p. 16180-93.
31. Wang, M., et al., *Focal Solute Trapping and Global Glymphatic Pathway Impairment in a Murine Model of Multiple Microinfarcts.* J Neurosci, 2017. 37(11): p. 2870-2877.
32. Louveau, A., et al., *Structural and functional features of central nervous system lymphatic vessels.* Nature, 2015. 523(7560): p. 337-41.
33. Absinta, M., et al., *Human and nonhuman primate meninges harbor lymphatic vessels that can be visualized noninvasively by MRI.* Elife, 2017. 6.
34. Da Mesquita, S., et al., *Functional aspects of meningeal lymphatics in ageing and Alzheimer's disease.* Nature, 2018.
35. 35. Aspelund, A., et al., *A dural lymphatic vascular system that drains brain interstitial fluid and macromolecules.* J Exp Med, 2015. 212(7): p. 991-9.
36. Antila, S., et al., *Development and plasticity of meningeal lymphatic vessels.* J Exp Med, 2017. 214(12): p. 3645-3667.
37. Mathios, D., et al., *Anti-PD-1 antitumor immunity is enhanced by local and abrogated by systemic chemotherapy in GBM.* Sci Transl Med, 2016. 8(370): p. 370ra180.
38. Kim, J. E., et al., *Combination Therapy with Anti-PD-1, Anti-TIM-3, and Focal Radiation Results in Regression of Murine Gliomas.* Clin Cancer Res, 2017. 23(1): p. 124-136.
39. Volovitz, I., et al., *Split immunity: immune inhibition of rat gliomas by subcutaneous exposure to unmodified live tumor cells.* J Immunol, 2011. 187(10): p. 5452-62.
40. Garg, A. D., et al., *Dendritic cell vaccines based on immunogenic cell death elicit danger signals and T cell-driven rejection of high-grade glioma.* Sci Transl Med, 2016. 8(328): p. 328ra27.
41. Kindy, M. S., et al., *A therapeutic cancer vaccine against GL261 murine glioma.* J Transl Med, 2016. 14: p. 1.
42. Batich, K. A., et al., *Long-term Survival in Glioblastoma with Cytomegalovirus pp65-Targeted Vaccination.* Clin Cancer Res, 2017. 23(8): p. 1898-1909.
43. Migliorini, D., et al., *CAR T-Cell Therapies in Glioblastoma: A First Look.* Clin Cancer Res, 2018. 24(3): p. 535-540.
44. Nesselhut, J., et al., *Comparison of early versus late onset of cellular immunotherapy in glioblastoma multiforme WHO IV.* Journal of Clinical Oncology, 2017. 35(15_suppl): p. e13531-e13531.
45. Skobe, M., et al., *Induction of tumor lymphangiogenesis by VEGF-C promotes breast cancer metastasis.* Nat Med, 2001. 7(2): p. 192-8.
46. Lund, A. W., et al., *VEGF-C promotes immune tolerance in B16 melanomas and cross-presentation of tumor antigen by lymph node lymphatics.* Cell Rep, 2012. 1(3): p. 191-9.
47. Fankhauser, M., et al., *Tumor lymphangiogenesis promotes T cell infiltration and potentiates immunotherapy in melanoma.* Sci Transl Med, 2017. 9(407).
48. Wang, C. A. and S. J. Tsai, *The non-canonical role of vascular endothelial growth factor-C axis in cancer progression.* Exp Biol Med (Maywood), 2015. 240(6): p. 718-24.
49. Grauer, O. M., et al., *TLR ligands in the local treatment of established intracerebral murine gliomas.* J Immunol, 2008. 181(10): p. 6720-9.
50. Ma, Q., et al., *Outflow of cerebrospinal fluid is predominantly through lymphatic vessels and is reduced in aged mice.* Nat Commun, 2017. 8(1): p. 1434.
51. Pietschmann, S., et al., *An individual patient data meta-analysis on characteristics, treatments and outcomes of glioblastoma/gliosarcoma patients with metastases outside of the central nervous system.* PLoS One, 2015. 10(4): p. e0121592.
52. Mitchell, D. A., et al., *Tetanus toxoid and CCL3 improve dendritic cell vaccines in mice and glioblastoma patients.* Nature, 2015. 519(7543): p. 366-9.
53. Kowalski, P. S., et al., *Ionizable Amino-Polyesters Synthesized via Ring Opening Polymerization of Tertiary Amino-Alcohols for Tissue Selective mRNA Delivery.* Adv Mater, 2018: p. e1801151.
54. Sabnis, S., et al., *A Novel Amino Lipid Series for mRNA Delivery: Improved Endosomal Escape and Sustained Pharmacology and Safety in Non-human Primates.* Mol Ther, 2018. 26(6): p. 1509-1519.
55. Warren, L., et al., *Highly efficient reprogramming to pluripotency and directed differentiation of human cells with synthetic modified mRNA.* Cell Stem Cell, 2010. 7(5): p. 618-30.
56. Ball, R. L., et al., *Lipid Nanoparticle Formulations for Enhanced Co-delivery of siRNA and mRNA.* Nano Lett, 2018. 18(6): p. 3814-3822.
57. Louveau, A. et al. CNS lymphatic drainage and neuroinflammation are regulated by meningeal lymphatic vasculature. *Nat Neurosci* 21, 1380-1391, doi:10.1038/s41593-018-0227-9 (2018).
58. Han, L. et al. Increased Nanoparticle Delivery to Brain Tumors by Autocatalytic Priming for Improved Treatment and Imaging. *ACS Nano* 10, 4209-4218, doi:10.1021/acsnano.5b07573 (2016).
59. Joukov, V. et al. A novel vascular endothelial growth factor, VEGF-C, is a ligand for the Flt4 (VEGFR-3) and KDR (VEGFR-2) receptor tyrosine kinases. *EMBO J* 15, 1751 (1996).
60. 60 Kukk, E. et al. VEGF-C receptor binding and pattern of expression with VEGFR-3 suggests a role in lymphatic vascular development. *Development* 122, 3829-3837 (1996).
61. Mathieu, E., Gupta, N., Macdonald, R. L., Ai, J. & Yucel, Y. H. In vivo imaging of lymphatic drainage of cerebrospinal fluid in mouse. *Fluids Barriers CNS* 10, 35, doi:10.1186/2045-8118-10-35 (2013).
62. Colella, P., Ronzitti, G. & Mingozzi, F. Emerging Issues in AAV-Mediated In Vivo Gene Therapy. *Mol Ther Methods Clin Dev* 8, 87-104, doi:10.1016/j.omtm.2017.11.007 (2018).
63. Zincarelli, C., Soltys, S., Rengo, G. & Rabinowitz, J. E. Analysis of AAV serotypes 1-9 mediated gene expression and tropism in mice after systemic injection. *Mol Ther* 16, 1073-1080, doi:10.1038/mt.2008.76 (2008).

64. Mingozzi, F. & High, K. A. Immune responses to AAV vectors: overcoming barriers to successful gene therapy. *Blood* 122, 23-36, doi:10.1182/blood-2013-01-306647 (2013).
65. Joukov, V. et al. Proteolytic processing regulates receptor specificity and activity of VEGF-C. *EMBO J* 16, 3898-3911, doi:10.1093/emboj/16.13.3898 (1997).
66. Zeng, J. et al. Anti-PD-1 blockade and stereotactic radiation produce long-term survival in mice with intracranial gliomas. *Int J Radiat Oncol Biol Phys* 86, 343-349, doi:10.1016/j.ijrobp.2012.12.025 (2013).
67. Belcaid, Z. et al. Focal radiation therapy combined with 4-1BB activation and CTLA-4 blockade yields long-term survival and a protective antigen-specific memory response in a murine glioma model. *PLoS One* 9, e101764, doi:10.1371/journal.pone.0101764 (2014).
68. Filley, A. C., Henriquez, M. & Dey, M. Recurrent glioma clinical trial, CheckMate-143: the game is not over yet. *Oncotarget* 8, 91779-91794, doi:10.18632/oncotarget.21586 (2017).
69. Garzon-Muvdi, T. et al. Dendritic cell activation enhances anti-PD-1 mediated immunotherapy against glioblastoma. *Oncotarget* 9, 20681-20697, doi:10.18632/oncotarget.25061 (2018).
70. Bronte, V. et al. Effective genetic vaccination with a widely shared endogenous retroviral tumor antigen requires CD40 stimulation during tumor rejection phase. *J Immunol* 171, 6396-6405 (2003).
71. Ottina, E. et al. Restoration of Endogenous Retrovirus Infectivity Impacts Mouse Cancer Models. *Cancer Immunol Res* 6, 1292-1300, doi:10.1158/2326-6066.CIR-18-0038 (2018).
72. Rooney, M. S., Shukla, S. A., Wu, C. J., Getz, G. & Hacohen, N. Molecular and genetic properties of tumors associated with local immune cytolytic activity. *Cell* 160, 48-61, doi:10.1016/j.cell.2014.12.033 (2015).
73. Chiappinelli, K. B. et al. Inhibiting DNA Methylation Causes an Interferon Response in Cancer via dsRNA Including Endogenous Retroviruses. *Cell* 169, 361, doi:10.1016/j.cell.2017.03.036 (2017).
74. Zou, W., Wolchok, J. D. & Chen, L. PD-L1 (B7-H1) and PD-1 pathway blockade for cancer therapy: Mechanisms, response biomarkers, and combinations. *Sci Transl Med* 8, 328rv324, doi:10.1126/scitranslmed.aad7118 (2016).
75. Tawbi, H. A. et al. Combined Nivolumab and Ipilimumab in Melanoma Metastatic to the Brain. *N Engl J Med* 379, 722-730, doi:10.1056/NEJMoa1805453 (2018).
76. Taggart, D. et al. Anti-PD-1/anti-CTLA-4 efficacy in melanoma brain metastases depends on extracranial disease and augmentation of CD8(+) T cell trafficking. *Proc Natl Acad Sci USA* 115, E1540-E1549, doi:10.1073/pnas.1714089115 (2018).
77. Wang, J. et al. UV-induced somatic mutations elicit a functional T cell response in the YUMMER1.7 mouse melanoma model. *Pigment Cell Melanoma Res* 30, 428-435, doi:10.1111/pcmr.12591 (2017).
78. Belmans, J. et al. Immunotherapy with subcutaneous immunogenic autologous tumor lysate increases murine glioblastoma survival. *Sci Rep* 7, 13902, doi:10.1038/s41598-017-12584-0 (2017).
79. Lucca, L. E. et al. TIGIT signaling restores suppressor function of Th1 Tregs. *JCI Insight* 4, doi: 10.1172/jci.insight.124427 (2019).
80. Wherry, E. J. T cell exhaustion. *Nat Immunol* 12, 492-499 (2011).
81. Wherry, E. J. & Kurachi, M. Molecular and cellular insights into T cell exhaustion. *Nat Rev Immunol* 15, 486-499, doi:10.1038/nri3862 (2015).
82. Yuan, J. et al. CTLA-4 blockade enhances polyfunctional NY-ESO-1 specific T cell responses in metastatic melanoma patients with clinical benefit. *Proc Natl Acad Sci USA* 105, 20410-20415, doi:10.1073/pnas.0810114105 (2008)
83. Huang, A. C. et al. T-cell invigoration to tumour burden ratio associated with anti-PD-1 response. *Nature* 545, 60-65, doi:10.1038/nature22079 (2017)
84. Breslin, J. W. et al. Vascular endothelial growth factor-C stimulates the lymphatic pump by a VEGF receptor-3-dependent mechanism. *Am J Physiol Heart Circ Physiol* 293, H709-718, doi:10.1152/ajpheart.00102.2007 (2007).

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims. It is further to be understood that all values are approximate, and are provided for description.

Patents, patent applications, publications, product descriptions, and protocols are cited throughout this application, the disclosures of which are incorporated herein by reference in their entireties for all purposes.

The invention claimed is:

1. A method of treating a cancer in a subject in need thereof, the method comprising administering to the subject an effective amount of a lymphangiogenesis inducer, wherein the lymphangiogenesis inducer is VEGFA, VEGFB, VEGEC, or VEGFD, wherein the method does not comprise administering a tumor-specific antigen to the subject, and wherein the cancer is melanoma and/or glioblastoma.

2. The method of claim 1, wherein the lymphangiogenesis inducer is VEGFC.

3. The method of claim 1, wherein the lymphangiogenesis inducer is administered as a protein, or as a polynucleotide molecule encoding the lymphangiogenesis inducer protein.

4. The method of claim 3, wherein the polynucleotide molecule encoding the lymphangiogenesis inducer is a mRNA or is comprised within a viral vector.

5. The method of claim 4, wherein the viral vector is derived from an adeno-associated virus (AAV).

6. The method of claim 1, further comprising administering to the subject an immunotherapeutic agent.

7. The method of claim 6, wherein the immunotherapeutic agent is an immune checkpoint inhibitor.

8. The method of claim 7, wherein the immune checkpoint inhibitor targets PD-1, PD-L1, CTLA-4, TIGIT, TIM-3, LAG-3, BTLA, GITR, 4-1BB, and/or Ox-40.

9. The method of claim 8, wherein the immune checkpoint inhibitor is an anti-PD-1 antibody, an anti-CTLA-4 antibody, an anti-TIGIT antibody, an anti-TIM-3 antibody, an anti-4-1BB antibody, or any combinations thereof.

10. The method of claim 6, wherein the lymphangiogenesis inducer and the immunotherapeutic agent are administered conjointly or in the same composition.

11. The method of claim 6, wherein the lymphangiogenesis inducer and the immunotherapeutic agent are administered sequentially.

12. The method of claim 11, wherein the lymphangiogenesis inducer is administered prior to administering the immunotherapeutic agent.

13. The method of claim 12, wherein the lymphangiogenesis inducer is a recombinant AAV vector encoding a VEGF, which is administered about 4-8 weeks prior to administering the immunotherapeutic agent.

14. The method of claim 12, wherein the lymphangiogenesis inducer is a mRNA encoding a VEGF, which is administered about 2-6 hours prior to administering the immunotherapeutic agent.

15. The method of claim 1, wherein the lymphangiogenesis inducer is administered intrathecally, intratumorally, intracisternally, or systemically.

16. The method of claim 1, wherein the cancer is in the brain and/or the central nervous system of the subject.

17. The method of claim 1, wherein the subject is a human patient.

* * * * *